(12) United States Patent
Misawa

(10) Patent No.: US 8,137,006 B2
(45) Date of Patent: Mar. 20, 2012

(54) MIRROR AND SHUTTER DRIVE CONTROL MECHANISM FOR IMAGING APPARATUS

(75) Inventor: Masayuki Misawa, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 12/777,434

(22) Filed: May 11, 2010

(65) Prior Publication Data

US 2010/0290775 A1    Nov. 18, 2010

(30) Foreign Application Priority Data

May 14, 2009    (JP) ................................. 2009-117101

(51) Int. Cl.
*G03B 19/12* (2006.01)
(52) U.S. Cl. ....................................................... 396/358
(58) Field of Classification Search ................. 396/358, 396/461, 509; 74/396, 397
See application file for complete search history.

(56) References Cited

U.S. PATENT DOCUMENTS

| | | | | |
|---|---|---|---|---|
| 5,864,725 | A | * | 1/1999 | Ogi ............................... 396/358 |
| 5,878,296 | A | | 3/1999 | Ogi et al. |
| 2004/0062540 | A1 | * | 4/2004 | Misawa ........................ 396/387 |
| 2004/0161230 | A1 | * | 8/2004 | Hosokawa et al. ........... 396/177 |
| 2007/0253700 | A1 | * | 11/2007 | Okumura ...................... 396/358 |

FOREIGN PATENT DOCUMENTS

JP    3153482    1/2001

OTHER PUBLICATIONS

English language Abstract of corresponding JP 10-148865 of JP 3153482.
"Asahi Camera", Asahi Shimbun Publication Inc., Jan. 2008; pp. 230 and 231, together with an English-language translation.
"Asahi Camera", Asahi Shimbun Publication Inc., Aug. 2008; pp. 202 and 203, together with an English-language translation.
U.S. Appl. No. 12/777,455 to Misawa, filed May 11, 2010.
U.S. Appl. No. 12/814,693 to Misawa, filed Jun. 14, 2010.
U.S. Appl. No. 12/814,738 to Misawa, filed Jun. 14, 2010.

* cited by examiner

*Primary Examiner* — Clayton E Laballe
*Assistant Examiner* — Noam Reisner
(74) *Attorney, Agent, or Firm* — Greenblum & Bernstein, P.L.C.

(57) ABSTRACT

An imaging apparatus is provided, including a mirror movable between a viewing position and a retracted position; a shutter which prevents the light that is passed through the imaging optical system from being incident on the image sensor and allows the light that is passed through the imaging optical system to be incident on the image sensor when open and shut, respectively; a reversible motor; a first operating mechanism which moves the mirror and carries out a shutter charge operation when engaged with the reversible motor and driven thereby; a second operating mechanism which carries out the shutter charge operation without moving the mirror when engaged with the reversible motor and driven thereby; and a driving force transmission switcher for transmitting driving forces of the reversible motor in first and second rotational directions thereof to the first and second operating mechanisms, respectively.

20 Claims, 33 Drawing Sheets

MIRROR AND SHUTTER DRIVE CONTROL MECHANISM FOR IMAGING APPARATUS

BACKGROUND OF THE INVENTION

1. Field of the Invention

The present invention relates to an imaging apparatus such a digital camera, and in particular, relates to a mirror and shutter drive control mechanism in an imaging apparatus allowing a user to select between two types of view modes: optical view mode in which the object is viewed through an optical viewfinder before photographing, and live view mode in which an electronic object image captured by an image sensor is viewed in real-time on a display monitor before photographing.

2. Description of the Related Art

In addition to a conventional object viewing function (optical view mode) using an optical viewfinder, SLR digital cameras having a 'live view mode', in which an electronic object image captured by an image sensor is viewed in real-time on a display monitor such as an LCD before photographing, are known in the art. In the live view mode, the quick-return mirror (hereinafter referred simply to as the mirror) is held in the retracted position (mirror-up position) in which the quick-return mirror is retracted from a photographing optical path when the object is viewed before photographing, which is different from a viewing state in the optical view mode, in which the object is viewed through an optical viewfinder before photographing. Therefore, when a photographing operation is performed in the live view mode, the mirror drive operation and the shutter drive operation need to be controlled in a different manner from those in optical view mode (normal exposure mode).

In the SLR camera disclosed in Japanese Patent No. 3,153,482, a mirror up/down operation, a shutter charge operation, a diaphragm control operation and other operations are performed by rotations of cam-incorporated gears driven by a single motor. Although Japanese Patent No. 3,153,482 is for a camera using silver film, a live view mode operational sequence that allows a photographing operation to be carried out (referred hereinafter as "live-view mode photography operational-sequence") can be designed and configured in an SLR digital camera using a drive mechanism including such cam-incorporated gears.

In the SLR digital camera disclosed in Non-Patent Document 1 (pages 202 and 203 in "Asahi Camera" (a Japanese monthly photographic magazine published by Asahi Shimbun Publications Inc., print edition, August 2008), another image sensor (live-view image sensor) used exclusively for capturing the object image in the live view mode, independently of an image sensor used for taking pictures, is installed in a viewfinder optical system so that a quasi-live view operation can be performed using the live-view image sensor in the viewfinder optical system.

In SLR cameras having two independent drive sources for a mirror drive mechanism and a shutter drive mechanism, respectively, like in the case of the SLR camera disclosed in Non-Patent Document 2 (pages 230 and 231 in "Asahi Camera" (a Japanese monthly photographic magazine published by Asahi Shimbun Publications Inc., print edition, January 2008), the photographing operation in the live view mode can make the shutter drive mechanism perform a shutter charge operation while making the mirror drive mechanism hold a mirror-up state (i.e., hold the mirror at the retracted state thereof), and is thus easy to control compared with that performed in the SLR camera in which the mirror and the shutter are driven by a common drive source.

In the type of SLR camera disclosed in Japanese Patent No. 3,153,482 in which a mirror drive operation, a shutter charge operation and a diaphragm control operation are performed by a single drive source, miniaturization and weight reduction can be achieved by the sharing of the drive source. On the other hand, if a digital camera having this type of drive mechanism is designed and configured to perform a live-view mode photography operational-sequence simply by using the drive mechanism that controls a normal photography operational-sequence (i.e., an optical-view mode photography operational-sequence), it has been proven that unnecessary operations, except the actuation of the shutter, e.g., the mirror up/down operation and the diaphragm full-opening operation, are performed every time a photographing operation is performed during the live view mode. Hence, the usability of the camera is adversely influenced since the image on the monitor momentarily appears black upon rise and fall of the mirror in the live view mode. In addition, also from the viewpoint of load reduction and improvement in operational speed, it is desirable that such unnecessary mechanical operations not occur.

In the SLR camera disclosed in Non-Patent Document 1, an electronic image captured by an image sensor different from the image sensor used at a time of exposure is viewed on a display monitor before photographing, and accordingly, this view mode cannot be considered to be a live view mode in the strict sense, as there is a possibility of the image displayed on the monitor not precisely coinciding with the image taken at a time of exposure. Additionally, installation space for an image sensor needs to be secured in the viewfinder, which becomes an obstacle for miniaturization of the camera and causes an increase in production cost.

In the case of employing a structure disclosed in Non-Patent Document 2, although the mirror up/down operation can be prevented from occurring during a photographing operation that is performed during live view mode, the mirror drive system and the shutter drive system are provided with two independent drive sources, respectively, which causes an increase in size, an increase in weight of the camera, and also an increase in production cost.

SUMMARY OF THE INVENTION

The present invention has been devised in view of the above described problems and provides an imaging apparatus capable of performing a photographing operation with no unnecessary operation of the mirror in the live view mode in which the object image is viewed with the mirror being retracted from a photographing optical path; moreover, the drive mechanism for the photographing operation in the imaging apparatus can be made compact and lightweight.

According to an aspect of the present invention, an imaging apparatus is provided including a mirror movable between a viewing position, in which the mirror reflects incident light from an imaging optical system toward a viewfinder optical system, and a retracted position, in which the mirror is retracted so that light which is passed through the imaging optical system is incident on an image sensor without being reflected by the mirror; a shutter which prevents the light that is passed through the imaging optical system from being incident on the image sensor and allows the light that is passed through the imaging optical system to be incident on the image sensor when shut and open, respectively; a reversible motor; a first operating mechanism which moves the mirror and carries out a shutter charge operation of the shutter when engaged with the reversible motor and driven thereby; a second operating mechanism which carries out the shutter charge operation of the shutter without moving the mirror when engaged with the reversible motor and driven thereby; and a driving force transmission switcher for transmitting a driving force of the reversible motor in a first rotational direction thereof and a driving force of the reversible motor in a second rotational direction thereof to the first operating mechanism and the second operating mechanism, respectively.

It is desirable for the first operating mechanism and the second operating mechanism to include a shutter charge lever which is shared therebetween and swingable between a charge release position to allow the shutter to travel and a charge position to carry out the shutter charge operation after completion of traveling of the shutter, wherein the first operating mechanism further includes: a mirror drive lever swingable between a mirror-down position to hold the mirror in the viewing position and a mirror-up position to hold the mirror in the retracted position; and a first cam-incorporated gear which includes a mirror control cam for controlling swing movement of the mirror drive lever and a first shutter control cam for controlling swing movement of the shutter charge lever. The second operating mechanism further includes a second cam-incorporated gear including a second shutter control cam for controlling the swing movement of the shutter charge lever. The driving force transmission switcher includes a planetary gear mechanism including: a sun gear rotated in one direction and the other direction by rotations of the reversible motor in the first direction and the second direction, respectively; and a planet gear engaged with and revolving around the sun gear, the planet gear being rotatably supported by a swing arm swingable about the sun gear. The planet gear is brought into engagement with the first cam-incorporated gear and the second cam-incorporated gear by the rotations of the reversible motor in the first direction and the second direction, respectively.

It is desirable for the imaging apparatus to include at least one swing movement limit portion, formed on a stationary member which supports the mirror, for limiting a swinging range of the swing arm to define both ends of the swinging range.

It is desirable for one revolution of the first cam-incorporated gear caused by the rotation of the reversible motor in the first direction from an origin position causes the mirror drive lever to rotate from the mirror-down position to the mirror-up position and causes the shutter charge lever to rotate from the charge position to the charge release position, and subsequently, causes the mirror drive lever to rotate from the mirror-up position to the mirror-down position and causes the shutter charge lever to rotate from the charge release position to the charge position after completion of traveling of the shutter. One revolution of the second cam-incorporated gear caused by the rotation of the reversible motor in the second direction from an origin position causes the shutter charge lever to rotate from the charge release position to the charge position and subsequently from the charge position to the charge release position.

It is desirable for the first operating mechanism and the second operating mechanism to include a shutter charge lever which is shared therebetween and swingable between a charge release position to allow the shutter to travel and a charge position to carry out the shutter charge operation after completion of traveling of the shutter, wherein the first operating mechanism further includes: a mirror drive lever swingable between a mirror-down position to hold the mirror in the viewing position and a mirror-up position to hold the mirror in the retracted position; and a first cam-incorporated gear which includes a mirror control cam for controlling swing movement of the mirror drive lever and a first shutter control cam for controlling swing movement of the shutter charge lever. The second operating mechanism further includes a second cam-incorporated gear including a second shutter control cam for controlling the swing movement of the shutter charge lever. The first cam-incorporated gear and the second cam-incorporated gear are rotatably supported by respective rotational shafts thereof which are substantially parallel to each other and positioned at different positions in an axial direction of the rotational shafts. The driving force transmission switcher includes an axial-direction movable gear which is supported to be movable in the axial direction of the rotational shafts to be selectively engageable with the first cam-incorporated gear and the second cam-incorporated gear.

It is desirable for the imaging apparatus to include a control circuit which controls operations of the reversible motor and opening/shutting operations of the shutter; and a live view switch and a release switch which can be manually operated. Upon the live view switch being turned ON, the control circuit drives the reversible motor in the first direction to rotate the first cam-incorporated gear, thereby rotating the mirror drive lever from the mirror-down position to the mirror-up position, rotating the shutter charge lever from the charge position to the shutter release position, and opening the shutter to move the imaging apparatus into live view mode, in which light from the imaging optical system is continuously incident on the image sensor. Upon the release switch being turned ON in the live view mode, the control circuit drives the reversible motor in the second direction to rotate the second cam-incorporated gear by one revolution to make the shutter charge lever swing from the charge release position to the charge position and return from the charge position to the charge release position, and thereafter make the shutter travel perform an exposure operation, and further drives the reversible motor in the second direction to rotate the second cam-incorporated gear by one revolution to make the shutter charge lever swing from the charge release position to the charge position and return from the charge position to the charge release position, and thereafter make the shutter open.

Upon the live view switch being turned OFF in the live view mode, it is desirable for the control circuit to drive the reversible motor in the second direction to rotate the first cam-incorporated gear, thereby rotating the mirror drive lever to the mirror-down position and rotating the shutter charge lever to the charge position.

It is desirable for the imaging apparatus to include a diaphragm control mechanism which varies an f-number in accordance with object brightness information obtained from the image sensor in the live view mode, operations of the diaphragm control mechanism being controlled independently of the first operating mechanism and the second operating mechanism.

It is desirable for the stationary member to include a mirror box in which the mirror is positioned, and for the first operating mechanism and the second operating mechanism to be arranged on one side of the mirror box in which the mirror is positioned.

It is desirable for the driving force transmission switcher to include at least one gear that is movable to be selectively engaged with the first operating mechanism and the second operating mechanism.

According to the present invention, a driving force of the reversible motor is selectively transmitted in a manner so that the driving force is transmitted to the first operating mechanism (which makes the swing operation of the mirror and the shutter charge operation of the shutter performed) in a photographing operation carried out during the normal exposure mode (in which an object image is viewed through a viewfinder before a photographing operation) and so that the driving force is transmitted to the second operating mechanism (which performs the shutter charge operation of the shutter without performing the swing operation of the mirror) in a photographing operation carried out during the live exposure mode. Therefore, a photographing operation can be performed with no action of the mirror in the live view mode. In addition, since the mirror drive operation and the shutter charge operation are performed by a common motor, miniaturization and weight reduction of the mirror/shutter drive mechanism can be achieved.

The present disclosure relates to subject matter contained in Japanese Patent Application No. 2009-117101 (filed on May 14, 2009) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
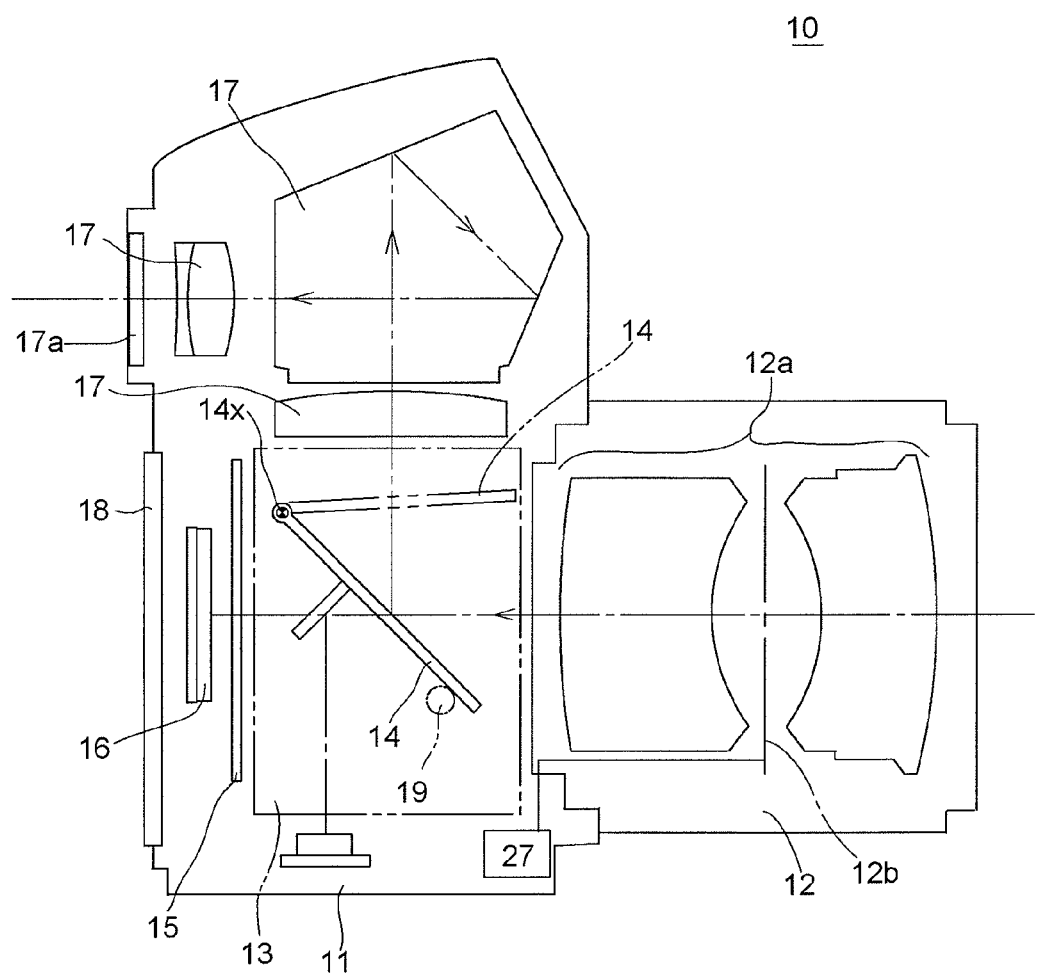
FIG. 1 is a schematic diagram of an optical system of an SLR camera as an example of an imaging apparatus to which the present invention is applied.

An SLR digital camera (hereinafter referred simply to as the camera) 10 shown in FIG. 1 is an embodiment of an imaging apparatus according to the present invention. The camera 10 is provided on the front of a camera body 11 with a lens mount (ring-shaped mount) to which a lens barrel (interchangeable lens) 12 is detachably attached, and is further provided behind the lens mount with a mirror box (stationary member) 13. The camera 10 is provided in the mirror box 13 with a quick-return mirror (hereinafter referred simply to as the mirror) 14 which is supported by the mirror box 13 to be swingable about a laterally-extending mirror sheet hinge 14x fixed to said mirror box 13. The camera 10 is provided behind the mirror 14 with a focal plane shutter (hereinafter referred simply to as the shutter) 15 and is provided behind the shutter 15 with an image sensor 16.

Figure 5:
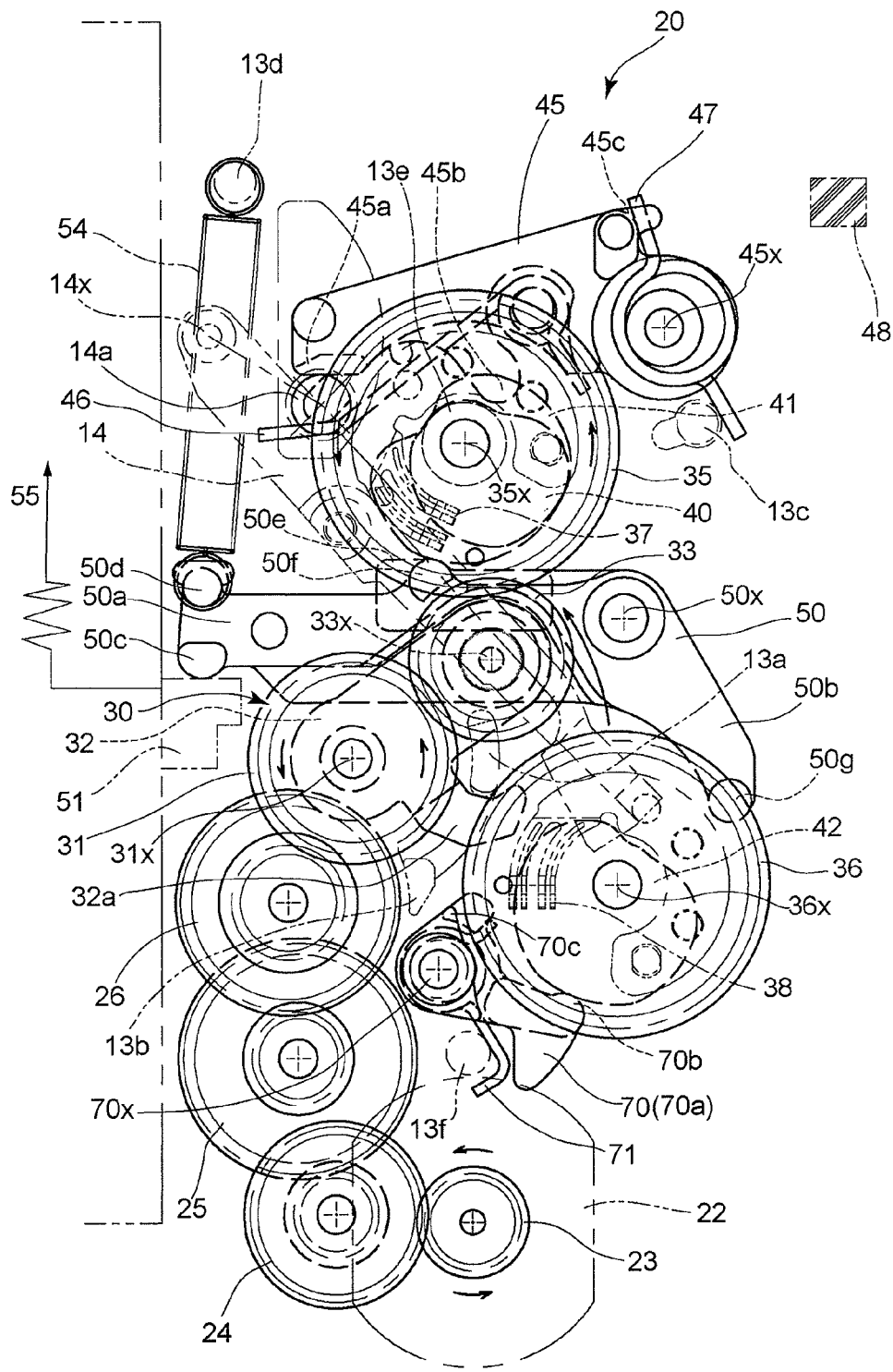
FIG. 5 is a side elevational view of the mirror/shutter drive mechanism in an initial state of a normal photography operational-sequence, in which the mirror is held in the down position (viewing position) on a photographing optical path and the shutter charge operation has been completed.

As shown in FIGS. 1 and 5, the mirror 14 is driven to swing between two positions: a down position (viewing position; shown by a solid line in FIG. 1 and a two-dot chain line in FIG. 5) in which the mirror 14 is positioned in a photographing optical path from a photographic lens (imaging optical system) 12a positioned inside the lens barrel 12 to the image sensor 16, and an upward retracted position (shown by a two-dot chain line in FIGS. 1 and 5) in which the mirror 14 is retracted upward from the aforementioned photographing optical path. The mirror 14 includes a mirror and a mirror sheet which supports the mirror thereon. The portion of the mirror 14 which is shown by two-dot chain lines in FIGS. 5 through 8 is the mirror sheet of the mirror 14. When the mirror 14 is in the down position, light reflected by the mirror 14 is incident on a viewfinder optical system 17 (including a pentagonal prism and an eyepiece) to be viewed as an object image through an eyepiece opening 17a. On the other hand, when the mirror 14 is in the upward retracted position, light passed through the photographic lens 12a travels toward the shutter 15 without being reflected by the mirror 14, and this light can be made incident on the light receiving surface of the image sensor 16 by opening the shutter 15. The camera body 10 is provided on the back of the camera body 11 with an LCD monitor 18. Electronic object images obtained via the image sensor 16 and various information other than electronic object images can be indicated on the LCD monitor 18.

The shutter 15 is provided with a leading curtain 15a and a trailing curtain 15b (both indicated in FIG. 2), each of which can travel in a plane orthogonal to an incident optical axis relative to the image sensor 16. In the operation of the shutter 15 at a time of exposure, the leading curtain 15a and the trailing curtain 15b travel in order with a predetermined time difference therebetween and are thereupon brought back to their previous positions (initial positions) by a shutter charge operation which will be discussed later. The camera 10 is provided therein with a shutter setting lever 51 provided as an element associated with the leading curtain 15a and the trailing curtain 15b of the shutter 15. The shutter setting lever 51 is supported to be swingable about a shaft (not shown). The portion of the shutter setting lever 51 which appears in FIGS. 4 through 8, 15 through 18, and 23 through 30 is a free end of the shutter setting lever 51. A swinging movement of the shutter setting lever 51 causes the position of the free end of the shutter setting lever 51 to vary in the vertical direction. The leading curtain 15a and the trailing curtain 15b are mechanically prevented from traveling by the shutter setting lever 51 when the free end thereof is in the shutter holding position shown in FIGS. 5 and 8. The leading curtain 15a and the trailing curtain 15b are allowed to travel when the free end of the shutter setting lever 51 is in the shutter release position shown in FIGS. 6 and 7 that is above the shutter holding position. The shutter setting lever 51 is biased toward the shutter release position by a setting lever restoring spring 55 (shown conceptually in FIGS. 5 through 8, 15 through 18, and 23 through 30). The shutter charge operation for the leading curtain 15a and the trailing curtain 15b of the shutter 15 is performed by a movement of the shutter setting lever 51 from the shutter release position to the shutter holding position. The leading curtain 15a and the trailing curtain 15b in a state of having been charged can be held (prevented from traveling) by a leading curtain holding magnet 52 and a trailing curtain holding magnet 53 (both shown in FIG. 2). The leading curtain holding magnet 52 is excited (turned ON) to produce a magnetic attractive force to hold the leading curtain 15a upon being energized, and subsequently, upon the energized state of the leading curtain holding magnet 52 being canceled, the leading curtain holding magnet 52 moves to a non-energized state (OFF state), thus causing the leading curtain 15a to travel. Likewise, the trailing curtain holding magnet 53 is excited (turned ON) to produce a magnetic attractive force to hold the trailing curtain 15b upon being energized, and subsequently, upon the energized state of the trailing curtain holding magnet 53 being canceled, the trailing curtain holding magnet 53 moves to a non-energized state (OFF state), thus causing the trailing curtain 15b to travel.

Figure 3:
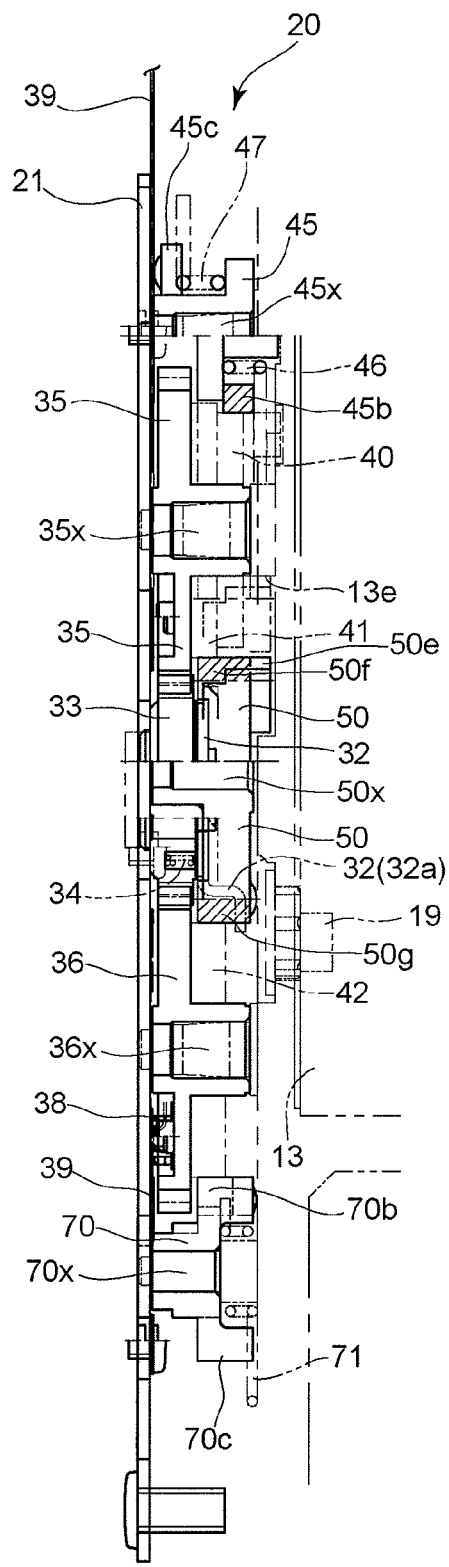
FIG. 3 is a front elevational view of a mirror/shutter drive mechanism installed on a side of a mirror box provided in the SLR camera, showing part of the mirror/shutter drive mechanism in cross section, viewed from front of the SLR camera.
Figure 4:
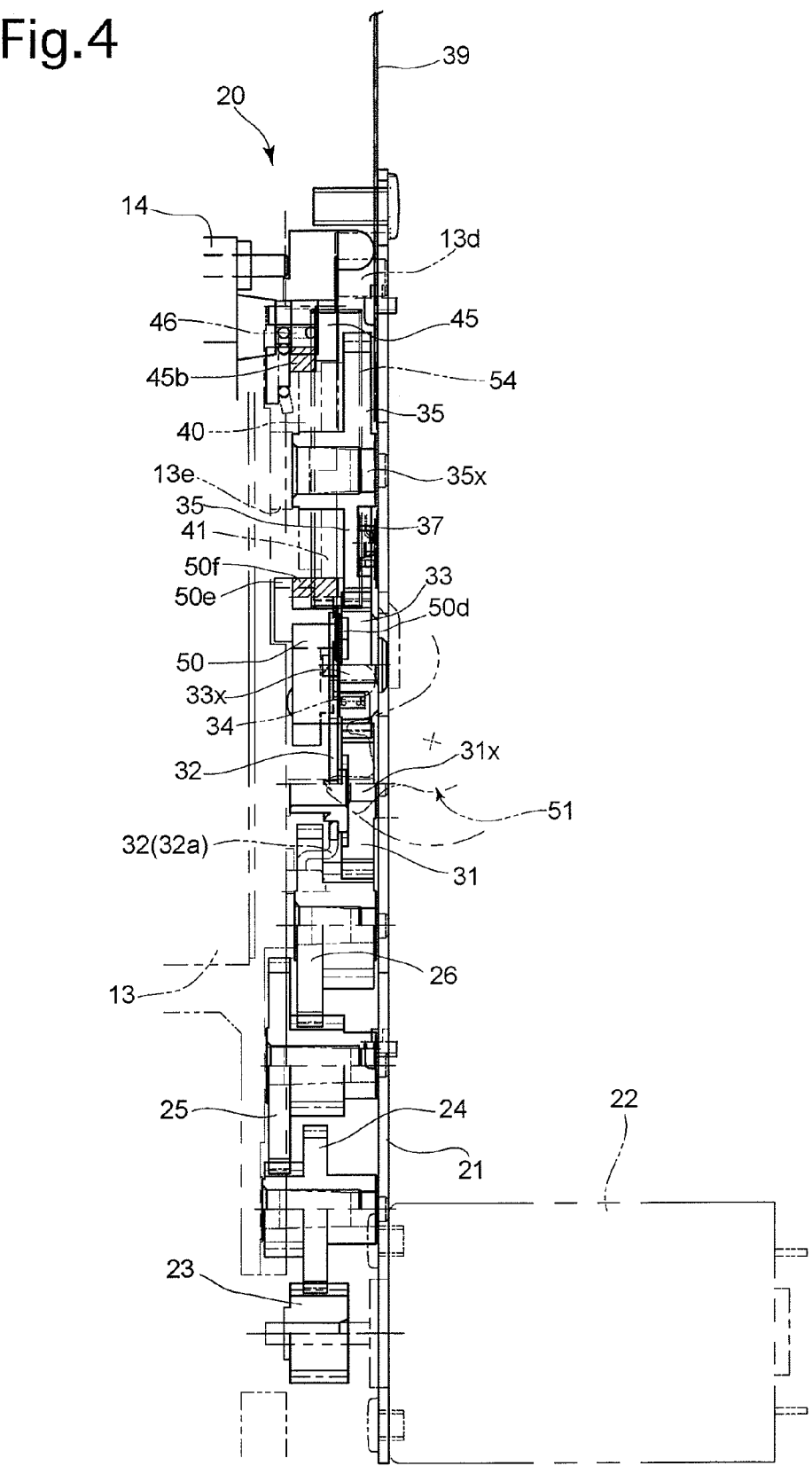
FIG. 4 is a rear elevational view of the mirror/shutter drive mechanism, showing part of the mirror/shutter drive mechanism in cross section, viewed from rear of the SLR camera.
Figure 9:
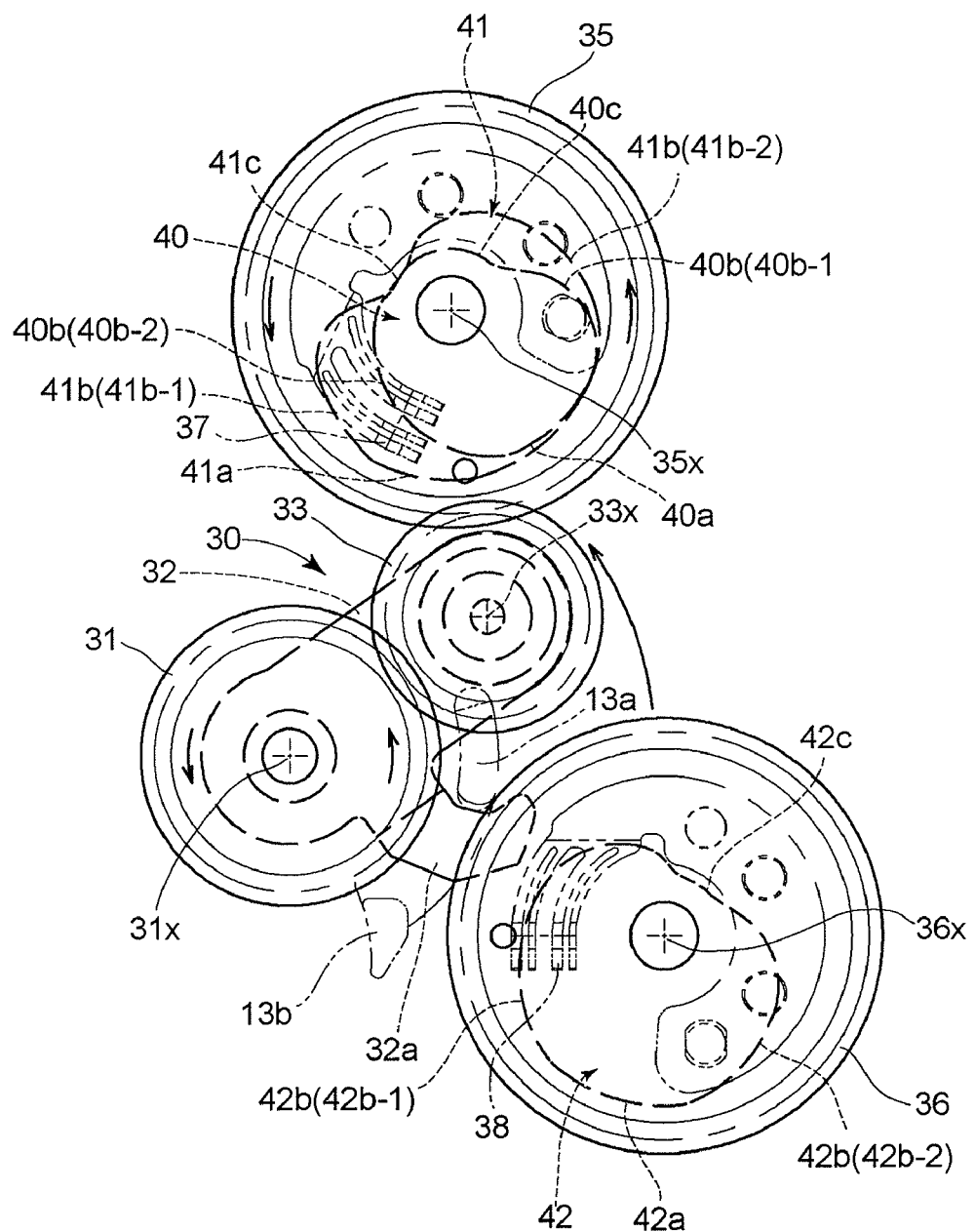
FIG. 9 is a side elevational view of a portion of the mirror/shutter drive mechanism in a state where a motor driving force is transmitted to the first cam-incorporated gear via the planetary gear mechanism, which serves as a component of the mirror/shutter drive mechanism.
Figure 10:
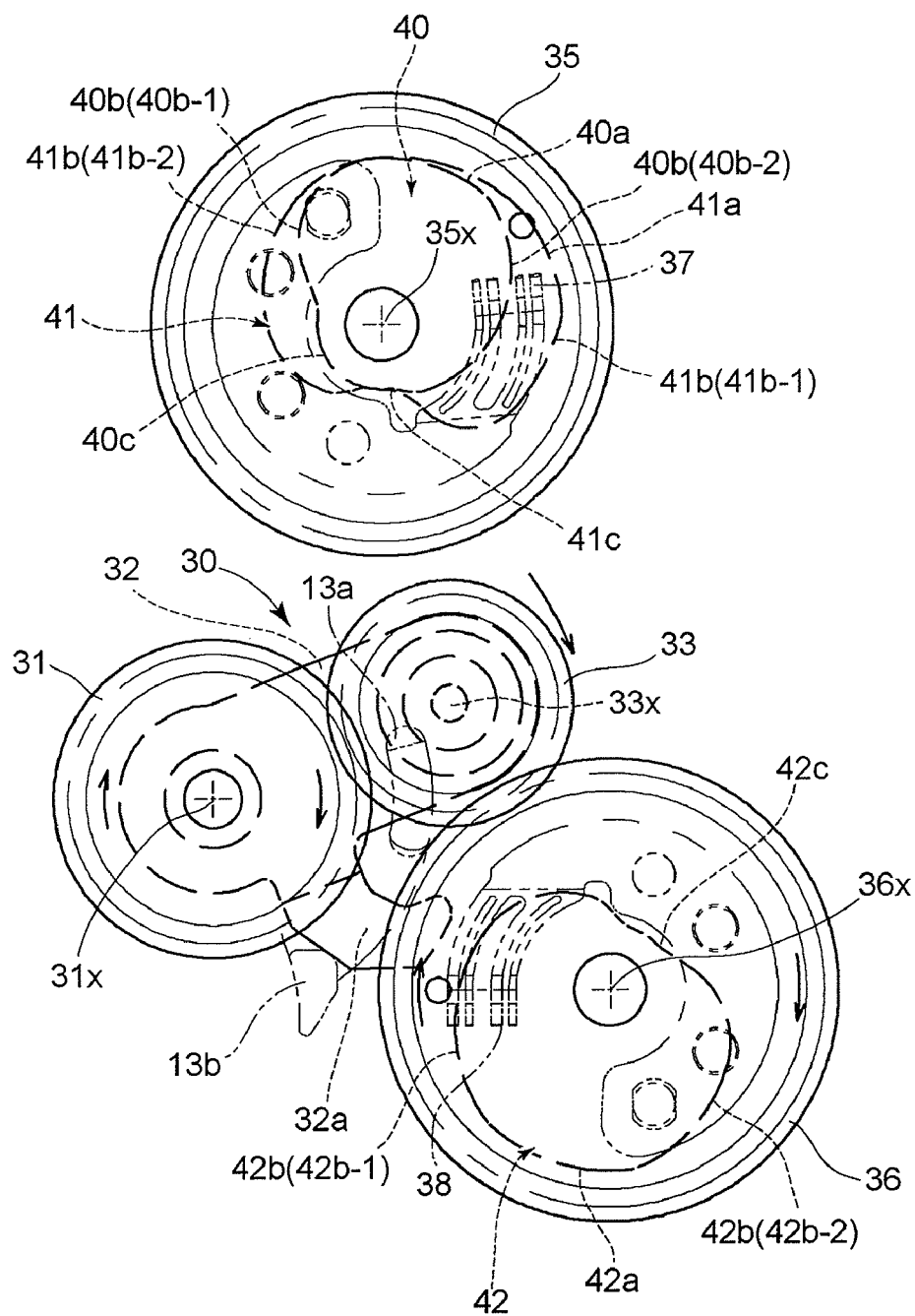
FIG. 10 is a side elevational view of the portion of the mirror/shutter drive mechanism shown in FIG. 9 in a state where a motor driving force is transmitted to the second cam-incorporated gear via the planetary gear mechanism.

The camera 10 is provided on a side of the mirror box 13 with a mirror/shutter drive mechanism 20. As shown in FIGS. 3 and 4, the camera 10 is provided therein with a cover plate 21 fixed at a position facing a side surface of the mirror box 13 (this position corresponds to a position in front of the paper plane in each of FIGS. 5 through 8) and is further provided therein with a drive motor (reversible motor) 22 which is supported by the cover plate 21 in the vicinity of the lower end thereof. A motor pinion 23 is fixed on the rotary output shaft of the drive motor 22. The mirror/shutter drive mechanism 20 is provided with a planetary gear mechanism (driving force transmission switcher) 30, and rotation of the motor pinion 23 is transmitted to a sun gear 31 of the planetary gear mechanism 30 via a reduction gear train consisting of three reduction gears 24, 25 and 26. As shown in FIGS. 9 and 10, the planetary gear mechanism 30 is provided with a planetary gear arm 32 swingable about a rotational shaft 31x of the sun gear 31, and is provided with a planet gear 33 which is supported by the free end of the planetary gear arm 32 to be rotatable on a rotational shaft 33x extending parallel to the rotational shaft 31x of the sun gear 31. The planet gear 33 is in mesh with the sun gear 31, and friction (rotational resistance) of a predetermined magnitude is applied between the planet gear 33 and the planetary gear arm 32 by a planetary gear friction spring 34 (see FIGS. 3 and 4).

The planet gear 33 meshes selectively with a first cam-incorporated gear (an element of a first operating mechanism) 35 and a second cam-incorporated gear (an element of a second operating mechanism) 36 by a swing motion of the planetary gear arm 32. The planetary gear arm 32 is provided with a sub-arm 32a, and the limit of swing movement of the planetary gear arm 32 in a direction to engage with the first cam-incorporated gear 35 is determined by the engagement between the sub-arm 32a and a swing movement limit protrusion (swing movement limit portion) 13a formed on the mirror box 13. In addition, the limit of swing movement of the planetary gear arm 32 in a direction to engage with the second cam-incorporated gear 36 is determined by the engagement between the sub-arm 32a and a swing movement limit protrusion (swing movement limit portion) 13b formed on the mirror box 13.

The first cam-incorporated gear 35 and the second cam-incorporated gear 36 are supported by a side of the mirror box 13 and the cover plate 21 therebetween to be rotatable on a rotational shaft 35x and a rotational shaft 36x, respectively, each of which is parallel to the rotational shaft 33x of the planet gear 33. Each of the first cam-incorporated gear 35 and the second cam-incorporated gear 36 is provided on the outer peripheral surface thereof with a circumferential gear (gear teeth) engageable with the planet gear 33. The first cam-incorporated gear 35 and the second cam-incorporated gear 36 are substantially identical in diameter to each other. In addition, the first cam-incorporated gear 35 and the second cam-incorporated gear 36 are mutually identical in the number of gear teeth on the outer peripheral surface (i.e., reduction ratio is 1:1). The first cam-incorporated gear 35 and the second cam-incorporated gear 36 are provided on surfaces thereof facing the cover plate 21 with a code plate brush 37 and a code plate brush 38, respectively. A code plate 39 (see FIGS. 3 and 4), with which the code plate brushes 37 and 38 are in sliding contact, is supported by the cover plate 21. Due to conduction of electricity between each code plate brush 37 and 38 and the pattern of traces formed on the code plate 39, specific rotation positions of each cam-incorporated gear 35 and 36 are detected. Such detectable rotation positions of the cam-incorporated gears 35 and 36 will be discussed in detail later. Additionally, the first cam-incorporated gear 35 is provided, on a surface thereof opposite to the surface to which the code plate brush 37 is fixed, with a mirror control cam 40 and a first shutter control cam 41. The second cam-incorporated gear 36 is provided, on a surface thereof opposite to the surface to which the code plate brush 38 is fixed, with a second shutter control cam 42. The detailed shapes of the mirror control cam 40, the first shutter control cam 41 and the second shutter control cam 42 will be discussed later. All the rotational shafts of the above described gears ranging from the motor pinion 23 to the first and second cam-incorporated gears 35 and 36 are substantially parallel to the axis of the mirror sheet hinge 14x.

Figure 11:
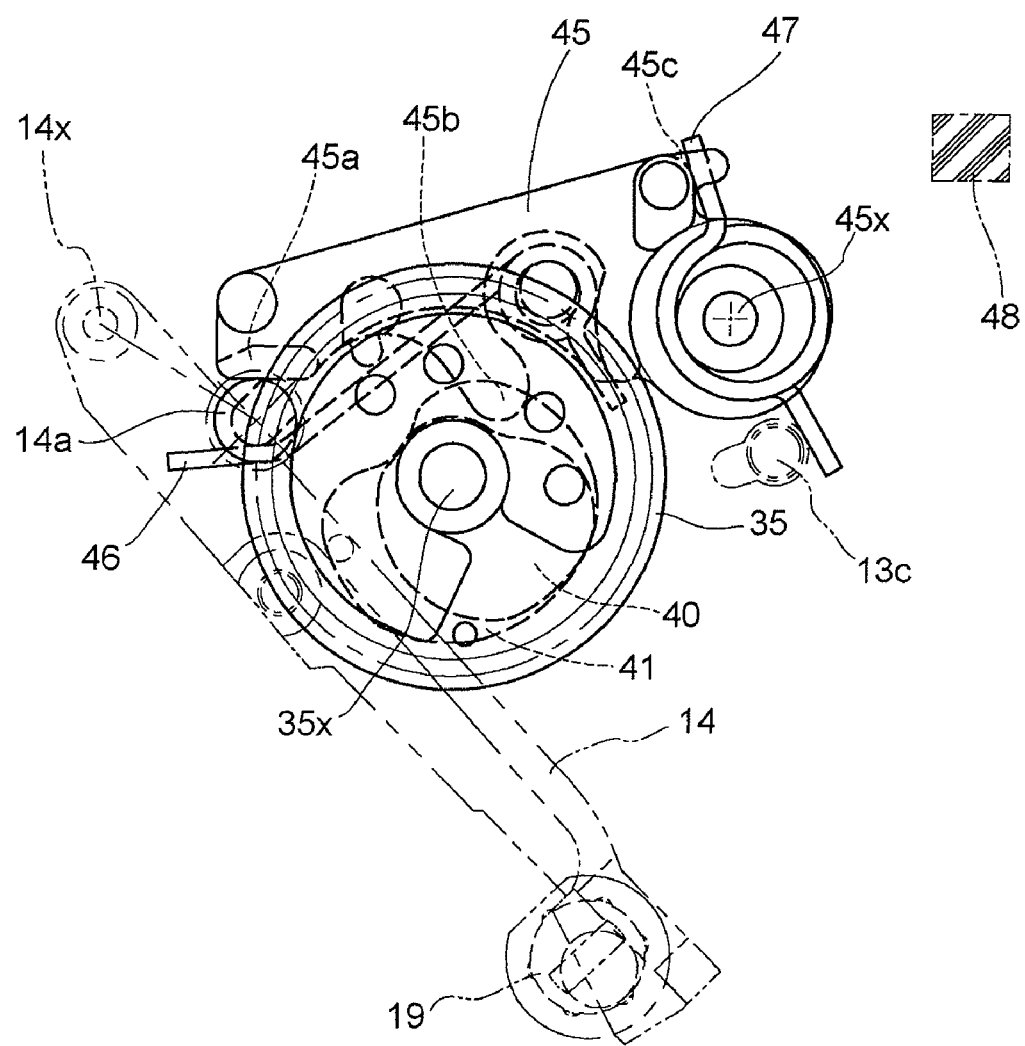
FIG. 11 a side elevational view of a portion of the mirror/shutter drive mechanism in a state where the mirror is held in the down position, in which the mirror is in contact with a limit pin, while a mirror drive lever is held in the mirror-down position.
Figure 15:
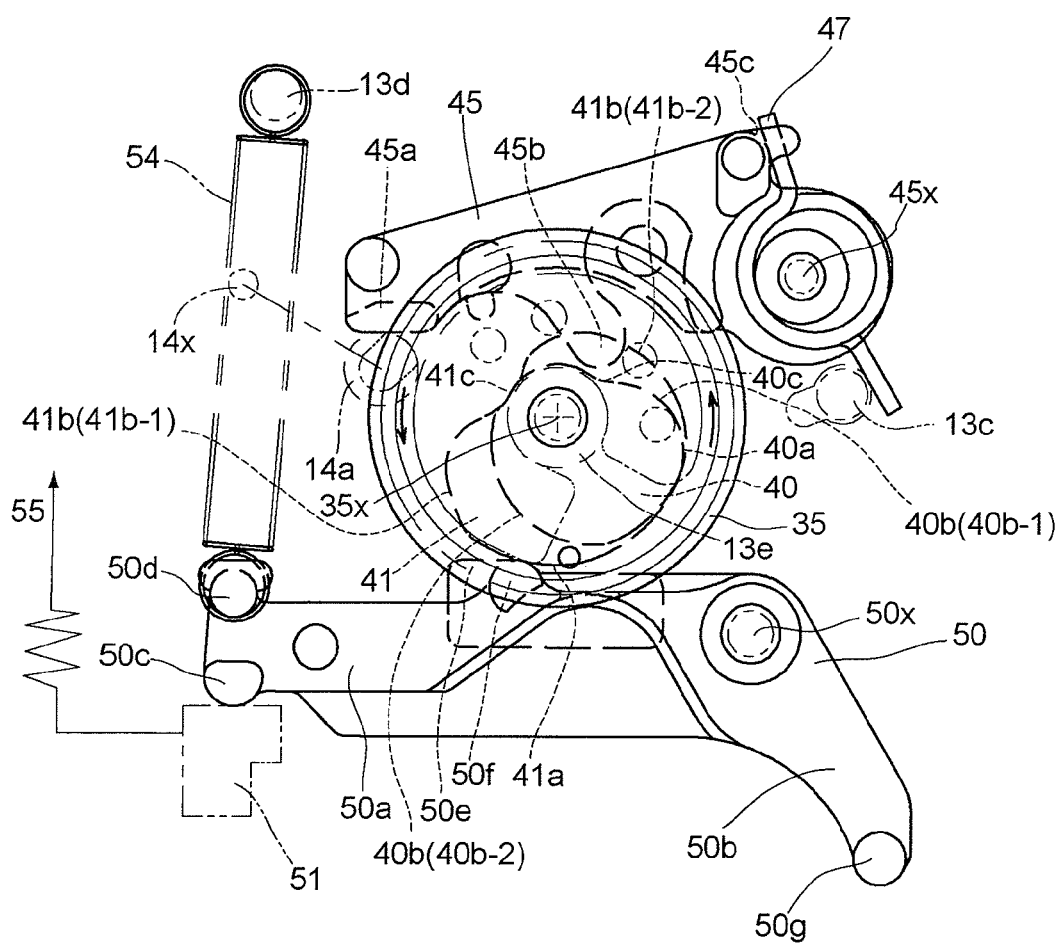
FIG. 15 is a side elevational view of the first cam-incorporated gear, the mirror drive lever, the shutter charge lever and associated elements, showing the relative positions between the first cam-incorporated gear, the mirror drive lever and the shutter charge lever when the first cam-incorporated gear is positioned at the origin position thereof shown in FIG. 5.

The mirror/shutter drive mechanism 20 is provided between a side of the mirror box 13 and the cover plate 21 with a mirror drive lever (an element of the first operating mechanism) 45 which is supported therebetween to be swingable about a rotational shaft 45x substantially parallel to the axis of the mirror sheet hinge 14x. The mirror drive lever 45 is provided in the vicinity of the free end thereof (left end with respect to FIGS. 5 through 8) with a mirror retaining portion 45a. The mirror 14 is provided on the mirror sheet thereof with a mirror sheet boss 14a which is held between the mirror retaining portion 45a and a mirror-up spring 46. The mirror 14 is driven to swing between the aforementioned down position and the aforementioned upward retracted position in accordance with the swing operation of the mirror drive lever 45. Namely, the mirror drive lever 45 is driven to swing between a mirror-down position (shown in FIGS. 5 and 15), in which the mirror 14 is held in the down position within a photographing optical path, and a mirror-up position (shown in FIGS. 6 through 8 and 16) in which the mirror 14 is held in the upward retracted position. The mirror drive lever 45 is biased to rotate toward the mirror-down position by a mirror-down spring 47. The mirror-down spring 47 is made up of a torsion spring which includes a coiled portion positioned around the rotational shaft 45$x$ of the mirror drive lever 45 and a pair of arms extending from the coiled portion. One of the pair of arms of the mirror-down spring 47 is hooked onto a spring hook 45$c$ of the mirror drive lever 45 and the other arm is hooked onto a spring engaging projection 13$c$ provided on a side of the mirror box 13. As shown in FIGS. 5 and 15, when the mirror drive lever 45 is in the mirror-down position, the mirror retaining portion 45$a$ presses the mirror sheet boss 14$a$ downward to hold the mirror 14 in the down position. As shown in FIGS. 3 and 11, a limit pin 19 which determines the down position of the mirror 14 is fixed to the mirror box 13, and the mirror drive lever 45 is held in the mirror down position by making the mirror retaining portion 45$a$ in contact the mirror sheet boss 14$a$ of the mirror 14, which is prevented from rotating by the limit pin 19. On the other hand, the mirror control cam 40 of the first cam-incorporated gear 35 can come in contact with a cam follower 45$b$ formed on the mirror drive lever 45. Rotating the first cam-incorporated gear 35 to the position (mirror-up completion position) shown in FIGS. 6, 7, 8 and 16 causes the mirror control cam 40 to press the cam follower 45$b$ upward, thus making it possible to hold the mirror drive lever 45 in the mirror-up position against the biasing force of the mirror-down spring 47. When the mirror drive lever 45 is in the mirror-up position, the mirror-up spring 46 lifts the mirror sheet boss 14$a$ to hold the mirror 14 in the upward retracted position. At this time, the mirror-up spring 46 is slightly bent to thereby absorb any error in the amount of rotation of the mirror drive lever 45, which makes it possible to hold the mirror 14 in the upward retracted position reliably. In addition, the mirror box 13 is provided therein with a shock absorber (mirror cushion) 48 against to which the mirror 14 in the vicinity of the front end (free end) thereof abuts upon the mirror 14 being retracted to the upward retracted position.

The mirror/shutter drive mechanism 20 is also provided between a side of the mirror box 13 and the cover plate 21 with a shutter charge lever (an element of the first operating mechanism/an element of the second operating mechanism) 50 which is supported therebetween to be swingable about a rotational shaft 50$x$ substantially parallel to the axis of the mirror sheet hinge 14$x$. The shutter charge lever 50 is provided with a first arm 50$a$ and a second arm 50$b$ which extend in different directions with the rotational shaft 50$x$ as a center. The shutter charge lever 50 is provided at a free end of the first arm 50$a$ with an end contacting portion 50$c$ which can come into contact with the free end of the shutter setting lever 51. The shutter charge lever 50 is swingable between two positions: a charge position (shown in FIGS. 5, 8, 15 and 18) to depress the shutter setting lever 51 to a shutter holding position via the end contacting portion 50$c$, and a charge release position (shown in FIGS. 6, 7, 16 and 17) to be disengaged from the shutter setting lever 51 to thereby allow the shutter setting lever 51 to move to the shutter release position (shown in FIGS. 6, 7, 16 and 17). The shutter charge lever 50 is biased to rotate toward the charge release position by a charge lever restoring spring 54. The charge lever restoring spring 54 is an extension spring, one and the other ends of which are hooked onto a spring engaging projection 50$d$ formed on the first arm 50$a$ and a spring engaging projection 13$d$ formed on a side of the mirror box 13, respectively. The limit of swing movement of the shutter charge lever 50 in the biasing direction of the charge lever restoring spring 54 (i.e., the charge release position of the shutter charge lever 50) is determined by making a stopper portion 50$e$ (see FIGS. 17 and 18) formed on the first arm 50$a$ come in contact with a swing limit protrusion 13$e$ (see FIGS. 3 through 8, 15 and 16). In addition, the first arm 50$a$ is provided thereon with a first cam follower 50$f$ and the second arm 50$b$ is provided thereon with a second cam follower 50$g$. The first cam follower 50$f$ and the second cam follower 50$g$ are substantially the same distance from the rotational shaft 50$x$. The first shutter control cam 41 of the first cam-incorporated gear 35 can come in contact with the first cam follower 50$f$ and the second shutter control cam 42 of the second cam-incorporated gear 36 can come in contact with the second cam follower 50$g$. When the first cam-incorporated gear 35 is at the position (origin position) shown in FIGS. 5 and 15, the shutter charge lever 50 can be held in the charge position against the biasing force of the charge lever restoring spring 54 by depressing the first cam follower 50$f$ via the first shutter control cam 41. Likewise, also by rotating the second cam-incorporated gear 36 to the position (shutter charge completion position) shown in FIGS. 8 and 18, the shutter charge lever 50 can be held in the charge position against the biasing force of the charge lever restoring spring 54 by pushing up the second cam follower 50$g$ via the second shutter control cam 42. Hence, the shutter charge lever 50 is shared between the first and second cam-incorporated gears 35 and 36 in the above-described manner.

The mirror/shutter drive mechanism 20 is further provided between a surface of the mirror box 13 and the cover plate 21 with a balancer lever 70 which is supported therebetween to be swingable about a rotational shaft 70$x$ substantially parallel to the axis of the mirror sheet hinge 14$x$. The balancer lever 70 is provided with a load arm 70$a$ and provided at a free end thereof with a cam follower 70$b$ capable of coming in contact with the second shutter control cam 42. The balancer lever 70 is biased to rotate by a balancer lever biasing spring 71 in a direction to make the cam follower 70$b$ in contact with the second shutter control cam 42, i.e., in the counterclockwise direction with respect to FIGS. 8, 17 and 18. The balancer lever biasing spring 71 is configured from a torsion spring which includes a coiled portion positioned around the rotational shaft 70$x$ of the balancer lever 70 and a pair of arms extending from the coiled portion. One of the pair of arms of the balancer lever biasing spring 71 is engaged with a limit arm 70$c$ of the balancer lever 70 which extends in a different direction from the load arm 70$a$ and the other arm is engaged with a spring engaging projection 13$f$ formed on a side of the mirror box 13. The limit of swing movement of the balancer lever 70 in the biasing direction of the balancer lever biasing spring 71 is determined by making the limit arm 70$c$ of the balancer lever 70 in contact with a swing movement limit protrusion 13$b$ of the mirror box 13.

In addition to the mirror/shutter drive mechanism 20, the camera body 10 is provided with a diaphragm control mechanism 27 (conceptually shown in FIG. 1) for controlling driving of an adjustable diaphragm 12$b$ provided in the lens barrel 12. The diaphragm control mechanism 27 is driven by a drive source different from the drive motor 22 of the mirror/shutter drive mechanism 20. During a live view operation (real-time preview operation) that will be discussed later, the size of the aperture opening (f-number) of the adjustable diaphragm 12$b$ can be adjusted according to brightness information of the object image obtained via the image sensor 16.

Figure 2:
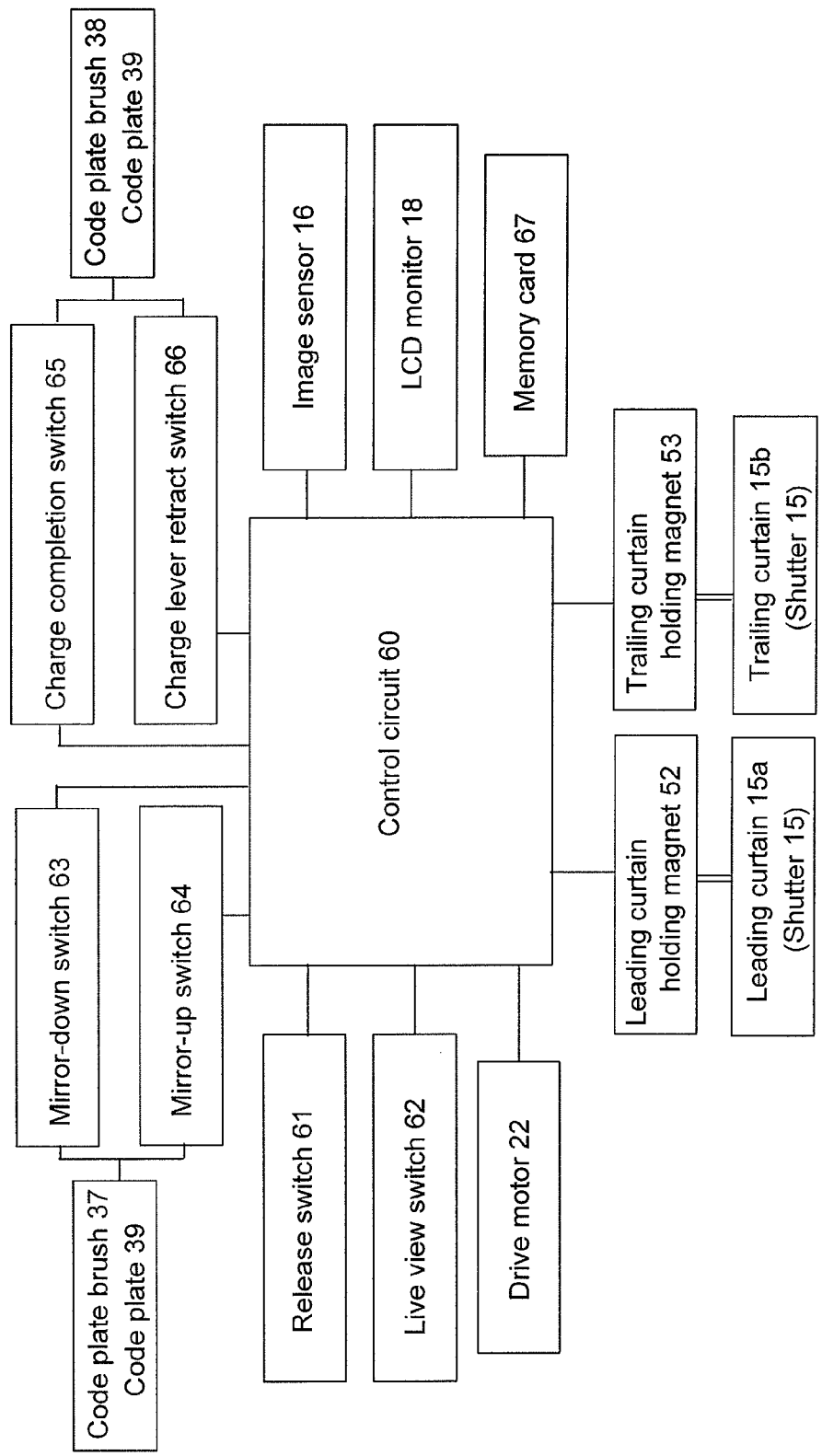
FIG. 2 is a block diagram of main elements of a control system of the SLR camera.

FIG. 2 is a block diagram showing main elements of a control system of the camera 10. Although the camera 10 is equipped with an exposure control system, which is associated with settings of the f-number that are determined by the diaphragm control mechanism 27 and settings of the shutter speed, and an autofocus system that operates based on object distance information, such systems are omitted from the block diagram in FIG. 2 for the sake of brevity. As shown in FIG. 2, the control system is provided with a control circuit 60, and is provided with a release switch 61, a live view switch 62, a mirror-down switch 63, a mirror-up switch 64, a charge completion switch 65 and a charge lever retract switch 66 that are all connected to the control circuit 60. In response to signals input from the release switch 61, the live view switch 62, the mirror-down switch 63, the mirror-up switch 64, the charge completion switch 65 and the charge lever retract switch 66, the control circuit 60 controls the operations of the drive motor 22, the leading-curtain holding magnet 52 and the trailing-curtain holding magnet 53 in accordance with programs stored in internal memory. The release switch 61 can be turned ON by depressing a release button (not shown) provided on an outer surface of the camera body 11. The live view switch 62 can be turned ON and OFF by depressing a live view button (not shown) provided on the outer surface of the camera body 11.

The ON/OFF states of the mirror-down switch 63 and the mirror-up switch 64 are input to the control circuit 60 as rotational position information of the first cam-incorporated gear 35 that is detected by the code plate brush 37 and the code plate 39. More specifically, the mirror-down switch 63 is turned ON upon the first cam-incorporated gear 35 rotating to the rotational position (origin position) shown in FIGS. 5 and 15, and the mirror-up switch 64 is turned ON upon the first cam-incorporated gear 35 rotating to the rotational position (mirror-up completion position) shown in FIGS. 6 and 16. The ON/OFF states of the charge completion switch 65 and the charge lever retract switch 66 are input to the control circuit 60 as rotational position information of the second cam-incorporated gear 36 that is detected by the code plate brush 38 and the code plate 39. More specifically, the charge completion switch 65 is turned ON upon the second cam-incorporated gear 36 rotating to the rotational position (shutter charge completion position) shown in FIGS. 8 and 18, and the charge lever retract switch 66 is turned ON upon the second cam-incorporated gear 36 rotating to the rotational position (origin position) shown in FIGS. 7 and 17.

The control circuit 60 includes an image processing circuit. This image processing circuit processes object image formed on the light receiving surface of the image sensor 16 to produce electronic image data, stores this produced image data in a recording medium such as a memory card 67, and makes the LCD monitor 18 display the electronic image.

Operations of the camera 10 that has the above described structure will be discussed hereinafter. The rotational directions of the cam-incorporated gears 35, 36 which will be referred in the following descriptions about operations of the camera 10 are based on the drawings in FIGS. 5 through 11 and 15 through 30.

FIGS. 5 and 15 show an initial state of the mirror/shutter drive mechanism 20 in normal exposure mode (normal view mode/optical view mode). In this initial state, the mirror drive lever 45 (the cam follower 45b) has not yet been lifted by the mirror control cam 40 of the first cam-incorporated gear 35; the mirror drive lever 45 is held in the mirror-down position by the biasing force of the mirror-down spring 47, and accordingly, the mirror 14 is held in the down position. In addition, the first cam follower 50f has been depressed by the first shutter control cam 41 of the first cam-incorporated gear 35, so that the shutter charge lever 50 is held in the charge position against the biasing force of the charge lever restoring spring 54. The shutter setting lever 51 has been depressed by the end contacting portion 50c of the shutter charge lever 50 to be held in the shutter holding position. On the other hand, the second shutter control cam 42 of the second cam-incorporated gear 36 is spaced away from the second cam follower 50g and thus not involved in the position control for the shutter charge lever 50. At this time, the shutter 15 has been already charged, and the presence of the shutter setting lever 51 in the shutter holding position mechanically prevents the leading curtain 15a and the trailing curtain 15b from traveling. Additionally, each of the leading curtain holding magnet 52 and the trailing curtain holding magnet 53 is in the OFF state. The rotational positions of the first cam-incorporated gear 35 and the second cam-incorporated gear 36 when the mirror/shutter drive mechanism 20 is in the above described initial state are designated as the origin positions of the first cam-incorporated gear 35 and the second cam-incorporated gear 36, respectively. In addition, in the initial state of the mirror/shutter drive mechanism 20, the planetary gear mechanism 30 is in a state where the planet gear 33 is in mesh with the first cam-incorporated gear 35 (see FIG. 9).

Figure 12:
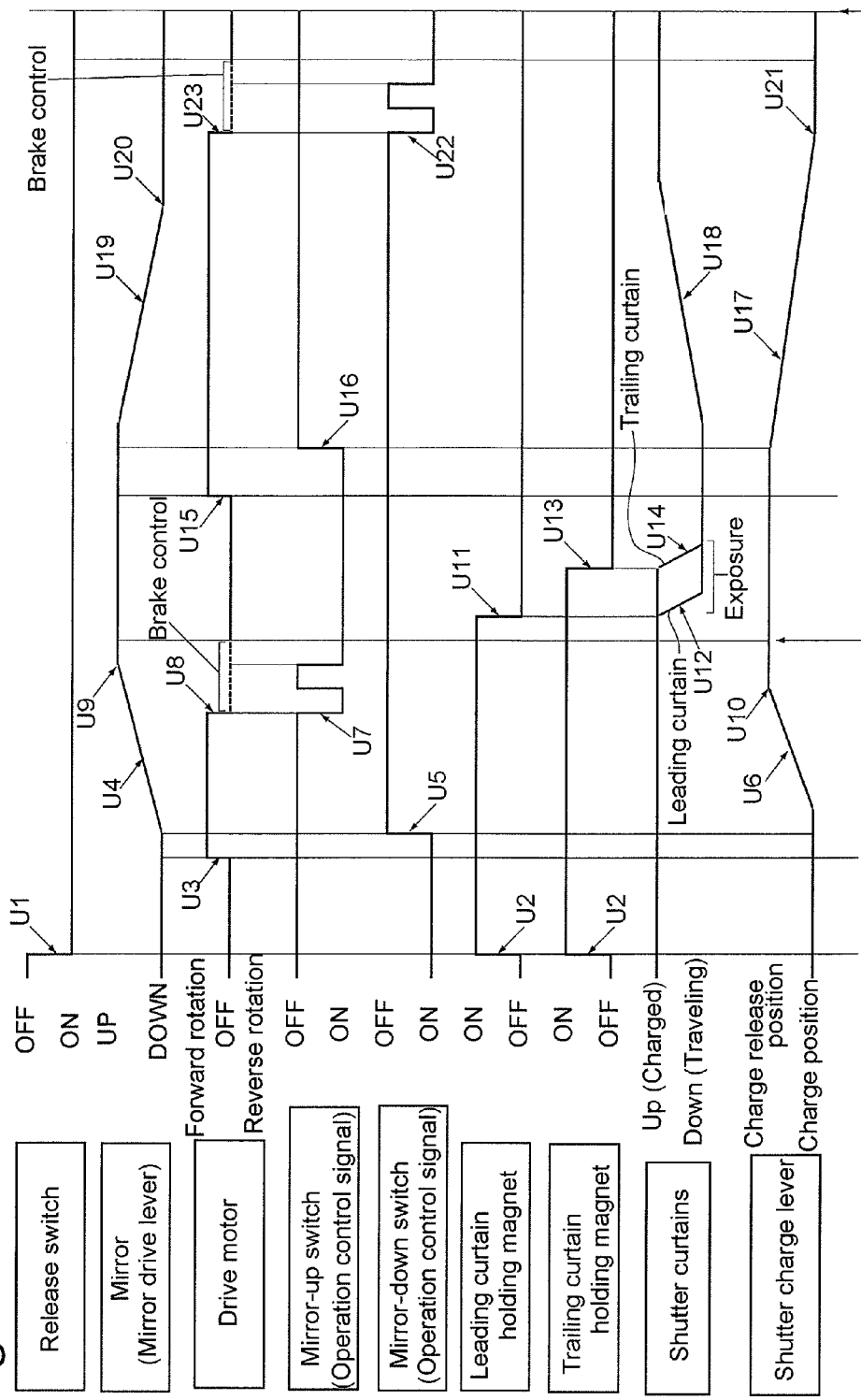
FIG. 12 is a timing chart showing a normal photography operational-sequence in normal exposure mode (normal view mode/optical view mode)

In this initial state, upon the release switch 61 being turned ON, a photographing operation in the normal exposure mode that is shown in the timing chart shown in FIG. 12 is performed. In the normal exposure mode, the driving of the drive motor 22 is controlled so that the motor pinion 23 rotates counterclockwise with respect to FIG. 5. This direction of rotation of the drive motor 22 will be hereinafter referred to as the forward rotational direction. In addition, the driving direction of the drive motor 22 to rotate the motor pinion 23 in the reverse direction, i.e., clockwise with respect to FIG. 5 will be hereinafter referred to as the reverse rotational direction. Upon the release switch 61 being turned ON (see U1 shown in FIG. 12; refer to FIG. 12 when a numeral with the prefix "U" is found in the following descriptions), firstly the leading curtain holding magnet 52 and the trailing curtain holding magnet 53 are energized to electromagnetically hold the leading curtain 15a and the trailing curtain 15b (see U2). At this point, exposure control (photometering operation and selection of an f-number and a shutter speed), various calculations for AF control and communications with the lens barrel 12 are performed; detailed descriptions thereof will be omitted herein.

Subsequently, the drive motor 22 is driven forward (see U3) to rotate the sun gear 31 counterclockwise with respect to FIG. 5 via the motor pinion 23 and the reduction gears 24, 25 and 26. Although this rotational direction of the sun gear 31 is a rotational direction to bring the planetary gear arm (swing arm) 32 and the planet gear 33 close to the first cam-incorporated gear 35, the planet gear 33 is already engaged with the first cam-incorporated gear 35, and the planetary gear arm 32 is prevented from rotating in the same rotational direction by the engagement between the sub-arm 32a and the swing movement limit protrusion 13a. Therefore, the counterclockwise direction of the sun gear 31 causes the planet gear 33 to rotate clockwise with respect to FIG. 5 without changing the position of the axis thereof, thus causing the first cam-incorporated gear 35 to rotate counterclockwise with respect to FIG. 5. A predetermined amount of rotation of the first cam-incorporated gear 35 from the origin position causes the mirror control cam 40 to come into contact with the cam follower 45b and press the cam follower 45b to rotate the mirror drive lever 45 toward the mirror-up position. Thereupon, the mirror sheet boss 14a is pushed up by the mirror-up spring 46, which causes the mirror 14 to rotate toward the upper retracted position from the down position (see U4). The predetermined amount of rotation of the first cam-incorporated gear 35 from the origin position causes the contact position of the code plate brush 37 with the code plate 39 to vary to thereby turn OFF the mirror down switch 63 (see U5). Additionally, during the counterclockwise rotation of the first cam-incorporated gear 35 from the origin position, the first shutter control cam 41 gradually reduces the amount of depression against the first cam follower 50*f*, and the shutter charge lever 50 is rotated from the charge position toward the charge release position by the biasing force of the charge lever restoring spring 54 (see U6). Following this rotation of the shutter charge lever 50, the shutter setting lever 51 is also rotated toward the shutter release position from the shutter holding position by the biasing force of the setting lever restoring spring 55.

Figure 6:
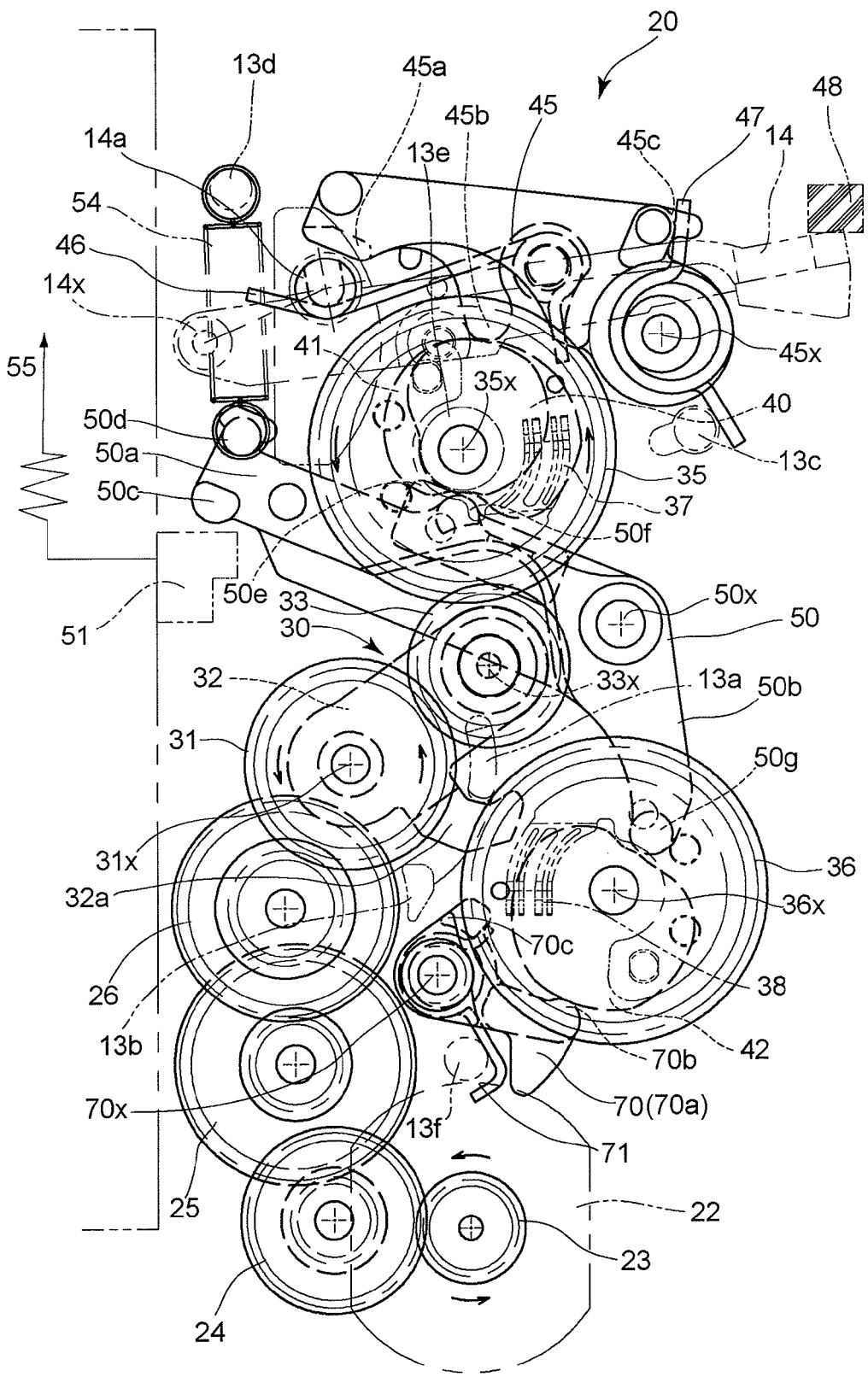
FIG. 6 is a side elevational view of the mirror/shutter drive mechanism in an exposure-possible state in which the mirror is held in the retracted position and a shutter charge lever is held in the charge release position.
Figure 16:
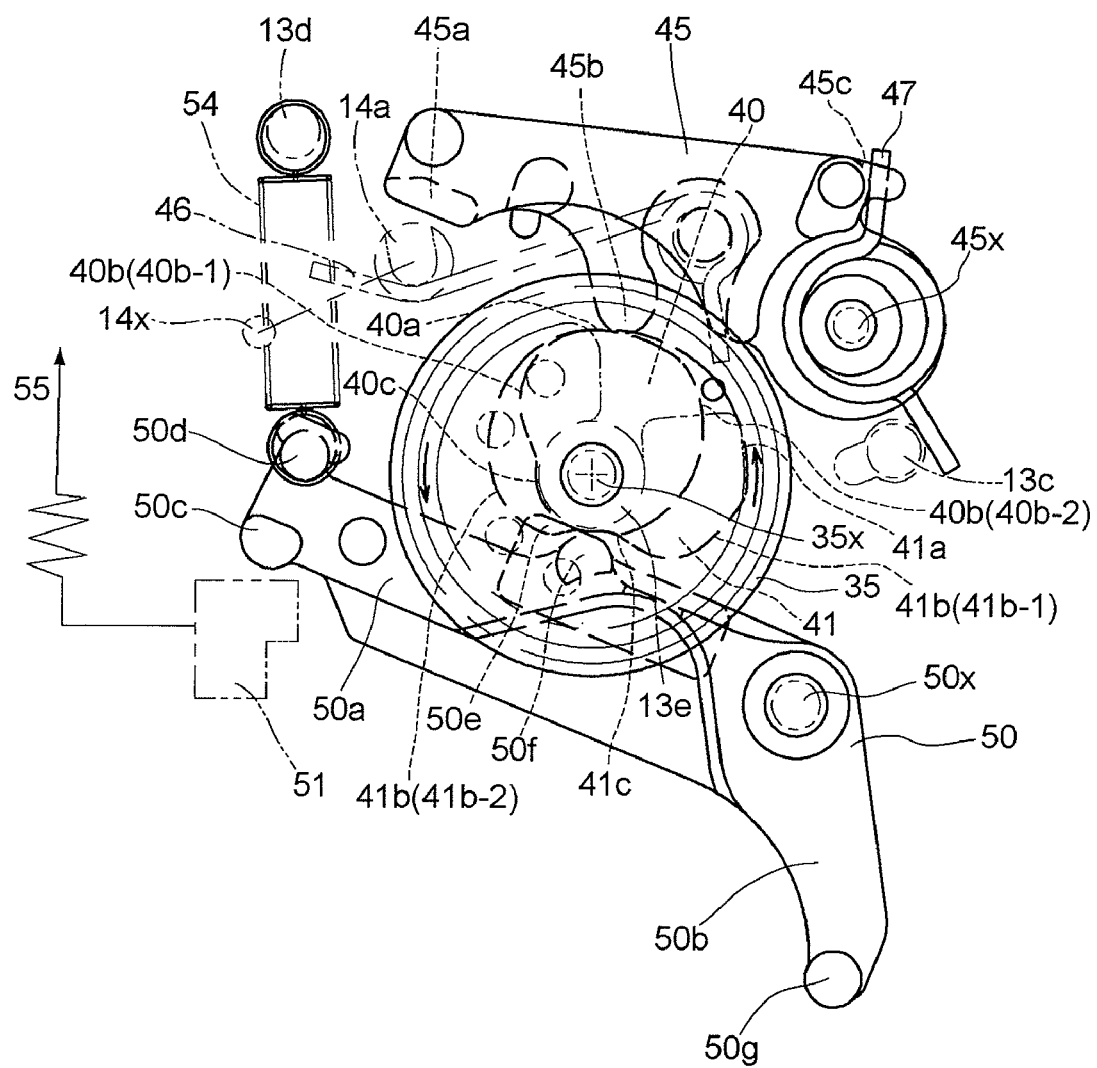
FIG. 16 is a side elevational view of the first cam-incorporated gear, the mirror drive lever, the shutter charge lever and associated elements, showing the relative positions between the first cam-incorporated gear, the mirror drive lever and the shutter charge lever when the first cam-incorporated gear is positioned at the origin position thereof shown in FIG. 6.

Upon the first cam-incorporated gear 35 being rotated to the mirror-up completion position shown in FIGS. 6 and 16, the mirror-up switch 64 is turned ON (see U7). Upon the ON signal being input to the control circuit 60 from the mirror-up switch 64, the forward rotation of the drive motor 22 is stopped (see U8). Thereupon, the mirror-up operation (upward rotations of the mirror 14 and the mirror drive lever 45) and the retracting operation (upward rotation) of the shutter charge lever 50 are stopped, and the mirror 14 and the mirror drive lever 45 are held in the upward retracted position and the mirror-up position, respectively (see U9), and the shutter charge lever 50 is held in the charge release position (see U10). At this time, the mirror/shutter drive mechanism 20 is in an exposure possible state shown in FIGS. 6 and 16. Subsequently, after the drive motor 22 is stopped, the passage of current through the leading curtain holding magnet 52 is stopped (see U11), so that the leading curtain 15*a* of the shutter 15 the mechanical lock of which has been already released travels (see U12). Subsequently, the lapse of time for opening-shutting the shutter 15 based on the set shutter speed is checked, the passage of current through the trailing curtain holding magnet 53 is stopped (see U13) upon a lapse of a predetermined period of time from the commencement of travel of the leading curtain 15*a*, and thereupon the trailing curtain 15*b* of the shutter 15 commences traveling (see U14). Due to such a difference in commencement of travel between the leading curtain 15*a* and the trailing curtain 15*b*, object light is incident on the light receiving surface of the image sensor 16, and thereupon an exposure operation is performed.

Upon completion of this exposure operation, the drive motor 22 is driven forward (see U15), the restoring operation of the mirror 14 and the shutter charge operation are performed. First, the mirror-up switch 64 is turned OFF by a rotation of the first cam-incorporated gear 35 from the mirror-up completion position shown in FIGS. 6 and 16 (see U16). Additionally, the first shutter control cam 41 depresses the first cam follower 50*f* as the first cam-incorporated gear 35 rotates, which causes the shutter charge lever 50 to rotate toward the charge position from the charge release position against the biasing forces of the charge lever restoring spring 54 and the setting lever restoring spring 55 (see U17). This rotation of the shutter charge lever 50 causes the shutter setting lever 51 to be depressed, thus causing the leading curtain 15*a* and the trailing curtain 15*b* of the shutter 15 to be charged (see U18). In addition, as the first cam-incorporated gear 35 rotates, the amount of lifting of the cam follower 45*b* by the mirror control cam 40 is gradually reduced, so that the mirror drive lever 45 is rotated toward the mirror-down position from the mirror-up position by the biasing force of the mirror-down spring 47. Due to this rotation of the mirror drive lever 45, the mirror retaining portion 45*a* depresses the mirror sheet boss 14*a*, thus causing the mirror 14 to rotate toward the down position from the upward retracted position (see U19).

At the time the first cam-incorporated gear 35 rotates by one revolution to return to the origin position, the rotation of the mirror 14 to the down position (the rotation of the mirror drive lever 45 to the mirror-down position) and the rotation of the shutter charge lever 50 to the charge position have been completed (see U20 and U21). Upon detection of a change in the ON/OFF state of the mirror-down switch 63 from an OFF state to an ON state immediately after the first cam-incorporated gear 35 reaches the origin position (see U22), the forward driving of the drive motor 22 is stopped (see U23), so that the mirror/shutter drive mechanism 20 returns to the initial position shown in FIGS. 5 and 15. Namely, in a single photographing operation (sequence of processes for taking a picture) in normal exposure mode, the first cam-incorporated gear 35 is rotated by one revolution and operations associated with the mirror 14 (the mirror drive lever 45) and the shutter 15 (the shutter charge lever 50) are controlled.

Figure 13:
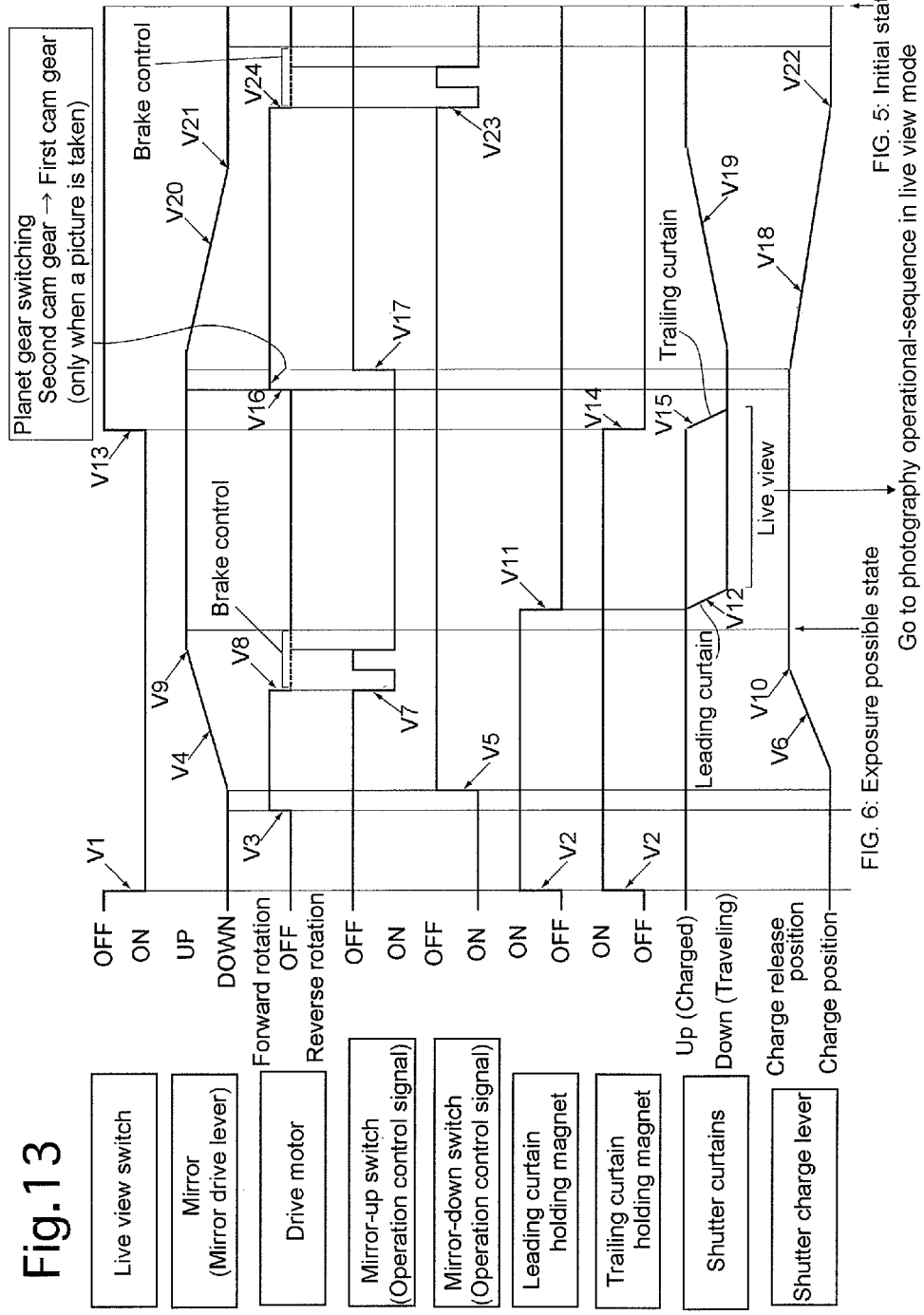
FIG. 13 is a timing chart showing an operational sequence of the live view mode.

In the initial state of the mirror/shutter drive mechanism 20 that is shown in FIGS. 5 and 15, upon the live view switch 62 being turned ON (see V1 shown in FIG. 13; refer to FIG. 13 when a numeral with the prefix "V" is found in the following descriptions), the camera 10 enters live view mode (live-view exposure mode) shown in the timing chart in FIG. 13. In the live view mode, the camera 10 operates in the same manner as in normal exposure mode until entering the exposure possible state shown in FIGS. 6 and 16. Namely, the controls and operations at V2 through V10 shown in FIG. 13 are identical to the above described controls and operations at U2 through U10 shown in FIG. 12; the forward driving of the drive motor 22 (see V3) causes the first cam-incorporated gear 35 to rotate from the origin position to the mirror-up completion position, and during this rotation of the first cam-incorporated gear 35 the mirror-up operation (see V4 and V9) and the retracting operation of the shutter charge lever 50 (see V6 and V10) are performed. Upon the first cam-incorporated gear 35 reaching the mirror-up completion position shown in FIGS. 6 and 16, the passage of current through the leading curtain holding magnet 52 is cut off (stopped) (see V11), which causes the leading curtain 15*a* of the shutter 15 to travel (V12). Subsequently, unlike in the case of normal exposure mode, the trailing curtain 15*b* does not travel following the leading curtain 15*a*, so that the shutter 15 is held open. Therefore, rays of light entering through the photographic lens 12*a* continue to be incident on the light receiving surface of the image sensor 16, and an electronic object image thus captured by the image sensor 16 is indicated in real-time on the LCD monitor 18 via image processing. On the other hand, since the mirror 14 is in the upward retracted position, the object image cannot be seen through the viewfinder 17.

At this stage, turning off the live view switch 62 (see V13) de-energizes the trailing curtain holding magnet 53 (see V14) and thereupon the trailing curtain commences to travel (see V15). Subsequently, the drive motor 22 is driven forward (see V16), and thereafter, operations for making the mirror/shutter drive mechanism 20 return to the initial position that are similar to the above described controls and operations at U16 through U23 shown in FIG. 12 are performed (see V17 through V24). Namely, the first cam-incorporated gear 35 rotates from the mirror-up completion position shown in FIGS. 6 and 16 to the origin position shown in FIGS. 5 and 15, and during this rotation the mirror-down operation (see V20 and V21) and the shutter charge operation (V18, V19 and V22) are performed.

Figure 7:
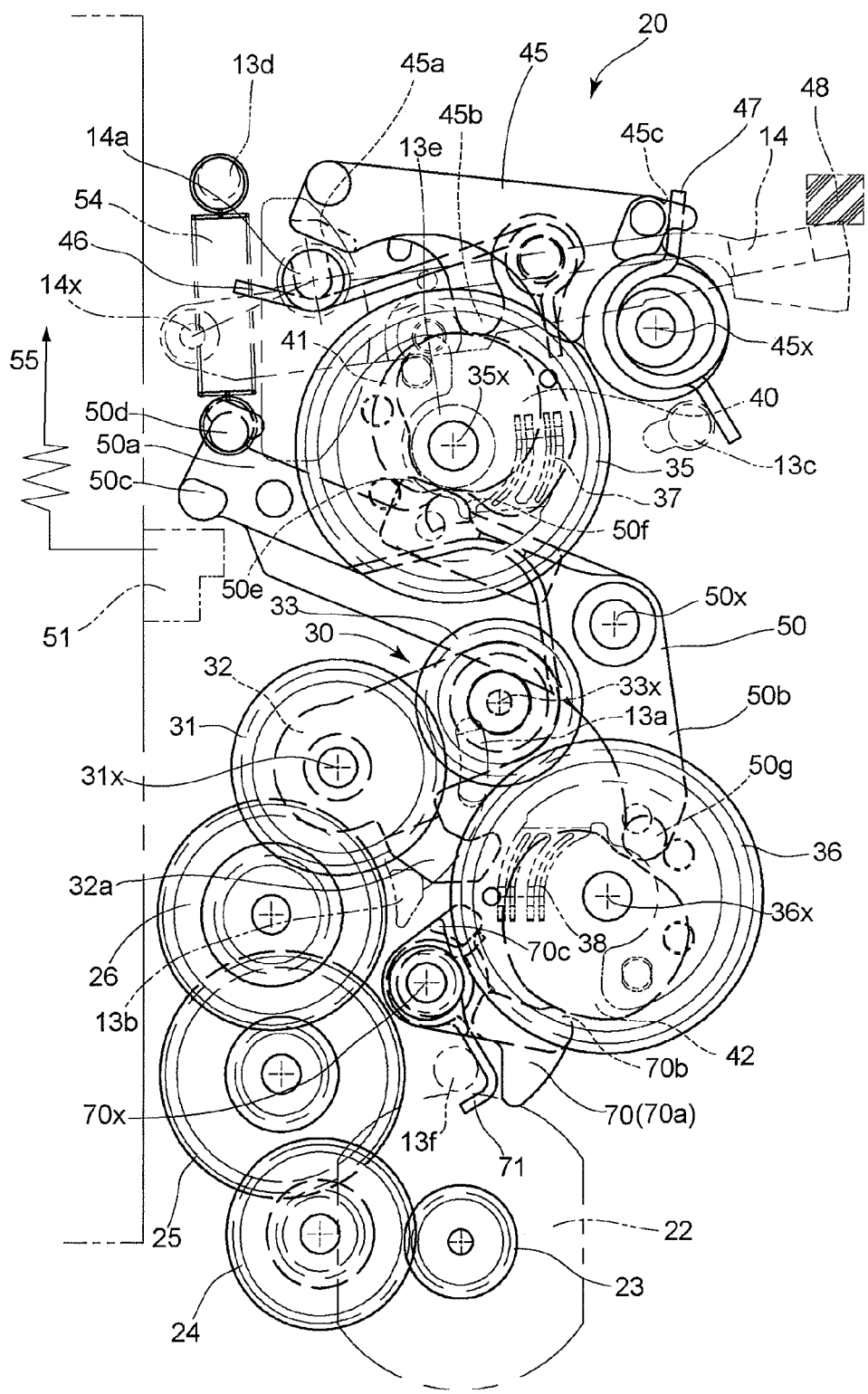
FIG. 7 is a side elevational view of the mirror/shutter drive mechanism in a state where a driving force has become transmittable to the second cam-incorporated gear via a planetary gear mechanism by a reverse drive of a motor from the exposure possible state shown in FIG. 6 when a photographing operation is performed in the live view mode.
Figure 14:
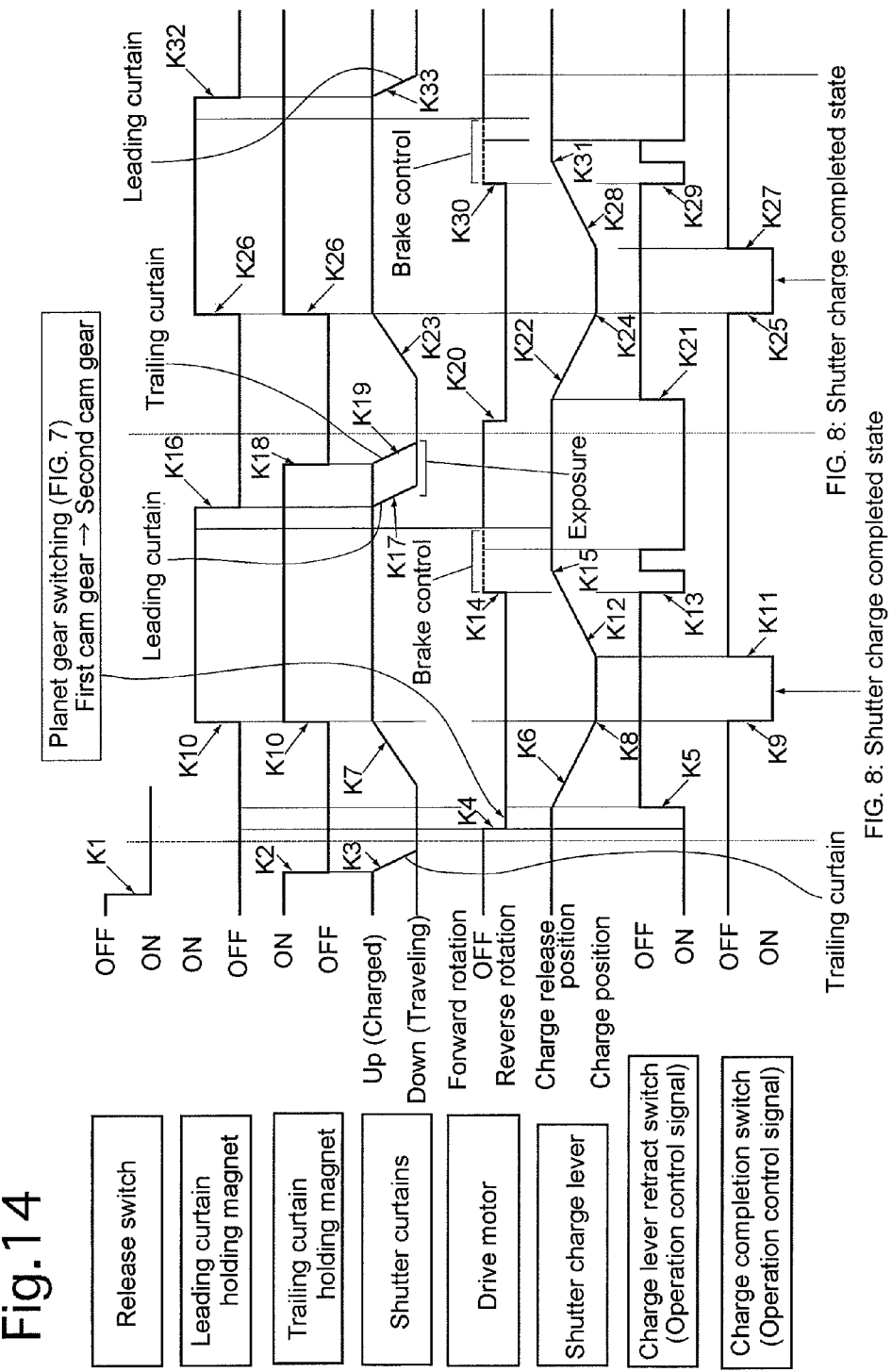
FIG. 14 is a timing chart showing a photographing operation in the live view mode.
Figure 17:
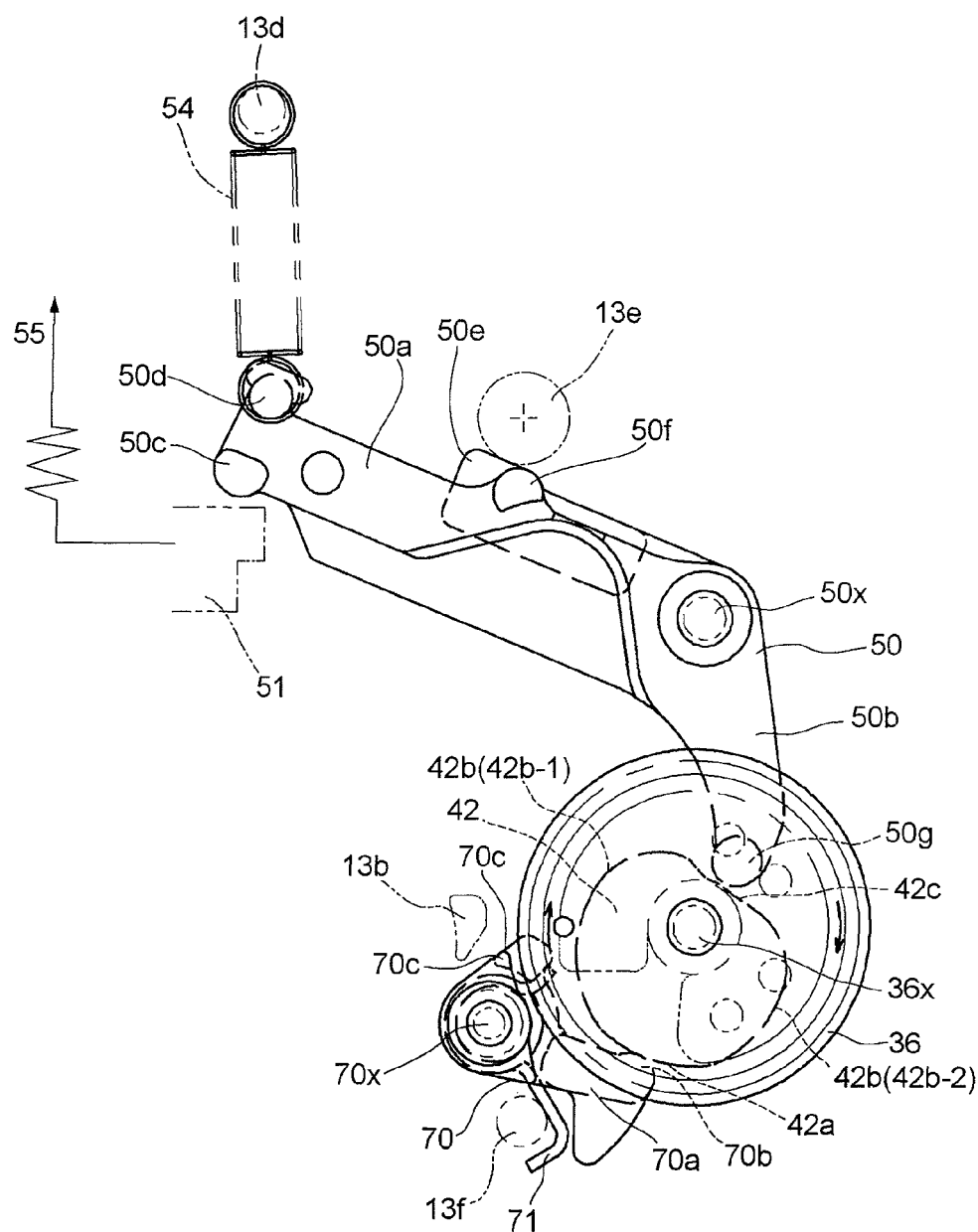
FIG. 17 is a side elevational view of the second cam-incorporated gear, the shutter charge lever, a balancer lever and associated elements, showing the relative position between the second cam-incorporated gear, the shutter charge lever and the balancer lever when the second cam-incorporated gear is positioned at the origin position thereof shown in FIG. 7.

On the other hand, in the live view mode (in this state the mirror/shutter drive mechanism 20 is in the state shown in FIGS. 6 and 16) after the traveling of the leading curtain 15*a* (V12) shown in FIG. 13, a photographing operation can be performed by turning ON the release switch 61. The timing chart shown in FIG. 14 shows this photographing operation in the live view mode. Upon the release switch 61 being turned ON (see K1 shown in FIG. 14; refer to FIG. 14 when a numeral with the prefix "K" is found in the following descriptions), firstly the passage of current through the trailing curtain holding magnet 53 is cut off (see K2), which causes the trailing curtain 15b to travel to temporarily shut the shutter 15. Thereupon, the shutter 15 is in an uncharged state, therefore the shutter 15 is recharged for the subsequent photographing operation. Although a shutter charge operation is performed by rotating the first cam-incorporated gear 35 by a forward rotation of the drive motor 22 in normal exposure mode shown in FIG. 12, the drive motor 22 is driven reverse (see K4) after completion of travel of the trailing curtain 15b when a picture is taken in the live view mode. The reverse driving of the drive motor 22 causes the sun gear 31 to rotate clockwise with respect to FIG. 6 via the motor pinion 23 and the reduction gears 24, 25 and 26. The planet gear 33 is pressed against the planetary gear arm 32 with a predetermined degree of friction by the biasing force of the planetary gear friction spring 34, and accordingly, this clockwise rotation of the sun gear 31 causes the planet gear 33 to revolve around the sun gear 31 while rotating the planet gear arm 32 clockwise with respect to FIG. 6 about the rotational shaft 31x, thus causing the planet gear 33 to be disengaged from the first cam-incorporated gear 35 and be engaged with the second cam-incorporated gear 36 (see FIG. 10). FIGS. 7 and 17 show a state of the planetary gear mechanism 30 immediately after the planet gear 33 is engaged with the second cam-incorporated gear 36 after disengagement from the first cam-incorporated gear 35. The second cam-incorporated gear 36 continues to be held at the origin position since no motor driving force is transmitted to the second cam-incorporated gear 36 from the initial state shown in FIGS. 5 and 15 to the exposure possible state shown in FIGS. 6 and 16, and remains at the origin position even in the state shown in FIGS. 7 and 17. Thereafter, upon the planet gear 33 being engaged with the second cam-incorporated gear 36, the engagement between the sub-arm 32a and the swing movement limit protrusion 13b prevents the planetary gear arm 32 from further rotating, and from then on the second cam-incorporated gear 36 is rotated clockwise from the origin position shown in FIGS. 7 and 17 by a reverse driving force of the drive motor 22. The balancer lever 70 is for applying an appropriate load to the second cam-incorporated gear 36 while the second cam-incorporated gear 36 is driven to rotate for making the planet gear 33 and the second cam-incorporated gear 36 reliably engage with each other. Details on the function of the balancer lever 70 will be discussed later.

When taking a picture in the live view mode, the driving operation of the drive motor 22 is controlled by the charge completion switch 65 and the charge lever retract switch 66 that are turned ON and OFF according to the rotational position (relative position between the code plate brush 38 and the code plate 39) of the second cam-incorporated gear 36. When the second cam-incorporated gear 36 is at the origin position as shown in FIGS. 7 and 17, the charge lever retract switch 66 is ON due to contact engagement between the code plate brush 38 and the cod plate 39; however, a rotation of the second cam-incorporated gear 36 from the origin position changes the relative contact position between the code plate brush 38 and the code plate 39 to thereby turn OFF the charge lever retract switch 66 (see K5). Subsequently, a predetermined amount of rotation of the second cam-incorporated gear 36 from the origin position causes the second shutter control cam 42 to come into contact with the second cam follower 50g and lift the second cam follower 50g to rotate the shutter charge lever 50 from the charge release position toward the charge position against the biasing force of the charge lever restoring spring 54 (see K6). This rotation of the shutter charge lever 50 causes the shutter setting lever 51 to rotate from the shutter release position toward the shutter holding position against the biasing force of the setting lever restoring spring 55 so that a shutter charge operation for the leading curtain 15a and the trailing curtain 15b is performed (see K7). Upon the second cam-incorporated gear 36 reaching the shutter charge completion position shown in FIGS. 8 and 18, the shutter charge lever 50 is positioned in the shutter charge position, which completes the shutter charge operation (see K8). Thereupon, the charge completion switch 65 is turned ON (see K9). In response to this signal input from the charge completion switch 65, the leading curtain holding magnet 52 and the trailing-curtain holding magnet 53 are energized to hold the leading curtain 15a and the trailing curtain 15b magnetically (see K10).

Even after the completion of this shutter charge operation, the drive motor 22 continues to be driven reverse to rotate the second cam-incorporated gear 36, which causes the charge completion switch 65 to be turned OFF (see K11). Subsequently, the lifted state of the second cam follower 50g by the second shutter control cam 42 is gradually released, which causes the shutter charge lever 50 to rotate from the charge position shown in FIGS. 8 and 18 toward the charge release position shown in FIGS. 7 and 17 by the biasing force of the charge lever restoring spring 54 (see K12). After a short period of time, the charge lever retract switch 66 is turned ON (see K13), and in response to this ON signal from the charge lever retract switch 66, the reverse driving of the drive motor 22 is stopped (see K14). At this time, the second cam-incorporated gear 36 has already returned to the origin position shown in FIGS. 7 and 17, and the shutter charge lever 50 is held in the charge release position by the biasing force of the charge lever restoring spring 54 (see K15). In addition, following the shutter charge lever 50, the shutter setting lever 51 is also held in the shutter release position by the biasing force of the setting lever restoring spring 55.

Similar to the normal exposure mode, the passage of current through the leading curtain holding magnet 52 is stopped (see K16), and thereupon the leading curtain 15a of the shutter 15 travels (see K17). Subsequently, upon a lapse of a predetermined period of time corresponding to the set shutter speed, the passage of current through the trailing curtain holding magnet 53 is stopped (see K18), and thereupon the trailing curtain 15b travels (see K19) to perform an exposure operation. After completion of this exposure operation, the shutter 15 is shut, and accordingly, the second cam-incorporated gear 36 is rotated one more revolution from the origin position to open the shutter 15 so that the camera 10 moves back to a live view state, in which an electronic object image captured by the image sensor 16 is indicated in real-time on the LCD monitor 18. Controls and operations performed through the above-mentioned one more revolution of the second cam-incorporated gear 36 are similar to the above described controls and operations at K4 through K15, and therefore will be briefly discussed hereinafter. First, after the traveling of the trailing curtain 15b, the drive motor 22 is driven in reverse to make the second cam-incorporated gear 36 commence rotating (see K20), and thereafter the charge lever retract switch 66 is turned OFF (see K21). Following the rotation of the second cam-incorporated gear 36, the second shutter control cam 42 again comes into contact with the second cam follower 50g and lifts the second cam follower 50g, which causes the shutter charge lever 50 to rotate from the charge release position toward the charge position (see K22), so that the shutter 15 is charged (see K23). After a short period of time, upon the second cam-incorporated gear 36 reaching the shutter charge completion position shown in FIGS. 8 and 18, the shutter charge lever 50 is held in the charge position (see K24), the charge completion switch 65 is turned ON (see K25), and in response to this ON signal from the charge completion switch 65 the leading curtain holding magnet 52 and the trailing curtain holding magnet 53 are energized to hold the leading curtain 15a and the trailing curtain 15b, respectively (see K26). Subsequently, the reverse driving of the drive motor 22 continues, the charge completion switch 65 is turned OFF (see K27), and the pressed state of the second cam follower 50g by the second shutter control cam 42 is gradually released, which causes the shutter charge lever 50 to rotate to the charge release position again by the biasing force of the charge lever restoring spring 54 (see K28). In a short period of time thereafter, it is detected that the charge lever retract switch 66 is turned ON (see K29), and thereupon the reverse driving of the drive motor 22 is stopped (see K30), and the shutter charge lever 50 is held in the charge release position (see K31). At this stage, the passage of current through the leading curtain holding magnet 52 is cut off (see K32) so that the leading curtain 15a travels (see K33) and the trailing curtain 15b is held so that it does not travel, thereby moving the camera 10 into the same live view state as that after the traveling of the leading curtain 15a at the operation V12 shown in FIG. 13.

When a picture is taken in the live view mode shown in FIG. 14, the planet gear 33 is in mesh with the second cam-incorporated gear 36 while the first cam-incorporated gear 35 remains in the mirror-up completion position shown in FIGS. 6 through 8 and 16, so that the mirror 14 remains held in the upper retracted position. Namely, when a picture is taken in the live view mode, the mirror 14 does not perform an up/down operation at all.

In live view state after the travel of the leading curtain at K33, upon the live view switch 62 is turned OFF to end the live view mode, operations similar to the above described operations at V13 through V22 shown in FIG. 13 are performed and the mirror-shutter drive mechanism 20 returns to the initial state shown in FIGS. 5 and 15. However, after the completion of the photographing operation in the live view mode shown in FIG. 14, the planet gear 33 is engaged with the second cam-incorporated gear 36, not with the first cam-incorporated gear 35, which is different from the case where control exits the live view mode without making the mirror-shutter drive mechanism 20 perform a photographing operation (more specifically, control exits the live view mode by performing only the processes shown in FIG. 13, i.e., without entering the photographing operation shown in FIG. 14). Therefore, in the case where control carries out the photographing operation in the live view mode shown in FIG. 14, a gear switching operation is carried out, in which the planet gear 33 is disengaged from the second cam-incorporated gear 36 to be re-engaged with the first cam-incorporated gear 35 when the drive motor 22 is driven forward at V16 shown in FIG. 13. Due to this gear switching operation, the mirror/shutter drive mechanism 20 returns to the state shown in FIG. 6 from the state shown in FIG. 7, and thereafter, the above described finalization process in the live view mode is performed (see V17 through V22).

As described above, in the present embodiment of the mirror/shutter drive mechanism 20, by transmitting a motor driving force selectively to the first cam-incorporated gear 35 and the second cam-incorporated gear 36 via the planetary gear mechanism 30 in accordance with forward and rearward rotations of the drive motor 22, a shutter charge operation can be performed with no up/down operation of the mirror 14 in a photographing operation during the live view mode. In addition, the mirror/shutter drive mechanism 20 has a structure, which will be discussed hereinafter, in which the planet gear 33 of the planetary gear mechanism 30 is reliably selectively engaged with the first cam-incorporated gear 35 and the second cam-incorporated gear 36 to achieve high-precision driving.

As described above, the cam follower 45b of the mirror drive lever 45 and the first cam follower 50f of the shutter charge lever 50 come in contact with the mirror control cam and the first shutter control cam 41 of the first cam-incorporated gear 35, respectively. The biasing force of the mirror-down spring 47 for biasing the mirror drive lever 45 so that it rotates is transmitted from the cam follower 45b to the first cam-incorporated gear 35 via the mirror control cam 40. In addition, the biasing force of the charge lever restoring spring 54 for biasing the shutter charge lever 50 so that it rotates and the biasing force of the setting lever restoring spring 55 for biasing the shutter setting lever 51 so that it rotates are transmitted from the first cam follower 50f to the first cam-incorporated gear 35 via first shutter control cam 41. In addition, a shutter charge load (shutter curtain traveling force) from the shutter 15 acts on the first cam-incorporated gear 35 from the shutter setting lever 51 via the first cam follower 50f of the shutter charge lever 50. The shutter charge load is a reaction force that exists when the leading curtain 15a and the trailing curtain 15b are charged, or a charge releasing force that exists when the leading curtain 15a and the trailing curtain 15b have been charged and not held by the leading curtain holding magnet 52 and the trailing curtain holding magnet 53, respectively.

Although the first cam-incorporated gear 35 is rotated by receiving a driving force from the drive motor 22 while being engaged with the planet gear 33, there is a possibility of the first cam-incorporated gear 35 being prevented from being securely engaged with the planet gear 33 when a certain degree of external force is exerted on the first cam-incorporated gear 35 from the mirror drive lever 45 or the shutter charge lever 50, each of which is driven by the first cam-incorporated gear 35. Specifically, this certain degree of external force consists of a surplus force (hereinafter referred to as a surplus torque) which urges the first cam-incorporated gear to rotate in the direction of rotation of the first cam-incorporated gear 35 caused by rotation of the planet gear 33 (i.e., the counterclockwise direction of the first cam-incorporated gear 35 with respect to FIGS. 5 through 8). If it is attempted to transmit rotation from the planet gear 33 to the first cam-incorporated gear 35 under a condition in which such a surplus torque acts on the first cam-incorporated gear 35, there is a possibility of the planet gear 33 behaving in a manner so as to bounce on the first cam-incorporated gear 35 and disengage therefrom toward the second cam-incorporated gear 36. Due to this reason, the shapes of the mirror control cam 40 and the first shutter control cam 41 on the first cam-incorporated gear 35 are predetermined (configured) to prevent such a surplus torque from acting on the first cam-incorporated gear 35, and will be discussed hereinafter.

As shown by a broken line in FIGS. 19 through 24, the mirror control cam 40 is provided with a constant-radius cam portion 40a, two non-constant-radius cam portions 40b (40b-1 and 40b-2), and a relief cam portion 40c. The constant-radius cam portion 40a is greater in radius than the two non-constant-radius cam portions 40b and the relief cam portion 40c, is formed at the maximum outer radial position on the mirror control cam 40 about the rotational shaft 35x and shaped so that the radial distance from the rotational shaft 35x to the constant-radius cam portion 40a does not vary in the rotational direction about the rotational shaft 35x. The relief cam portion 40c is smaller in radius than the constant-radius cam portion 40a and the two non-constant-radius cam portions 40b, and is formed at a position on the mirror control cam 40 which is closer to the rotational shaft 35x than the constant-radius cam portion 40a in a radial direction. The two non-constant-radius cam portions 40b are formed between the constant-radius cam portion 40a and the relief cam portion 40c so that the constant-radius cam portion 40a and the relief cam portion 40c are connected via the two non-constant-radius cam portions 40b, and each non-constant-radius cam portion 40b is shaped so that the distance from the rotational shaft 35x to the non-constant-radius cam portion 40b varies in the rotational direction about the rotational shaft 35x. Each non-constant-radius cam portion 40b is formed on a portion of the mirror control cam 40 between the constant-radius cam portion 40a and the relief cam portion 40c and does not have any portion which either projects radially outwards by a greater degree than the constant-radius cam portion 40a or recessed radially inwards by a greater degree than the relief cam portion 40c. The two non-constant-radius cam portions 40b are respectively formed at both ends of the constant-radius cam portion 40a (or in other words, at both ends of the relief cam portion 40c), and consist of a first non-constant-radius cam portion 40b-1 and a second non-constant-radius cam portion 40b-2 as shown in the drawings. The first non-constant-radius cam portion 40b-1 and the second non-constant-radius cam portion 40b-2 are mutually different in shape (cam curve). The boundary between the relief cam portion 40c and the first non-constant-radius cam portion 40b-1 is shaped into a concave surface which is recessed toward the rotational shaft 35x, contrary to the adjacent convex cam surfaces.

In addition, as shown by a solid line in FIGS. 19 through 24, the first shutter control cam 41 is provided with a constant-radius cam portion 41a, two non-constant-radius cam portions 41b (41b-1 and 41b-2) and a relief (recessed) cam portion 41c. The constant-radius cam portion 41a is greater in radius than the two non-constant-radius cam portions 41b and the relief cam portion 41c, is formed at the maximum outer radial position on the first shutter control cam 41 about the rotational shaft 35x and shaped so that the radial distance from the rotational shaft 35x to the constant-radius cam portion 41a does not vary in the rotational direction about the rotational shaft 35x. The relief cam portion 41c is smaller in radius than the constant-radius cam portion 41a and the two non-constant-radius cam portions 41b, and is formed at a position on the first shutter control cam 41 which is closer to the rotational shaft 35x than the constant-radius cam portion 41a in a radial direction. The two non-constant-radius cam portions 41b are formed between the constant-radius cam portion 41a and the relief cam portion 41c so that the constant-radius cam portion 41a and the relief cam portion 41c are connected via the two non-constant-radius cam portions 41b, and each non-constant-radius cam portion 41b is shaped so that the distance from the rotational shaft 35x to the non-constant-radius cam portion 41b varies in the rotational direction about the rotational shaft 35x. Each non-constant-radius cam portion 41b is formed on a portion of the first shutter control cam 41 between the constant-radius cam portion 41a and the relief cam portion 41c and does not have any portion which either projects radially outwards by a greater degree than the constant-radius cam portion 41a or recessed radially inwards by a greater degree than the relief cam portion 41c. The two non-constant-radius cam portions 41b are respectively formed at both ends of the constant-radius cam portion 41a (or in other words, at both ends of the relief cam portion 41c), and consist of a first non-constant-radius cam portion 41b-1 and a second non-constant-radius cam portion 41b-2 as shown in the drawings. The first non-constant-radius cam portion 41b-1 and the second non-constant-radius cam portion 41b-2 are mutually different in shape (cam curve). The relief cam portion 41c is shaped into a concave surface which is recessed toward the rotational shaft 35x, contrary to the adjacent convex cam surfaces.

The mirror drive lever 45 is held in the mirror-up position when the cam follower 45b of the mirror drive lever 45 comes in contact with the constant-radius cam portion 40a of the mirror control cam 40. When the mirror drive lever 45 is in the mirror-up position, the cam follower 45b is spaced most apart from the rotational shaft 35x of the first cam-incorporated gear 35 (i.e., positioned at a cam-axis separated position) while the amount of bending (turning) of the mirror-down spring 47 becomes maximum. Conversely, the mirror drive lever 45 is held in the mirror-down position when the cam follower 45b faces the relief cam portion 40c of the mirror control cam 40. The mirror-down position of the mirror drive lever 45 is defined by making the retaining portion 45a contact the mirror sheet boss 14a by the biasing force of the mirror-down spring 47 in a state where the mirror 14 is held in the down position while being in contact with the limit pin 19. At this time, although the cam follower 45b is in a state of being positioned closest to (in the immediate vicinity) the rotational shaft 35x of the first cam-incorporated gear 35 (i.e., positioned at a cam-axis vicinity position), the cam follower 45b is not in contact with the relief cam portion 40c.

When the first cam follower 50f of the shutter charge lever 50 comes in contact with the constant-radius cam portion 41a of the first shutter control cam 41, the shutter charge lever 50 is held in the charge position. When the shutter charge lever 50 is in the charge position, the first cam follower 50f is spaced most apart from the rotational shaft 35x of the first cam-incorporated gear 35 (i.e., positioned at a cam-axis separated position) while the amount of extension of each of the charge lever restoring spring 54 and the setting lever restoring spring 55 is maximum. Conversely, the shutter charge lever 50 is held in the charge release position when the first cam follower 50f faces the relief cam portion 41c of the first shutter control cam 41. The charge release position of the shutter charge lever 50 is defined by making the stopper portion 50e contact the swing limit protrusion 13e by the biasing forces of the charge lever restoring spring 54 and the setting lever restoring spring 55. At this time, although the first cam follower 50f is in a state of being positioned closest to (in the immediate vicinity) the rotational shaft 35x of the first cam-incorporated gear 35 (i.e., positioned at a cam-axis vicinity position), the first cam follower 50f is not in contact with the relief cam portion 41c.

Figure 19:
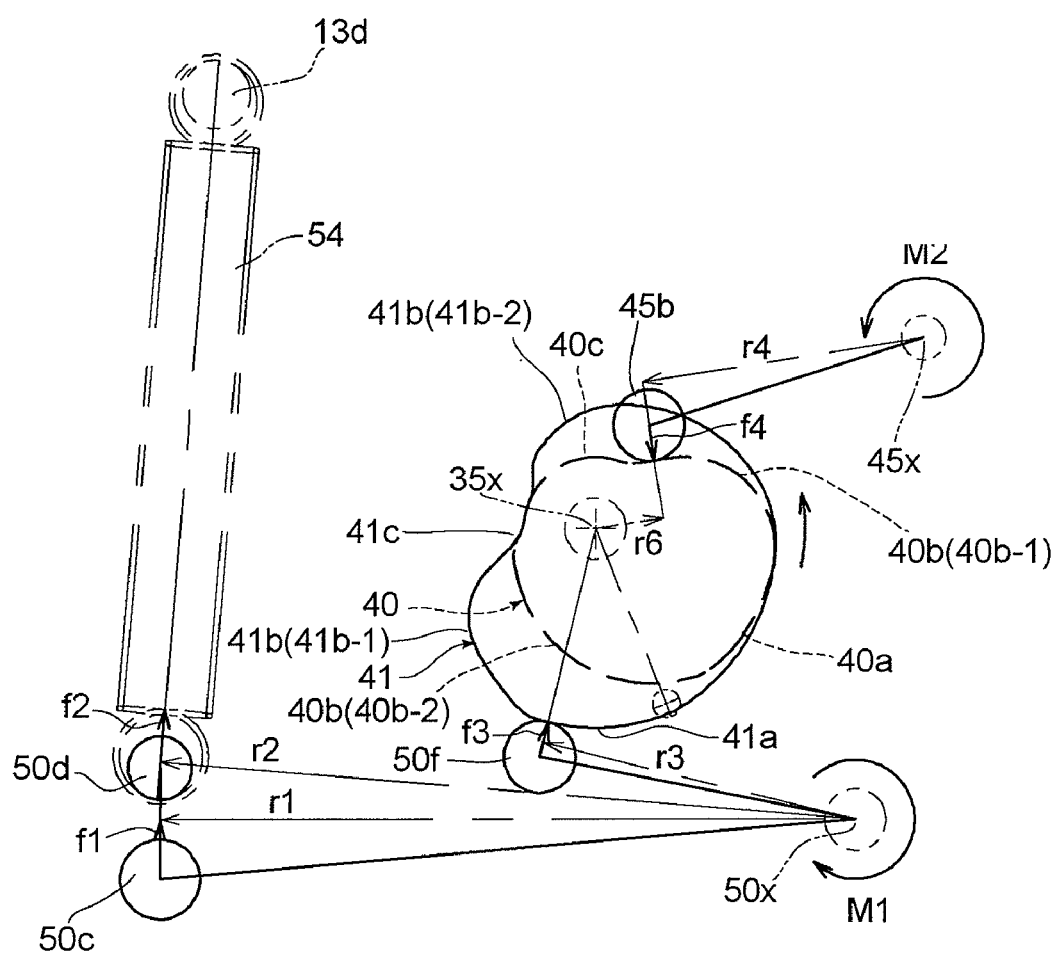
FIG. 19 is a conceptual diagram showing the relationship between forces acting on the first cam-incorporated gear by the mirror drive lever and the shutter charge lever in a state where the first cam-incorporated gear has been rotated from the origin position shown in FIG. 5 and a load torque caused by the mirror drive lever has started acting on the first cam-incorporated gear.
Figure 20:
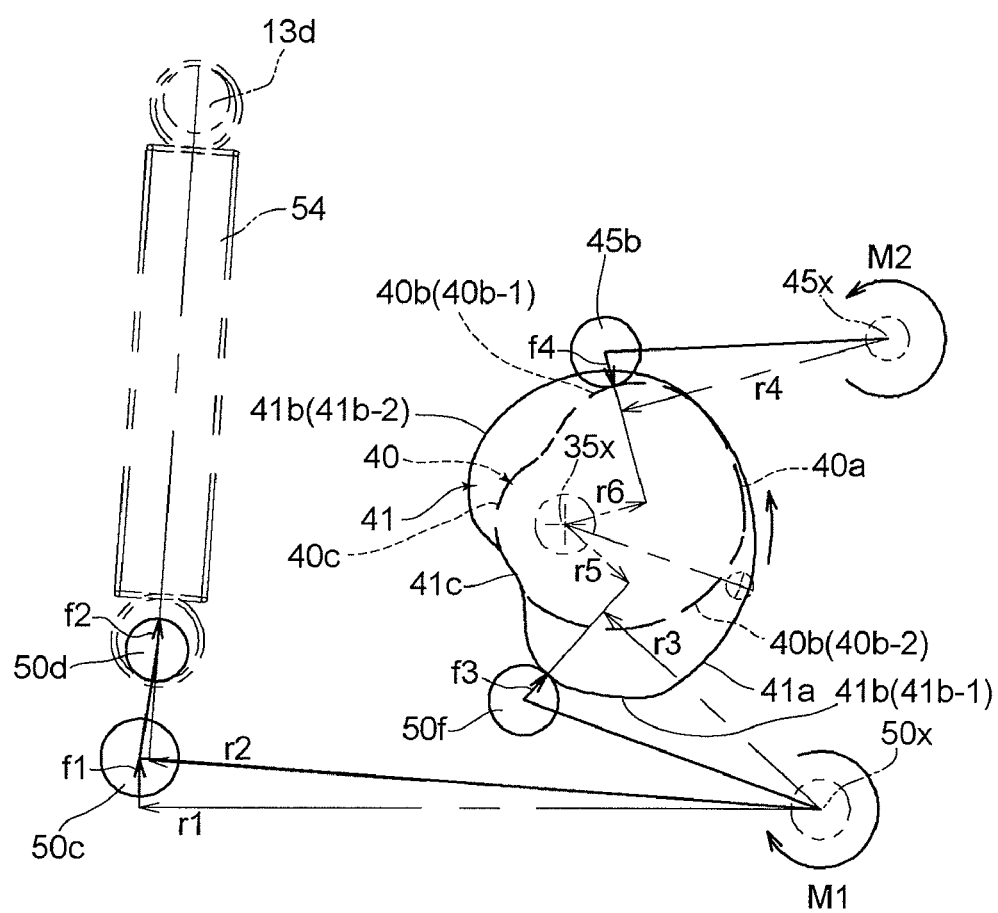
FIG. 20 is a conceptual diagram showing the relationship between forces acting on the first cam-incorporated gear by the mirror drive lever and the shutter charge lever in a state where the first cam-incorporated gear has been rotated from the position shown in FIG. 19, the mirror drive lever has been rotated toward the mirror-up position by a mirror control cam, and the shutter charge lever is in the process of being rotated toward the charge release position by a first shutter control cam.
Figure 21:
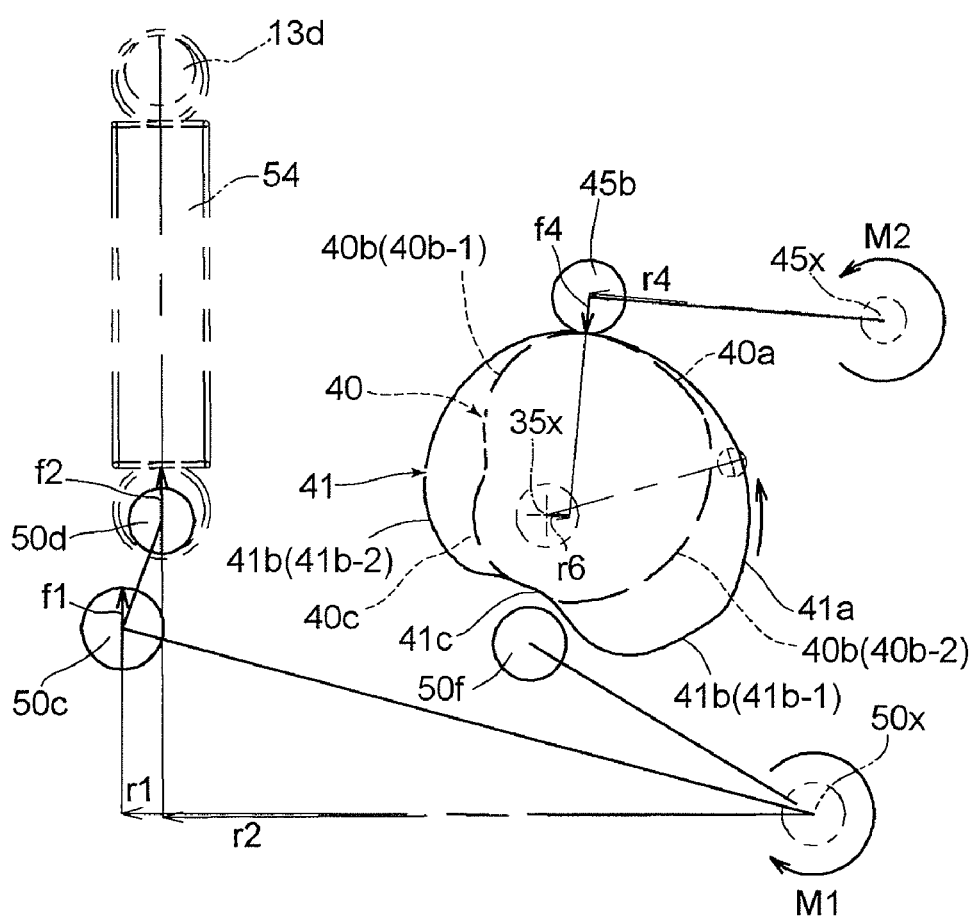
FIG. 21 is a conceptual diagram showing the relationship between forces acting on the first cam-incorporated gear by the mirror drive lever and the shutter charge lever in a state where the first cam-incorporated gear has been further rotated from the position shown in FIG. 20 and the shutter charge lever has been rotated to the charge release position by the first shutter control cam.
Figure 22:
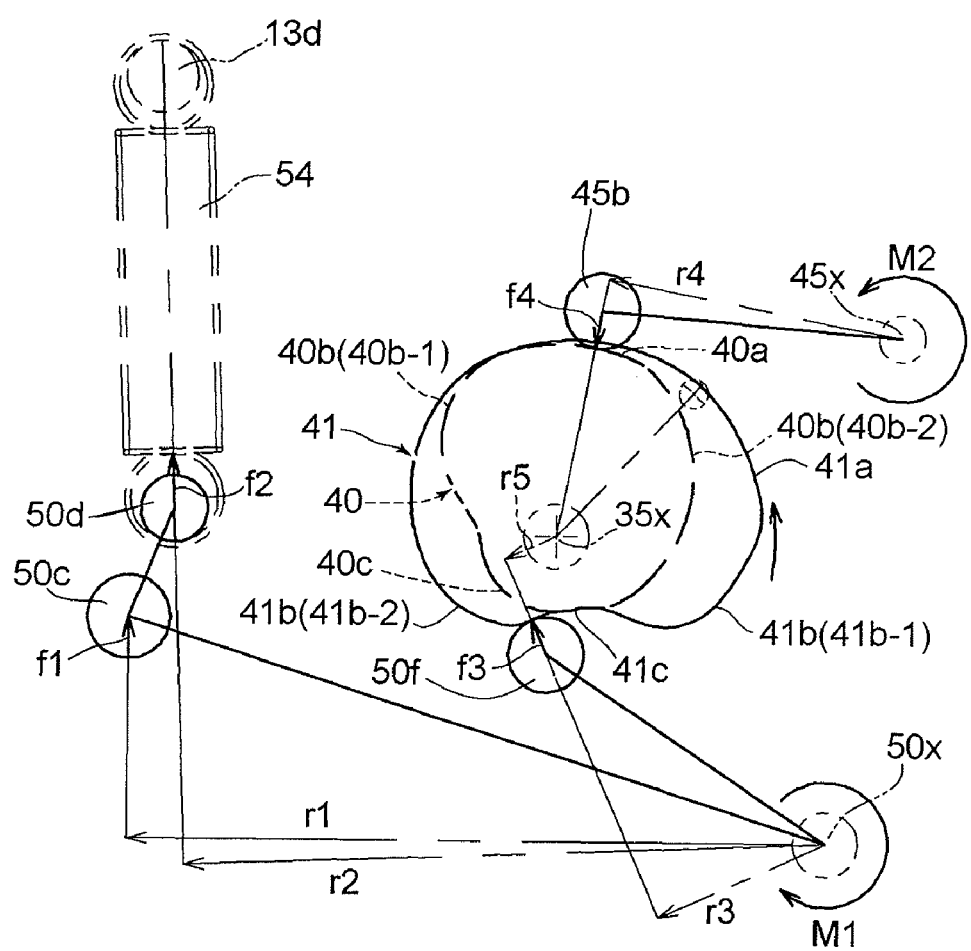
FIG. 22 is a conceptual diagram showing the relationship between forces acting on the first cam-incorporated gear by the mirror drive lever and the shutter charge lever in a state where the first cam-incorporated gear has been rotated from the mirror-up completion position shown in FIG. 6 and a load torque caused by the shutter charge lever has started acting on the first cam-incorporated gear.
Figure 23:
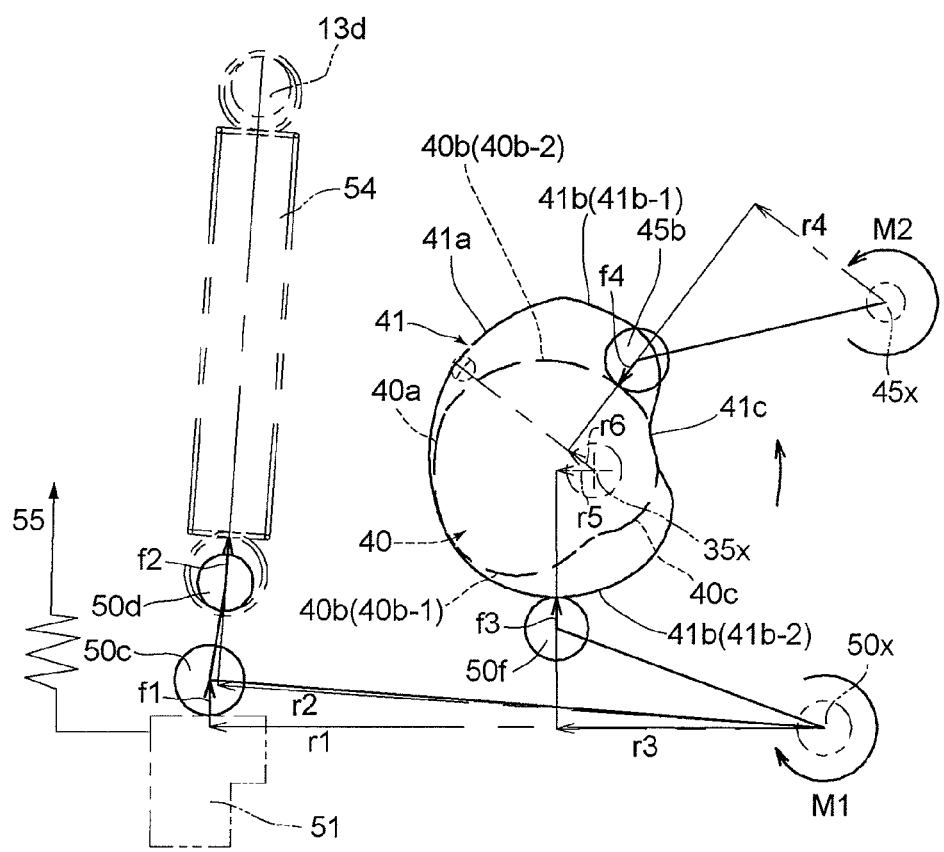
FIG. 23 is a conceptual diagram showing the relationship between forces acting on the first cam-incorporated gear by the mirror drive lever and the shutter charge lever in a state where the first cam-incorporated gear has been rotated from the position shown in FIG. 22, the shutter charge lever has been rotated toward the charge position by the first shutter control cam and the mirror drive lever is in the process of being rotated toward the mirror-down position by the mirror control cam.
Figure 24:
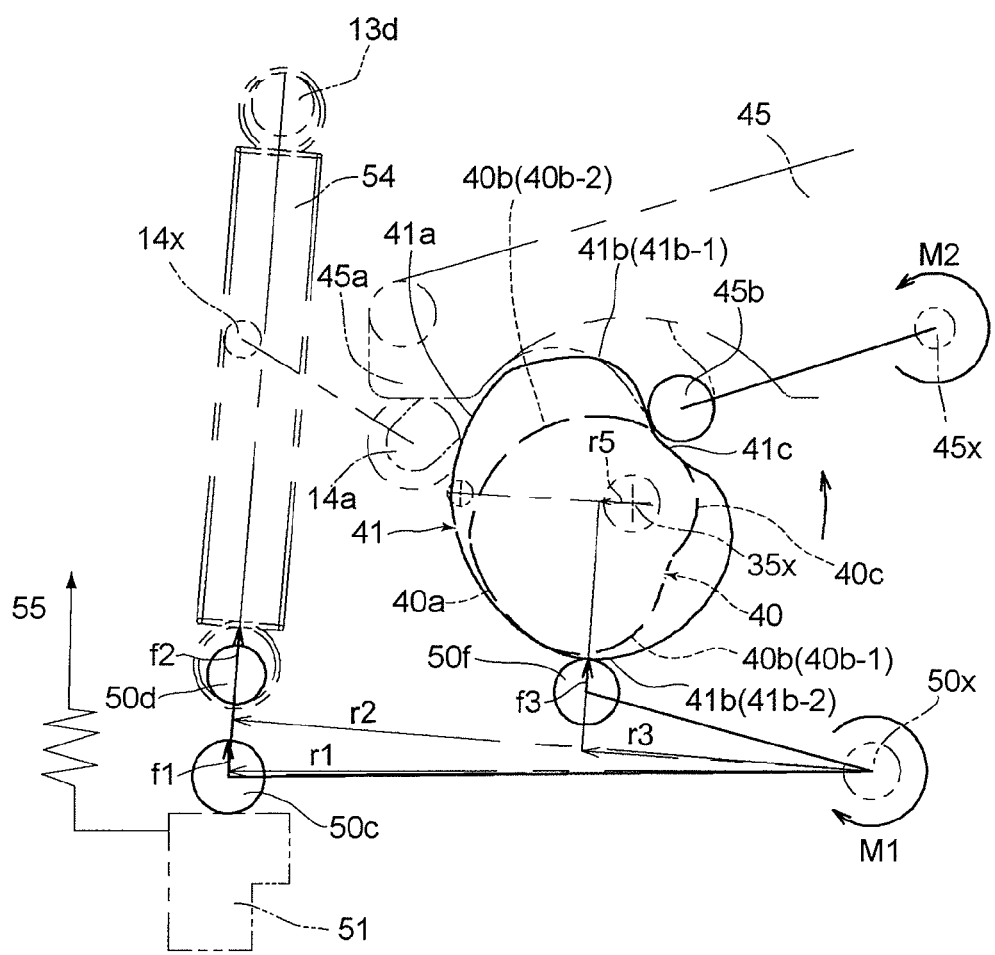
FIG. 24 is a conceptual diagram showing the relationship between forces acting on the first cam-incorporated gear by the mirror drive lever and the shutter charge lever in a state where the first cam-incorporated gear has been further rotated from the position shown in FIG. 23 and the mirror drive lever has been rotated to the mirror-down position by the mirror control cam.

FIGS. 19 through 24 schematically show the relationship between forces acting on the first cam-incorporated gear 35 at different rotational positions thereof. In FIGS. 19 through 24, the arrow f1 represents the force acting on the first cam-incorporated gear 35 from the shutter setting lever 51; more specifically, the arrow f1 shown in FIGS. 19 through 21 represents the biasing force (restoring force) of the setting lever restoring spring 55 and the arrow f1 shown in FIGS. 22 through 24 represents a combination of the biasing force (restoring force) of the setting lever restoring spring 55 and the load on the first cam-incorporated gear 35 which is caused when the shutter 15 is charged. In FIGS. 19 through 24, the arrow f2 represents the biasing force (restoring force) of the charge lever restoring spring 54, the arrow f3 represents the pressure force of the first cam follower 50f on a cam surface of the first shutter control cam 41, the arrow f4 represents the pressure force of the cam follower 45b of the mirror drive lever 45 on a cam surface of the mirror control cam 40. In addition, in FIGS. 19 through 24, the arrow r1 represents the radial distance from the center of rotation of the shutter charge lever 50 (i.e., the axis of the rotational shaft 50x) to the arrow f1, the arrow r2 represents the radial distance from the center of rotation of the shutter charge lever 50 (i.e., the axis of the rotational shaft 50x) to the arrow f2, the arrow r3 represents the radial distance from the center of rotation of the shutter charge lever 50 (i.e., the axis of the rotational shaft 50x) to the arrow f3, the arrow r4 represents the radial distance from the center of rotation of the mirror drive lever 45 (i.e., the axis of the rotational shaft 45x) to the arrow f4, the arrow r5 represents the radial distance from the center of rotation of the first cam-incorporated gear 35 (i.e., the axis of the rotational shaft 35x) to the arrow f3, and the arrow r6 represents the radial distance from the center of rotation of the first cam-incorporated gear 35 (i.e., the axis of the rotational shaft 35x) to the arrow f4. In FIGS. 19 through 24, the arrow M1 represents the rotational moment of the shutter charge lever 50 produced by the forces f1 and f2, and the arrow M2 represents the rotational moment of the mirror drive lever 45 produced by the mirror-down spring 47. In the following descriptions, T1 designates the surplus torque acting on the first cam-incorporated gear 35 in the same rotational direction as the rotational direction of the first cam-incorporated gear 35 caused by rotation of the planet gear 33 (i.e., the counter-clockwise direction of the first cam-incorporated gear 35), and T2 designates the torque (hereinafter referred to as the load torque) acting on the first cam-incorporated gear 35 in the direction opposite to the direction of rotation of the first cam-incorporated gear 35.

Figure 31:
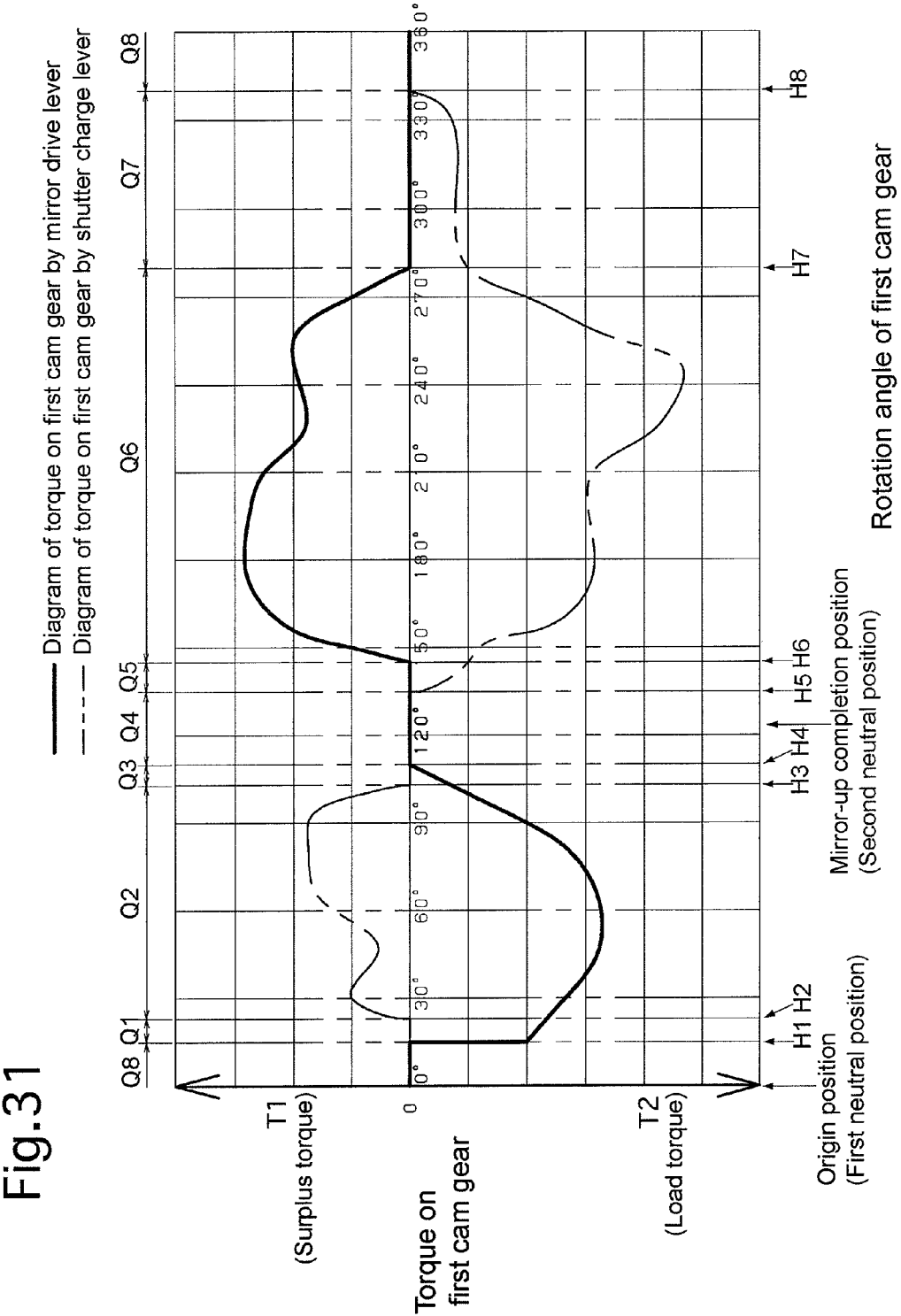
FIG. 31 is a graph showing the relationship between forces acting on the first cam-incorporated gear by the mirror drive lever and the shutter charge lever when the first cam-incorporated gear rotates by one revolution from the origin position thereof.

FIG. 31 is a graph showing the relationship between the surplus torque T1 and the load torque T2 that act on the first cam-incorporated gear 35 in the normal photography operational-sequence until when the first cam-incorporated gear 35 returns from the origin position shown in FIGS. 5 and 15 to the same origin position via the mirror-up completion position shown in FIGS. 6 and 16. As can be seen from FIG. 31, there are two positions (neutral positions) where neither the surplus torque T1 nor the load torque T2 acts on the first cam-incorporated gear 35. One of the two neutral positions corresponds to the origin position (first neutral position) of the first cam-incorporated gear 35 and the other corresponds to the mirror-up completion position (second neutral position).

First of all, variations in load on the first cam-incorporated gear 35 from the origin position to the mirror-up completion position will be discussed hereinafter. The mirror drive lever 45 (mirror drive system) serves as a source by which the load torque T2 acts on the first cam-incorporated gear 35 because the mirror control cam 40 continues to press the mirror drive lever 45 toward the mirror-up position (in which the cam follower 45b is positioned at the cam-axis separated position thereof) against the biasing force of the mirror-down spring 47 from the origin position until the mirror-up completion position. On the other hand, the shutter charge lever 50 is gradually released from the pressure of the first shutter control cam 41 to thereby rotate toward the charge release position (in which the first cam follower 50f is positioned at the cam-axis vicinity position thereof) by the biasing forces of the charge lever restoring spring 54 and the setting lever restoring spring 55, and accordingly, the shutter charge lever 50 (the shutter charge system) serves as a source by which the surplus torque T1 acts on the first cam-incorporated gear 35.

The surplus torque T1 and the load torque T2 during the operation of the first cam-incorporated gear 35 from the origin position to the mirror-up completion position can be determined by the following equations (1) and (2), respectively:

$$T1 = f3 \times r5 \qquad (1)$$

wherein $f3 = M1/r3$, $M1 = f1 \times r1 + f2 \times r2$, $$T2 = f4 \times r6 \qquad (2)$$

wherein $f4 = m2/r4$.

At the origin position (first neutral position) of the first cam-incorporated gear 35, as shown in FIG. 15, since the mirror drive lever 45 is held in the mirror-down position (in which the cam follower 45b is positioned at the cam-axis vicinity position thereof) by making the mirror retaining portion 45a contact the mirror sheet boss 14a of the mirror 14 which is held in the down position via contact engagement with the limit pin 19, and since the cam follower 45b faces the relief cam portion 40c of the mirror control cam 40 with a slight distance therebetween, no torque acts on the first cam-incorporated gear 35 from the mirror drive lever 45. Namely, T2 is equal to zero (T2=0). In addition, the shutter charge lever 50 is held in the charge position (in which the first cam follower 50f is positioned at the cam-axis separated position thereof) by making the first cam follower 50f contact the constant-radius cam portion 41a of the first shutter control cam 41. In this state where the first cam follower 50f is in contact with the constant-radius cam portion 41a, r5 is equal to zero (r5=0) since the direction of action of f3 is coincident with a radial direction of the first cam-incorporated gear 35 about the rotational shaft 35x. Namely, the equation "T1=f3×0=0" is satisfied, and no torque acts on the first cam-incorporated gear 35 from either the mirror drive lever 45 or the shutter charge lever 50.

FIG. 19 shows a state where the first cam-incorporated gear 35 has been slightly rotated from the origin position shown in FIGS. 5 and 15 to reach a position H1 shown in FIG. 31. In this state, the first cam follower 50f of the shutter charge lever 50 is still in contact with the constant-radius cam portion 41a of the first shutter control cam 41 following the origin position, so that no torque acts on the first cam-incorporated gear 35 from the shutter charge lever 50. Namely, T1 is equal to zero (T1=0). On the other hand, the cam follower 45b of the mirror drive lever 45 moves from a state of being spaced from and facing the relief cam portion 40c of the mirror control cam 40 to a state of being in contact with the first non-constant-radius cam portion 40b-1 and pushed up thereby, which causes the mirror 14 to commence rotating toward the upper retracted position (this rotation is shown by U4 shown in FIG. 12). Thereupon, the direction of action of f4 does not coincide with a radial direction of the rotational axis 35x, and accordingly, r6 becomes unequal to zero (r6≠0), so that the rotational moment M2 of the mirror drive lever 45 comes to act as the load torque T2 on the first cam-incorporated gear 35. Namely, upon commencement of rotation of the first cam-incorporated gear 35 from the origin position, firstly the surplus torque T1 does not act on the first cam-incorporated gear 35 but only the load torque T2 acts on the first cam-incorporated gear 35 prior to the surplus torque T1 (see section Q1 shown in FIG. 31).

Further rotation of the first cam-incorporated gear 35 causes the first cam follower 50f of the shutter charge lever 50 to change the contact position thereof with the first shutter control cam 41 from the constant-radius cam portion 41a to the first non-constant cam portion 41b-1 at a position H2 shown in FIG. 31, which causes the shutter charge lever 50 to commence rotating toward the charge release position (this rotation is shown by U6 in FIG. 12). Thereupon, as shown in FIG. 20, the direction of action of f3 changes so that r5 becomes unequal to zero (i.e., r5≠0), so that the rotational moment M1 of the shutter charge lever 50 comes to act as the surplus torque T1 on the first cam-incorporated gear 35. From then on, the surplus torque T1 and the load torque T2 simultaneously act on the first cam-incorporated gear 35 (see section Q2 shown in FIG. 31). However, as can be seen from FIG. 31, the condition T1<T2 is satisfied at all times in section Q2, so that the load torque having the magnitude T2-T1 acts on the first cam-incorporated gear 35. In other words, the cam curves of the first non-constant-radius cam portion 40b-1 of the mirror control cam 40 and the first non-constant cam portion 41b-1 of the first shutter control cam 41 and the spring loads (loads on the first cam-incorporated gear 35 by the mirror-down spring 47, the charge lever restoring spring 54 and the setting lever restoring spring 55) are predetermined so that T1 always is smaller than T2 in section Q2, in which the surplus torque T1 and the load torque T2 simultaneously act on the first cam-incorporated gear 35. Although the condition T1<T2 is satisfied at all times in section Q2 in the present embodiment, a similar effect is achieved if at least the condition T1≦T2 is satisfied.

Upon the first cam-incorporated gear 35 reaching a position H3 shown in FIG. 31, the movement of the shutter charge lever 50 to the charge release position (in which the first cam follower 50f is positioned at the cam-axis vicinity position thereof) is completed, and the shutter charge lever 50 is held in the charge release position by contact engagement between the stopper portion 50e with the swing limit protrusion 13e (see U10 shown in FIG. 12). In this state, as shown in FIG. 21, the first cam follower 50f moves from a state of being in contact with the first non-constant-radius cam portion 41b-1 of the first shutter control cam 41 to a state of being slightly spaced from and facing the relief cam portion 41c of the first shutter control cam 41, so that the shutter charge lever 50 is held by engagement of the stopper portion 50e with the swing limit protrusion 13e. This causes the surplus torque T1 to stop acting on the first cam-incorporated gear 35. On the other hand, as can be seen from the difference in timing between U9 and U10 in FIG. 12, the mirror-up operation caused by the non-constant radius cam portion 40b-1 of the mirror control cam 40 is being carried out, so that the load torque T2 has continued acting on the first cam-incorporated gear 35 (see section Q3 shown in FIG. 31). Upon the first cam-incorporated gear 35 reaching a position H4 shown in FIG. 31 by slightly rotating from the state shown in FIG. 21, the cam follower 45b of the mirror drive lever 45 comes into contact with the constant-radius cam portion 40a of the mirror control cam 40 so that the mirror drive lever 45 is held in the mirror-up position (in which the cam follower 45b is positioned at the cam-axis separated position thereof). In the state where the cam follower 45b is in contact with the constant-radius cam portion 40a, the radial distance r6 is equal to zero (r6=0), which consequently makes the load torque T2 become zero. Thereafter, in section Q4 shown in FIG. 31 in which both the surplus torque T1 and the load torque T2 are zero, the first cam-incorporated gear 35 reaches the mirror-up completion position (second neutral position) shown in FIGS. 6 and 16.

Namely, the shapes of the mirror control cam 40 and the first shutter control cam 41 (specifically the shapes of the portions of the mirror control cam 40 and the first shutter control cam 41 on which the non-constant-radius cam portions 40b-1 and 41b-1 are formed, respectively) are determined so that the commencement (H1 shown in FIG. 31) of rotation of the mirror drive lever 45 toward the mirror-up position by the mirror control cam 40 occurs before (earlier than) the commencement (H2 shown in FIG. 31) of rotation of the shutter charge lever 50 toward the charge release position by the first shutter control cam 41, and so that the termination (H4 shown in FIG. 31) of the rotation of the mirror drive lever 45 toward the mirror-up position occurs after (later than) the termination (H3 shown in FIG. 31) of the rotation of the shutter charge lever 50 toward the charge release position when the first cam-incorporated gear 35 rotates from the origin position (first neutral position) shown in FIGS. 5 and 15 to the mirror-up completion position (second neutral position) shown in FIGS. 6 and 16 in normal photography operational-sequence. In addition, the first non-constant-radius cam portion 40b-1 of the mirror drive cam 40 and the first non-constant-radius cam portion 41b-1 of the first shutter control cam 41 are respectively given cam curves designed for making the load torque T2, which is caused by the mirror drive lever 45, greater than the surplus torque T1, which is caused by the shutter charge lever 50, when the mirror drive lever 45 and the shutter charge lever 50 are guided and rotated simultaneously by the first non-constant-radius cam portion 40b-1 and the first non-constant-radius cam portion 41b-1, respectively (Q2 shown in FIG. 31). Such cam curves can be determined based on various conditions comprising the aforementioned equations (1) and (2). Accordingly, the timing at which the surplus torque T1 and the load torque T2 act on the first cam-incorporated gear 35 by the mirror drive lever 45 and the shutter charge lever 50 and the magnitude correlation between the surplus torque T1 and the load torque T2 are predetermined so that only the load torque T2 that is caused by the mirror drive lever 45 acts on the first cam-incorporated gear 35 at an initial stage of a rotation thereof from the origin position to the mirror-up completion position, so that the load torque T2 that is caused by the mirror drive lever 45 becomes greater at all times than the surplus torque T1 that is caused by the shutter charge lever 50 at an intermediate stage of the rotation of the first cam-incorporated gear 35 and so that only the load torque T2 again acts on the first cam-incorporated gear 35 at a final stage of the rotation of the first cam-incorporated gear 35.

In section Q4 shown in FIG. 31 that corresponds to the mirror-up completion position (second intermediate position) of the first cam-incorporated gear 35, a state where neither the surplus torque T1 nor the load torque T2 acts on the first cam-incorporated gear 35 continues. Subsequently, when the first cam-incorporated gear 35 rotates to the origin position (first neutral position) shown in FIGS. 5 and 15 after completion of the travel of the leading and trailing shutter curtains 15a and 15b, the shutter charge lever 50 is gradually pressed toward the charge position (in which the first cam follower 50f is positioned at the cam-axis separated position thereof) by the first shutter control cam 41 against the biasing forces of the charge lever restoring spring 54, the setting lever restoring spring 55 and the shutter charge load conversely to the operation in the sections Q1 through Q3 shown in FIG. 31; accordingly, the shutter charge lever 50 (the shutter charge system) serves as a source of acting the load torque T2 on the first cam-incorporated gear 35. On the other hand, the pressure on the mirror drive lever 45 by the mirror control cam 40 is gradually released, so that the mirror drive lever 45 is rotated toward the mirror-down position (in which the cam follower 45b is positioned at the cam-axis vicinity position thereof) by the biasing force of the mirror-down spring 47, and accordingly, the mirror drive lever 45 (the mirror drive system) serves as a source of acting the surplus torque T1 on the first cam-incorporated gear 35. The surplus torque T1 and the load torque T2 during the operation of the first cam-incorporated gear 35 from the mirror-up completion position to the origin position can be determined by the following equations (3) and (4), respectively:

$$T1 = f4 \times r6 \quad (3)$$

wherein $f4 = M2/r4$, $$T2 = f3 \times r5 \quad (4)$$

wherein $f3 = M1/r3$, $M1 = f1 \times r1 + f2 \times r2$.

FIG. 22 shows a state where the first cam-incorporated gear 35 has been slightly rotated from the mirror-up completion position shown in FIGS. 6 and 16 to reach a position H5 shown in FIG. 31. In this state, the cam follower 45b of the mirror drive lever 45 is still in contact with the constant-radius cam portion 40a of the mirror control cam 40 following the mirror-up completion position, so that no torque acts on the first cam-incorporated gear 35 from the mirror drive lever 45. Namely, T1 is equal to zero (T1=0). On the other hand, the first cam follower 50f of the shutter charge lever 50 moves from a state of being spaced from and facing the relief cam portion 41c of the first shutter control cam 41 to a state of being in contact with the second non-constant-radius cam portion 41b-2 and pushed down thereby, which causes the shutter charge lever 50 to start rotating toward the charge position of the shutter charge lever 50 (this rotation is shown by U17 in FIG. 12). Thereupon, due to the direction of action of f3, the rotational moment M1 of the shutter charge lever 50 comes to act as the load torque T2 on the first cam-incorporated gear 35. Namely, in the rotation of the first cam-incorporated gear 35 after completion of the travel of the leading and trailing shutter curtains 15a and 15b in normal exposure mode, firstly the surplus torque T1 does not act on the first cam-incorporated gear 35 but only the load torque T2 acts on the first cam-incorporated gear 35 prior to the surplus torque T1 (see section Q5 shown in FIG. 31).

Further rotation of the first cam-incorporated gear 35 causes the first cam follower 45b of the mirror drive lever 45 to change the contact position thereof with the mirror control cam 40 from the constant-radius cam portion 40a to the second non-constant cam portion 40b-2 at a position H6 shown in FIG. 31, which causes the mirror drive lever 45 to commence rotating toward the mirror-down position (this rotation is shown by U19 in FIG. 12). Thereupon, as shown in FIG. 23, the direction of action of f4 changes so that the rotational moment M2 of the mirror drive lever 45 comes to act as the surplus torque T1 on the first cam-incorporated gear 35. Thereafter, the surplus torque T1 and the load torque T2 simultaneously act on the first cam-incorporated gear 35 (see section Q6 shown in FIG. 31). However, as can be seen from FIG. 31, similar to the above described section Q2, the condition T1<T2 is satisfied at all times in section Q6, so that the load torque having the magnitude T2-T1 acts on the first cam-incorporated gear 35. In other words, the cam curves of the second non-constant-radius cam portion 40b-2 of the mirror control cam 40 and the second non-constant cam portion 41b-2 of the first shutter control cam 41 and the spring loads (loads on the first cam-incorporated gear 35 by the mirror-down spring 47, the charge lever restoring spring 54 and the setting lever restoring spring 55) are predetermined so that T1 always is smaller than T2 in section Q6, in which the surplus torque T1 and the load torque T2 simultaneously act on the first cam-incorporated gear 35. Although the condition T1<T2 is satisfied at all times in section Q6 in the present embodiment, a similar effect is achieved if at least the condition T1≦T2 is satisfied.

Upon the first cam-incorporated gear 35 reaching a position H7 shown in FIG. 31, the mirror drive lever 45 reaches the mirror-down position (in which the cam follower 45b is positioned at the cam-axis vicinity position thereof), so that the descending operation (downward rotation) of the mirror 14 is completed (see U20 shown in FIG. 12). In this state, as shown in FIG. 24, the cam follower 45b is positioned to face the relief cam portion 40c, and the mirror drive lever 45 is held in the mirror-down position (see FIG. 11) by making the mirror retaining portion 45a engaged with the mirror sheet boss 14a of the mirror 14 which is prevented from rotating by the limit pin 19. Consequently, the pressure of the cam follower 45b on the mirror control cam 40 is released, which makes the surplus torque T1 stop acting on the first cam-incorporated gear 35. On the other hand, as can be understood from the difference in timing between U20 and U21 shown in FIG. 12, the shutter charge lever 50 continually pressed and rotated toward the charge position by the second non-constant-radius cam portion 41b-2 of the first shutter control cam 41, so that the load torque T2 continues acting on the first cam-incorporated gear 35 (see section Q7 shown in FIG. 31). Upon the first cam-incorporated gear 35 rotating to a position H8 shown in FIG. 31 from the state shown in FIG. 24, the first cam follower 50f of the shutter charge lever 50 comes in contact with the constant-radius portion 41a of the first shutter control cam 41, so that the shutter charge lever 50 is held in the charge release position by contact engagement between the first cam follower 50f and the constant-radius portion 41a. In this state where the first cam follower 50f and the constant-radius cam portion 41a are in contact with each other, r5 is equal to zero (r5=0). As a result, the load torque T2 becomes zero. Thereafter, in section Q8 shown in FIG. 31 in which both the surplus torque T1 and the load torque T2 are zero, the first cam-incorporated gear 35 reaches the origin position (first neutral position) shown in FIGS. 5 and 15.

Namely, the shapes of the mirror control cam 40 and the first shutter control cam 41 (specifically the shapes of the portions of the mirror control cam 40 and the first shutter control cam 41 on which the non-constant-radius cam portions 40b-2 and 41b-2 are formed, respectively) are determined so that the commencement (H5 shown in FIG. 31) of rotation of the shutter charge lever 50 toward the charge position by the first shutter control cam 41 occurs before (earlier than) the commencement (H6 shown in FIG. 31) of rotation of the mirror drive lever 45 toward the mirror-down position by the mirror control cam 40 and so that the termination (H8 shown in FIG. 31) of the rotation of the shutter charge lever 50 toward the charge position occurs after (later than) the termination (H7 shown in FIG. 31) of the rotation of the mirror drive lever toward the mirror-down position when the first cam-incorporated gear 35 returns to the origin position (first neutral position) from the mirror-up completion position (second neutral position) in a normal photography operational-sequence. In addition, the second non-constant-radius cam portion 40b-2 of the mirror drive cam 40 and the second non-constant-radius cam portion 41b-2 of the first shutter control cam 41 are respectively provided with cam curves designed for making the load torque T2, which is caused by the shutter charge lever 50, greater than the surplus torque T1, which is caused by the mirror drive lever 45, when the mirror drive lever 45 and the shutter charge lever 50 are guided and rotated simultaneously by the second non-constant-radius cam portion 40b-2 and the second non-constant-radius cam portion 41b-2, respectively (Q6 shown in FIG.

31). Such cam curves can be determined based on various conditions comprising the aforementioned equations (3) and (4). Accordingly, the timing by which the surplus torque T1 and the load torque T2 act on the first cam-incorporated gear 35 by the mirror drive lever 45 and the shutter charge lever 50 and the magnitude correlation between the surplus torque T1 and the load torque T2 are predetermined so that only the load torque T2 that is caused by the shutter charge lever 50 acts on the first cam-incorporated gear 35 at an initial stage of a rotation thereof from the mirror-up completion position to the origin position, so that the load torque T2 that is caused by the shutter charge lever 50 becomes greater at all times than the surplus torque T1 that is caused by the mirror drive lever 45 at an intermediate stage of the rotation of the first cam-incorporated gear 35, and so that only the load torque T2 again acts on the first cam-incorporated gear 35 at a final stage of the rotation of the first cam-incorporated gear 35.

Structures for control of the loads on the second cam-incorporated gear 36 will be discussed hereinafter. Although the second cam follower 50g of the shutter charge lever 50 comes in contact with the second shutter control cam 42 of the second cam-incorporated gear 36 as mentioned above, the mirror/shutter drive mechanism 20 is further equipped with the balancer lever 70 that is provided as a load adjuster when the second cam-incorporated gear 36 is driven to rotate, and the cam follower 70b of the balancer lever 70 can come in contact with the second shutter control cam 42. The second cam-incorporated gear 36 is rotated by being engaged with the planet gear 33 and receiving a driving force from the drive motor 22; however, similar to the case of the first cam-incorporated gear 35, if it is attempted to transmit rotation from the planet gear 33 to the second cam-incorporated gear 36 under a condition in which a surplus torque similar to that acting on the first cam-incorporated gear 35 (force acting on the second cam-incorporated gear 36 in the rotational direction thereof) acts on the second cam-incorporated gear 36 from the shutter charge lever 50 or the like which is to be driven by the second cam-incorporated gear 36, there is a possibility of the planet gear 33 behaving in a manner so as to bounce on the second cam-incorporated gear 36 and disengage therefrom toward the first cam-incorporated gear 35. Due to this reason, the shape of the second shutter control cam 42 on the second cam-incorporated gear 36 is predetermined to prevent such a surplus torque from acting on the second cam-incorporated gear 36, and will be discussed hereinafter.

As shown in FIGS. 25 through 30, the second shutter control cam 42 is provided with a constant-radius cam portion 42a, two non-constant-radius cam portions 42b (42b-1 and 42b-2) and a relief cam portion 42c. The constant-radius cam portion 42a is greater in radius than the two non-constant-radius cam portions 42b and the relief cam portion 42c, is formed at the maximum outer radial position on the second shutter control cam 42 about the rotational shaft 36x and shaped so that the radial distance from the rotational shaft 36x to the constant-radius cam portion 42a does not vary in the rotational direction about the rotational shaft 36x. The relief cam portion 42c is smaller in radius than the constant-radius cam portion 42a and the two non-constant-radius cam portions 42b, and is formed at a position on the second shutter control cam 42 which is closer to the rotational shaft 36x than the constant-radius cam portion 42a in a radial direction. The two non-constant-radius cam portions 42b are formed between the constant-radius cam portion 42a and the relief cam portion 42c so that the constant-radius cam portion 42a and the relief cam portion 42c are connected via the two non-constant-radius cam portions 42b, and each non-constant-radius cam portion 42b is shaped so that the distance from the rotational shaft 36x to the non-constant-radius cam portion 42b varies in the rotational direction about the rotational shaft 36x. Each non-constant-radius cam portion 42b is formed on a portion of the second shutter control cam 42 between the constant-radius cam portion 42a and the relief cam portion 42c and does not have any portion which either projects radially outwards by a greater degree than the constant-radius cam portion 42a or recessed radially inwards by a greater degree than the relief cam portion 42c. The two non-constant-radius cam portions 42b are respectively formed at both ends of the constant-radius cam portion 42a (or in other words, at both ends of the relief cam portion 42c), and consist of a first non-constant-radius cam portion 42b-1 and a second non-constant-radius cam portion 42b-2 as shown in the drawings. The first non-constant-radius cam portion 42b-1 and the second non-constant-radius cam portion 42b-2 are mutually different in shape (cam curve).

The shutter charge lever 50 is held in the charge position when the second cam follower 50g of the shutter charge lever 50 comes in contact with the constant-radius cam portion 42a of the second shutter control cam 42. When the shutter charge lever 50 is in the charge position, the second cam follower 50g is spaced most apart from the rotational shaft 36x of the second cam-incorporated gear 36 (i.e., positioned at a cam-axis separated position) while the amount of extension of each of the charge lever restoring spring 54 and the setting lever restoring spring 55 becomes maximum. Conversely, the shutter charge lever 50 is held in the charge release position when the second cam follower 50g faces the relief cam portion 42c of the second shutter control cam 42. As described above, the charge release position of the shutter charge lever 50 is defined by making the stopper portion 50e contact the swing limit protrusion 13e by the biasing forces of the charge lever restoring spring 54 and the setting lever restoring spring 55. At this time, although the second cam follower 50g is in a state of being positioned closest to (in the immediate vicinity) the rotational shaft 36x of the second cam-incorporated gear 36 (i.e., positioned at a cam-axis vicinity position), the second cam follower 50g is not in contact with the relief cam portion 42c.

When the cam follower 70b of the balancer lever 70 comes in contact with the constant-radius cam portion 42a of the second shutter control cam 42, the balancer lever 70 is held in a cam-axis separated position in which the cam follower 70b is spaced most apart from the rotational shaft 36x of the second cam-incorporated gear 36. At this time, the amount of bending (turning) of the balancer lever biasing spring 71 becomes maximum. Conversely, the balancer lever 70 is held in a cam-axis vicinity position at which the cam follower 70b is positioned closest to (in the immediate vicinity) the rotational axis 36x of the second cam-incorporated gear 36 when the cam follower 70b faces the relief cam portion 42c of the second shutter control cam 42; however, this cam-axis vicinity position is defined by the engagement of the limit arm 70c with the swing movement limit protrusion 13b of the mirror box 13, and the cam follower 70b is not in contact with the relief cam portion 42c.

Figure 27:
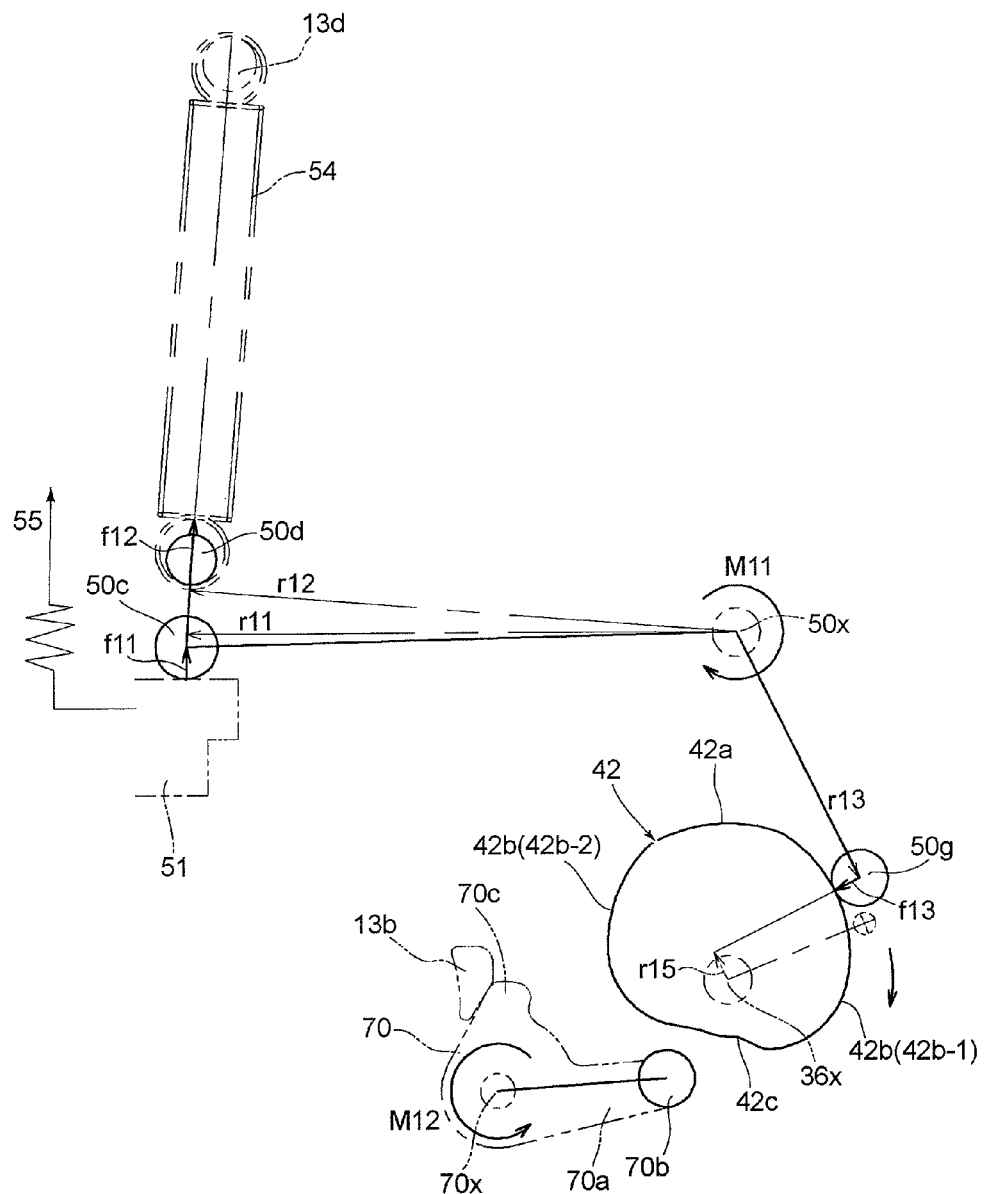
FIG. 27 is a conceptual diagram showing the relationship between forces acting on the second cam-incorporated gear by the shutter charge lever and the balancer lever in a state where the second cam-incorporated gear has been further rotated from the position shown in FIG. 26 and a surplus torque on the second shutter control cam which is caused by the balancer lever has been released from the second shutter control cam.
Figure 28:
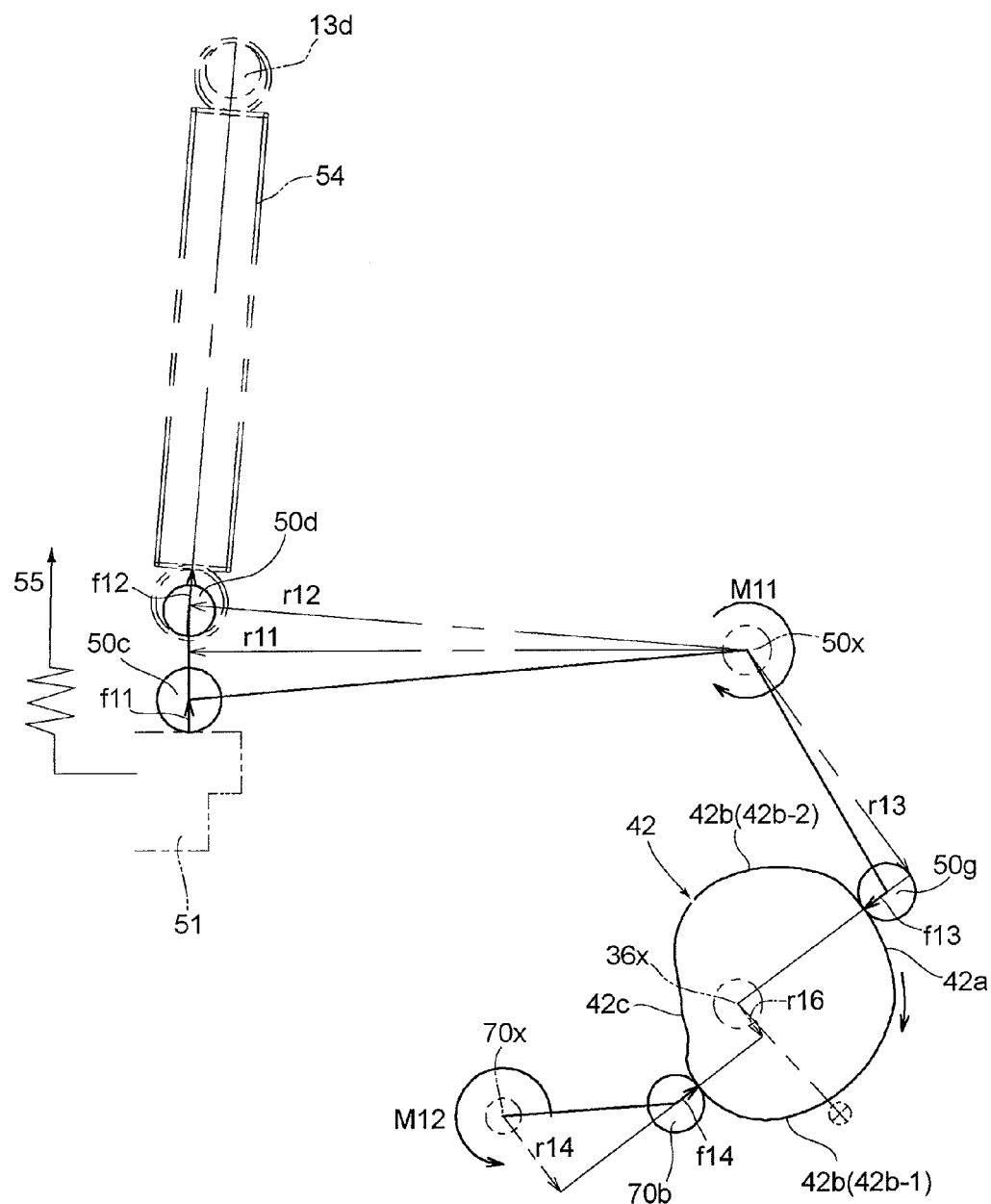
FIG. 28 is a conceptual diagram showing the relationship between forces acting on the second cam-incorporated gear by the shutter charge lever and the balancer lever in a state where the second cam-incorporated gear has been rotated from the shutter charge completion position shown in FIG. 8 and a load torque caused by the balancer lever has started acting on the second cam-incorporated gear in the photographing operation in the live view mode.
Figure 29:
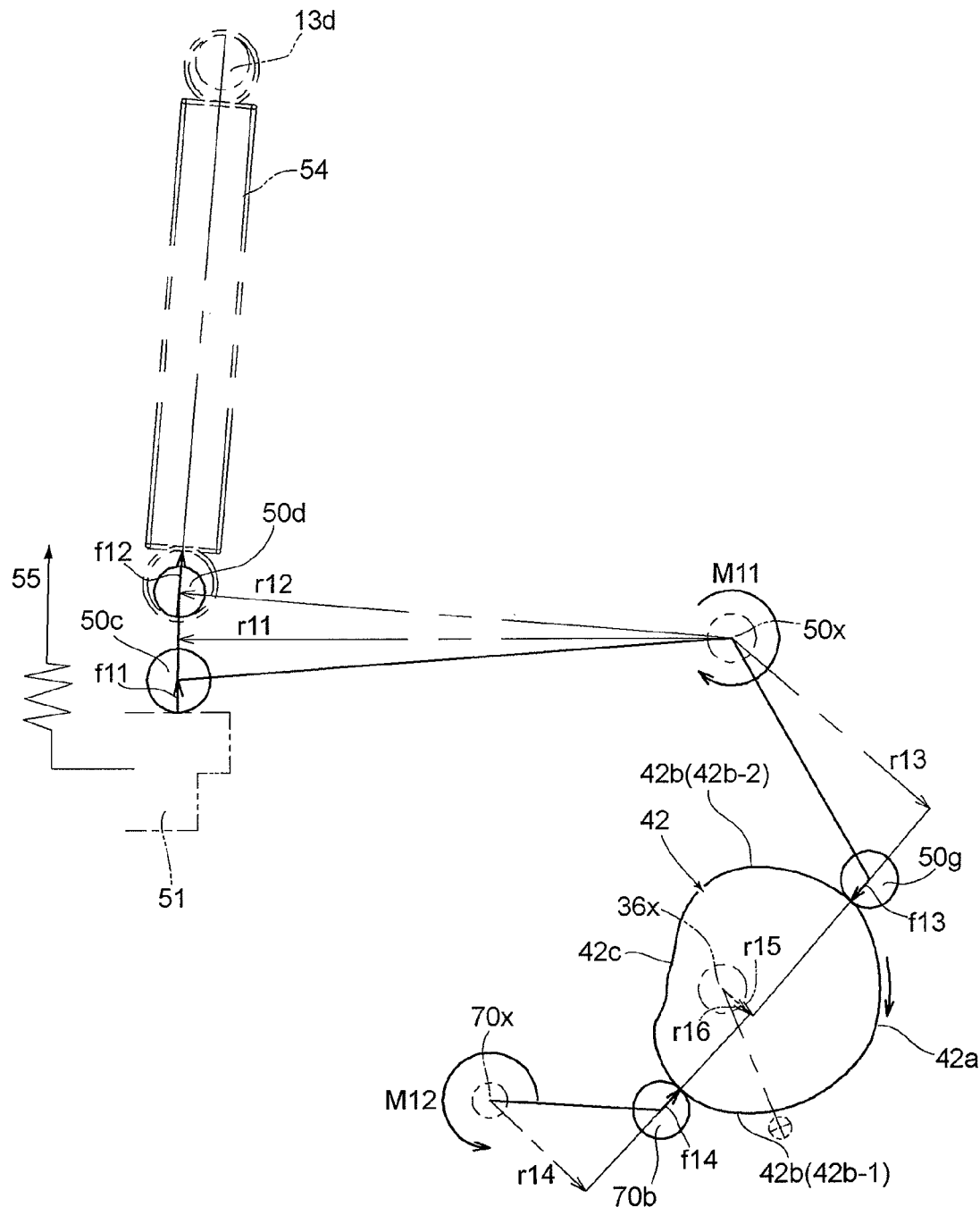
FIG. 29 is a conceptual diagram showing the relationship between forces acting on the second cam-incorporated gear by the shutter charge lever and the balancer lever in a state where the second cam-incorporated gear has been rotated from the position shown in FIG. 28 and the shutter charge lever is in the process of being rotated toward the charge release position by the second shutter control cam.
Figure 30:
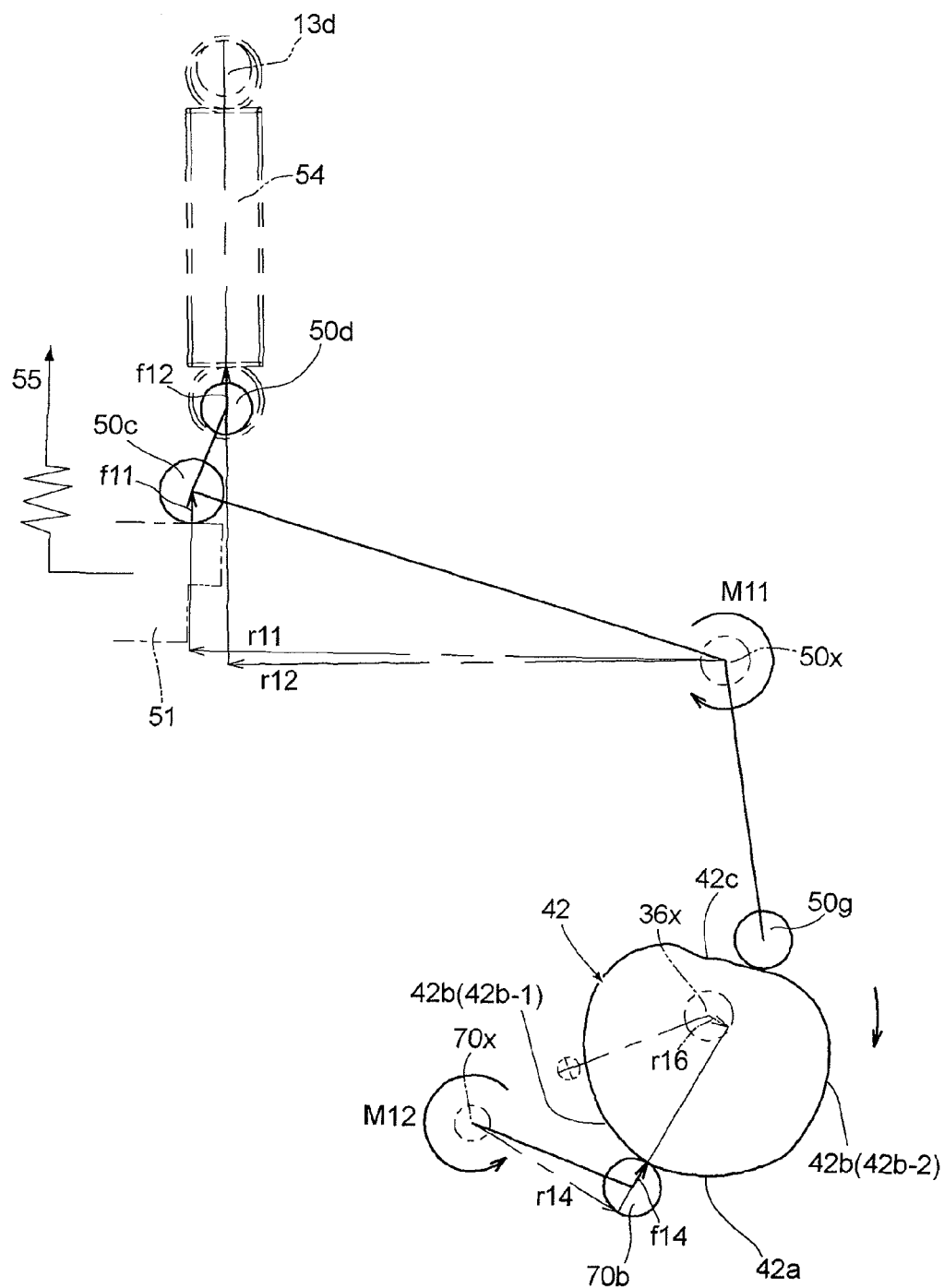
FIG. 30 is a conceptual diagram showing the relationship between forces acting on the second cam-incorporated gear by the shutter charge lever and the balancer lever in a state where the second cam-incorporated gear has been further rotated from the position shown in FIG. 29 and the shutter charge lever has been rotated to the charge release position by the second shutter control cam.

FIGS. 25 through 30 schematically show the relationship between forces acting on the second cam-incorporated gear 36 in the live view mode. In FIGS. 25 through 30, the arrow f11 represents the force acting on the second cam-incorporated gear 36 from the shutter setting lever 51; more specifically, the arrow f11 shown in FIGS. 25 through 28 represents a combination of the biasing force (restoring force) of the setting lever restoring spring 55 and the shutter charge load on the second cam-incorporated gear 36, and the arrow f11 shown in FIGS. 29 and 30 represents the biasing force (restoring force) of the setting lever restoring spring 55. In FIGS. 25 through 30, the arrow f12 represents the biasing force (restoring force) of the charge lever restoring spring 54, the arrow f13 represents the pressure force of the second cam follower 50g on a cam surface of the second shutter control cam 42, the arrow f14 represents the pressure force of the cam follower 70b of the balancer lever 70 on a cam surface of the second shutter control cam 42. In addition, in FIGS. 25 through 30, the arrow r11 represents the radial distance from the center of rotation of the shutter charge lever 50 (i.e., the axis of the rotational shaft 50x) to the arrow f11, the arrow r12 represents the radial distance from the center of rotation of the shutter charge lever 50 (i.e., the axis of the rotational shaft 50x) to the arrow f12, the arrow r13 represents the radial distance from the center of rotation of the shutter charge lever 50 (i.e., the axis of the rotational shaft 50x) to the arrow f13, the arrow r14 represents the radial distance from the center of rotation of the balancer lever 70 (i.e., the axis of the rotational shaft 70x) to the arrow f14, the arrow r15 represents the radial distance from the center of rotation of the second cam-incorporated gear 36 (i.e., the axis of the rotational shaft 36x) to the arrow f13, and the arrow r16 represents the radial distance from the center of rotation of the first cam-incorporated gear 36 (i.e., the axis of the rotational shaft 36x) to the arrow f14. Additionally, in FIGS. 25 through 30, the arrow M11 represents the rotational moment of the shutter charge lever 50 produced by the forces f11 and f12, and the arrow M12 represents the rotational moment of the balancer lever 70 produced by the balancer lever biasing spring 71. In the following descriptions, T11 designates the surplus torque acting on the second cam-incorporated gear 36 in the same rotational direction as the direction of rotation (clockwise direction) of the second cam-incorporated gear 36 caused by rotation of the planetary gear 33 and T12 designates the torque (hereinafter referred to as the load torque) acting on the second cam-incorporated gear 36 in the direction (counterclockwise direction) opposite to the direction of rotation of the second cam-incorporated gear 36.

Figure 8:
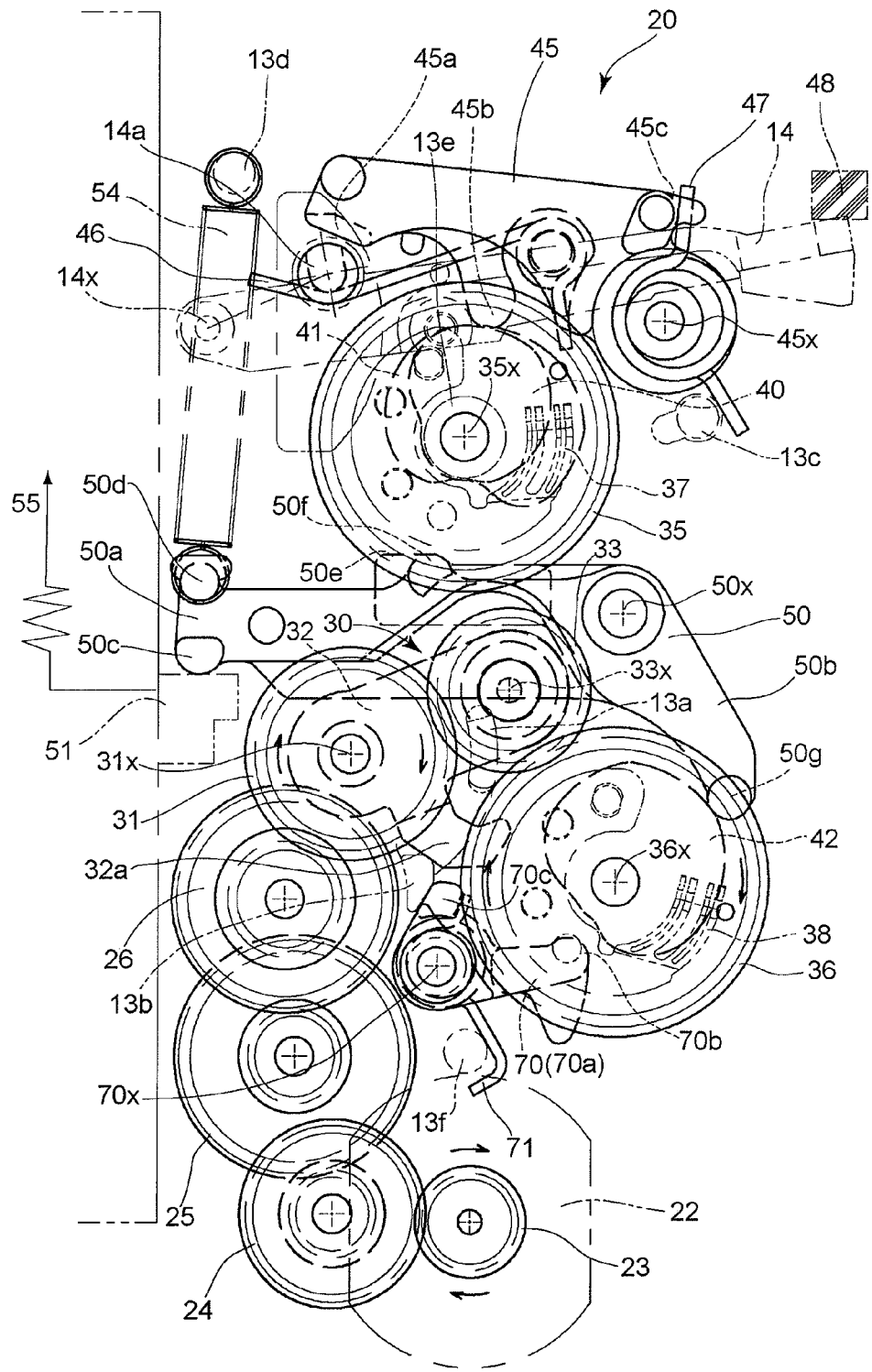
FIG. 8 is a side elevational view of the mirror/shutter drive mechanism in a state where the second cam-incorporated gear has been rotated from the state shown in FIG. 7 and a charge operation performed by the shutter charge lever has been completed.
Figure 18:
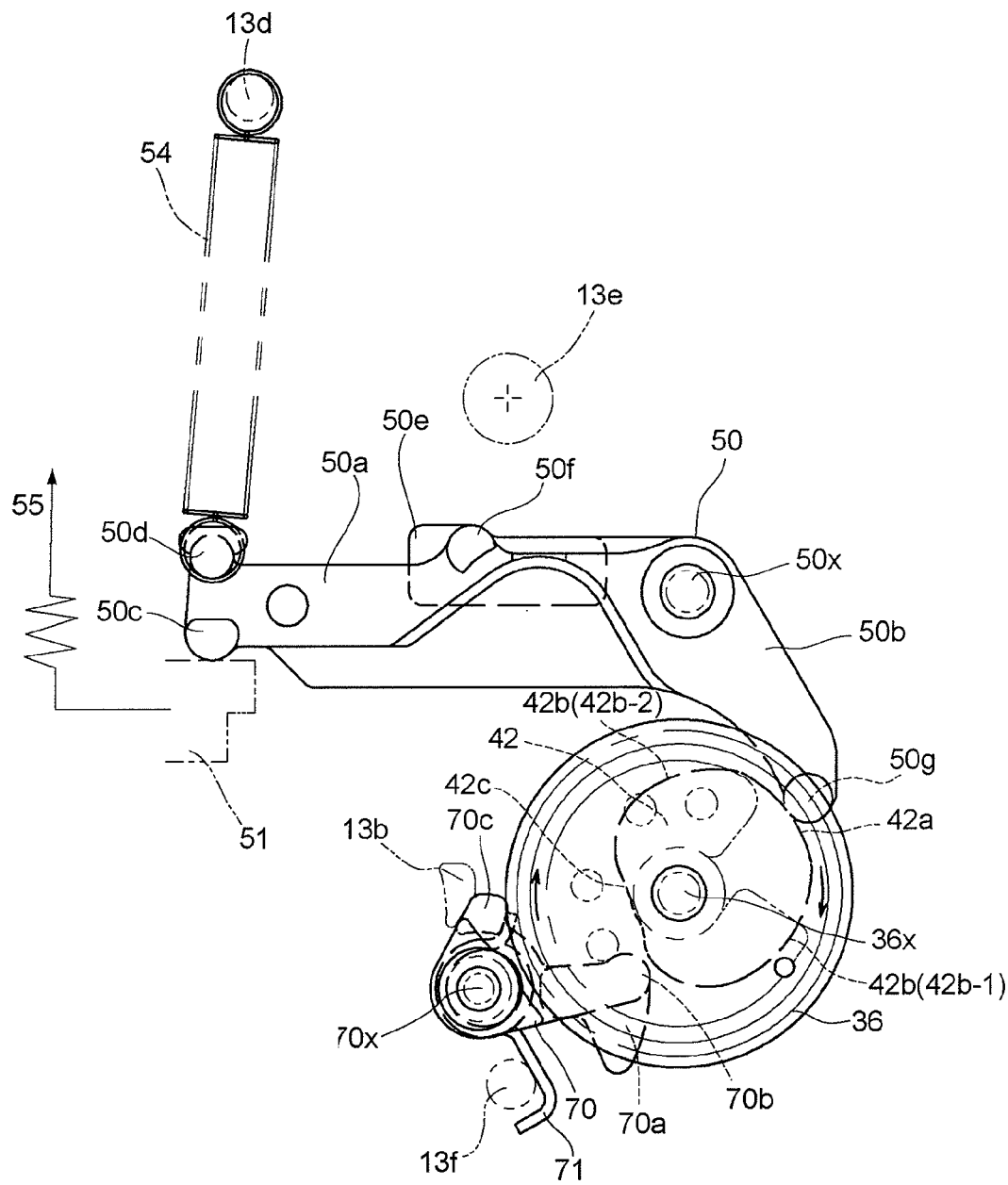
FIG. 18 is a side elevational view of the second cam-incorporated gear, the shutter charge lever, a balancer lever and associated elements, showing the relative position between the second cam-incorporated gear, the shutter charge lever and the balancer lever when the second cam-incorporated gear is positioned at the shutter charge completion position shown in FIG. 8.
Figure 32:
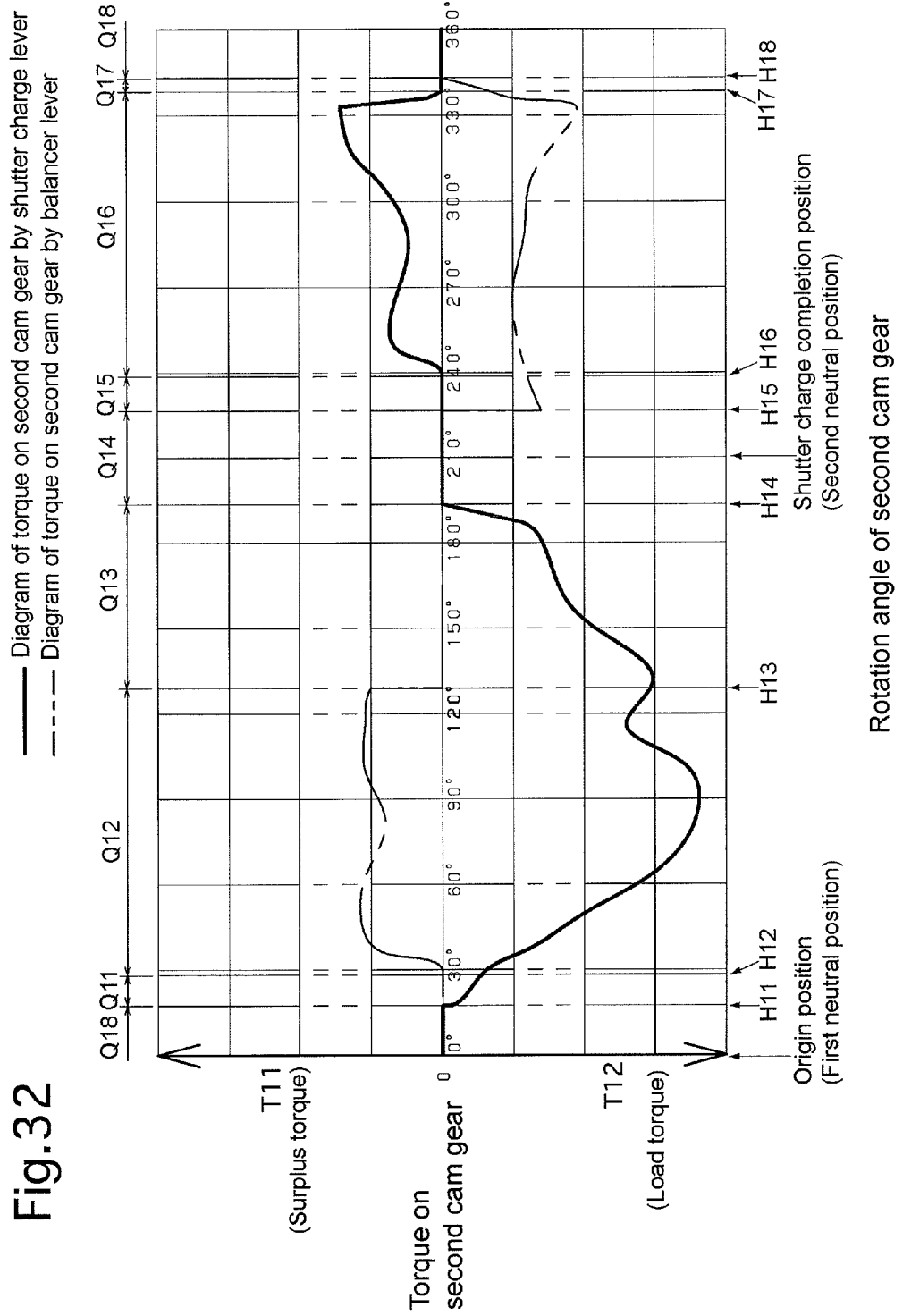
FIG. 32 is a graph showing the relationship between forces acting on the second cam-incorporated gear by the shutter charge lever and the balancer lever when the second cam-incorporated gear rotates by one revolution from the origin position thereof.

FIG. 32 is a graph showing the relationship between the surplus torque T11 and the load torque T12 that act on the second cam-incorporated gear 36 in the photographing operation in the live view mode until when the second cam-incorporated gear 36 returns to the origin position shown in FIGS. 7 and 17 from the same origin position via the shutter charge completion position shown in FIGS. 8 and 18. As described above with reference to FIG. 14, when a photographing operation is performed in the live view mode, the second cam-incorporated gear 36 is rotated two turns in a single photographing operation. On the other hand, the horizontal axis shown in FIG. 32 represents the rotation operation of the second cam-incorporated gear 36 when it rotates by one revolution (360 degrees), and accordingly, a series of torque variations shown in FIG. 31 is repeated twice during the single photographing operation. As can be seen from FIG. 32, there are two positions (neutral positions) where neither the surplus torque T11 nor the load torque T12 acts on the second cam-incorporated gear 36. One of the two neutral positions corresponds to the origin position (first neutral position) of the second cam-incorporated gear 36 and the other corresponds to the shutter charge completion position (second neutral position).

First of all, variations in load on the second cam-incorporated gear 36 from the origin position to the shutter charge completion position will be discussed hereinafter. The shutter charge lever 50 (shutter charge system) serves as a source of acting the load torque T12 on the second cam-incorporated gear 36 because the second shutter control cam 42 continues to press the shutter charge lever 50 toward the charge position (in which the second cam follower 50g is positioned at the cam-axis separated position thereof) against the biasing forces of the charge lever restoring spring 54, the setting lever restoring spring 55 and the shutter charge load from the origin position until the shutter charge completion position. On the other hand, the balancer lever 70 is gradually released from the pressure of the second shutter control cam 42 to thereby rotate toward the cam-axis vicinity position by the biasing force of the balancer lever biasing spring 71, and accordingly, the balancer lever 70 serves as a source of acting the surplus torque T11 on the second cam-incorporated gear 36. The surplus torque T11 and the load torque T12 during the operation of the second cam-incorporated gear 36 from the origin position to the mirror-up completion position can be determined by the following equations (5) and (6), respectively:

$$T11 = f14 \times r16 \quad (5)$$

wherein $f14 = M12/r14$, $$T12 = f13 \times r15 \quad (6)$$

wherein $f13 = M11/r13$, $M11 = f11 \times r11 + f12 \times r12$.

At the origin position (first neutral position) of the second cam-incorporated gear 36, as shown in FIG. 17, since the shutter charge lever 50 is held in the shutter charge release position (in which the second cam follower 50g is positioned at the cam-axis vicinity position thereof) by the contact engagement between the stopper portion 50e and the swing limit protrusion 13e and since the second cam follower 50g faces the relief cam portion 42c of the second shutter control cam 42 with a slight distance therebetween, no torque acts on the second cam-incorporated gear 36 from the shutter charge lever 50. Namely, T12 is equal to zero (T12=0). In addition, the balancer lever 70 is held in the cam-axis separated position by making the cam follower 70b contact the constant-radius cam portion 42a of the second shutter control cam 42. In this state where the cam follower 70b is in contact with the constant-radius cam portion 42a, r16 is equal to zero (r16=0) since the direction of action of f14 is coincident with a radial direction of the second cam-incorporated gear 36 about the rotational shaft 36x. Consequently, the equation "T11=f14× 0=0" is satisfied. Therefore, no torque acts on the second cam-incorporated gear 36 from either the shutter charge lever 50 or the balancer lever 70.

Figure 25:
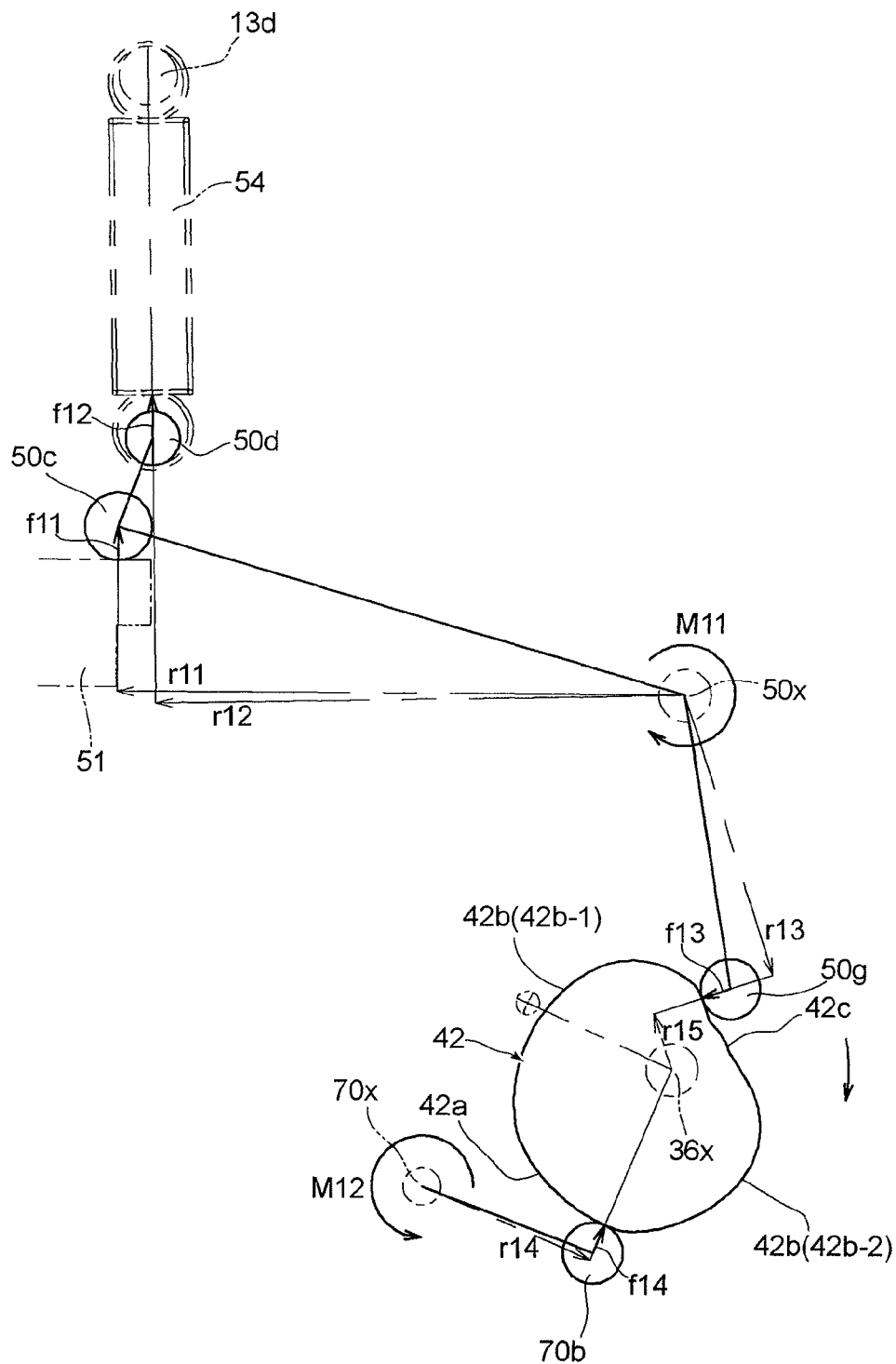
FIG. 25 is a conceptual diagram showing the relationship between forces acting on the second cam-incorporated gear by the shutter charge lever and the balancer lever in a state where the second cam-incorporated gear has been rotated from the origin position shown in FIG. 7 and a load torque caused by the shutter charge lever has started acting on the second cam-incorporated gear in the photographing operation in the live view mode.

FIG. 25 shows a state where the second cam-incorporated gear 36 has been slightly rotated from the origin position shown in FIGS. 7 and 17 to reach a position H1 shown in FIG. 32. In this state, the cam follower 70b of the balancer lever 70 is still in contact with the constant-radius cam portion 42a of the second shutter control cam 42 following the origin position, so that no torque acts on the second cam-incorporated gear 36 from the balancer lever 70. Namely, T11 is equal to zero (T11=0). On the other hand, the second cam follower 50g of the shutter charge lever 50 moves from a state of being spaced from and facing the relief cam portion 42c of the second shutter control cam 42 to a state of being in contact with the first non-constant-radius cam portion 42b-1 and pushed up thereby, which causes the shutter charge lever 50 to commence rotating toward the charge position of the shutter charge lever 50 (this rotation is shown by K6 or K22 in FIG. 14). Thereupon, the direction of action of f13 does not coincide with a radial direction of the rotational axis 36x, and r15 becomes unequal to zero (i.e., r15≠0), so that the rotational moment M11 of the shutter charge lever 50 comes to act as the load torque T12 on the second cam-incorporated gear 36.

Namely, upon commencement of rotation of the second cam-incorporated gear 36 from the origin position, firstly the surplus torque T11 does not act on the second cam-incorporated gear 36 but only the load torque T12 acts on the second cam-incorporated gear 36 prior to the surplus torque T11 (see section Q11 shown in FIG. 32).

Figure 26:
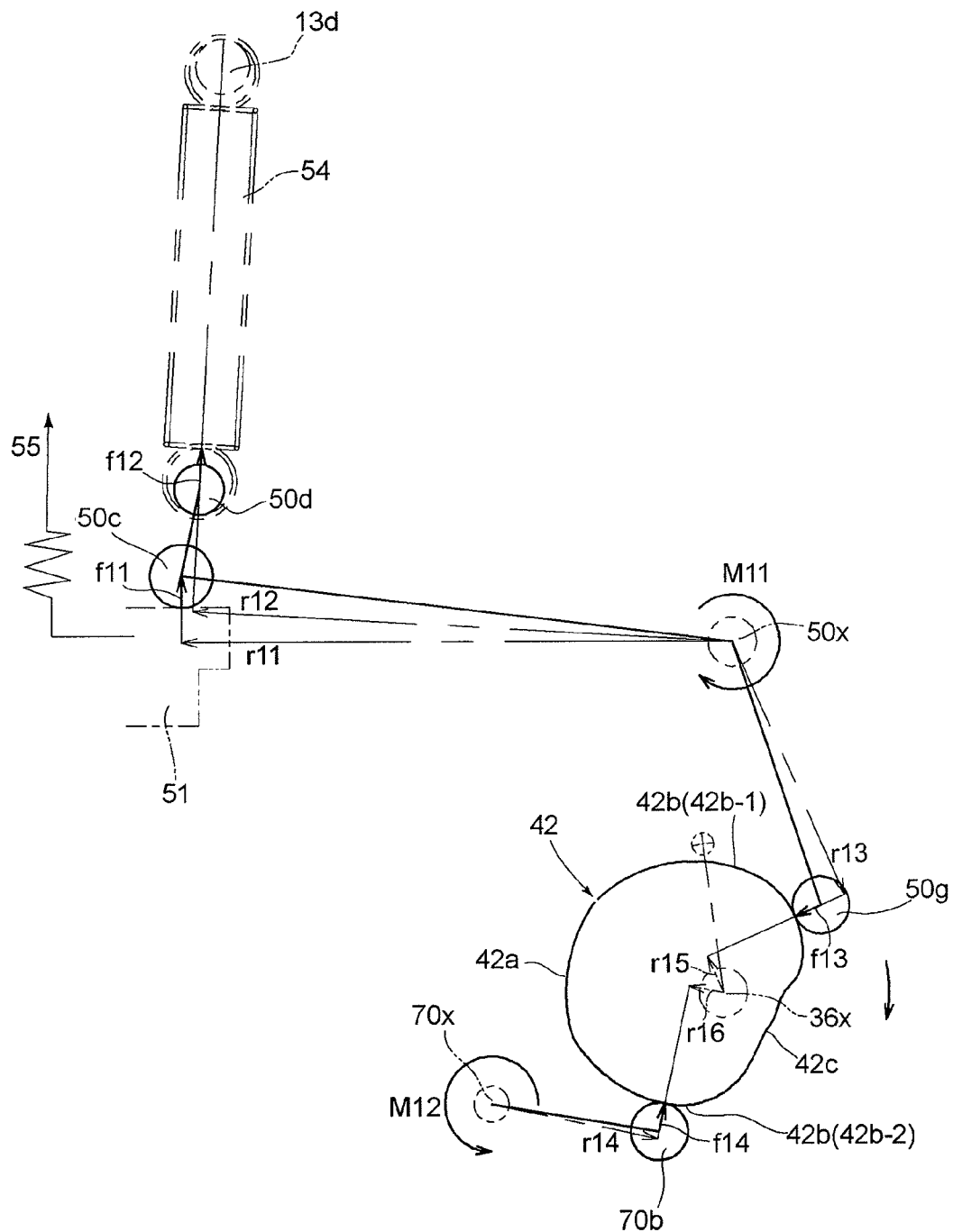
FIG. 26 is a conceptual diagram showing the relationship between forces acting on the second cam-incorporated gear by the shutter charge lever and the balancer lever in a state where the second cam-incorporated gear has been rotated from the position shown in FIG. 25 and the shutter charge lever is in the process of being rotated toward a charge position by a second shutter control cam.

Further rotation of the second cam-incorporated gear 36 causes the cam follower 70*b* of the balancer lever 70 to change the contact position thereof with the second shutter control cam 42 from the constant-radius cam portion 42*a* to the second non-constant cam portion 42*b*-2 at a position H12 shown in FIG. 32, which causes the balancer lever 70 to rotate in the biasing direction of the balancer lever biasing spring 71 with the cam follower 70*b* pressing the non-constant-radius cam portion 42*b*. Thereupon, as shown in FIG. 26, the direction of action of f14 changes so that r16 becomes unequal to zero (i.e., r16≠0), so that the rotational moment M12 of the balancer lever 70 comes to act as the surplus torque T11 on the second cam-incorporated gear 36. Thereafter, the surplus torque T11 and the load torque T12 simultaneously act on the second cam-incorporated gear 36 (see section Q12 shown in FIG. 32). However, as can be seen from FIG. 32, the condition T11<T12 is satisfied at all times in section Q12, so that the load torque having the magnitude T12-T11 acts on the second cam-incorporated gear 36. In other words, the cam curves of the first non-constant-radius cam portion 42*b*-1 and the second non-constant cam portion 42*b*-2 of the second shutter control cam 42 and the spring loads (loads on the second cam-incorporated gear 36 by the charge lever restoring spring 54 and the balancer lever biasing spring 71) are predetermined so that T11 always is smaller than T12 in section Q12, in which the surplus torque T11 and the load torque T12 simultaneously act on the second cam-incorporated gear 36. Although the condition T11<T12 is satisfied at all times in section Q12 in the present embodiment, a similar effect is achieved if at least the condition T11≦T12 is satisfied.

Upon the second cam-incorporated gear 36 reaching a position H13 shown in FIG. 32, the cam follower 70*b* of the balancer lever 70 moves from a state of being in contact with the second non-constant-radius cam portion 42*b*-2 of the second shutter control cam 42 to a state of being spaced from and facing the relief cam portion 42*c* of the second shutter control cam 42. At this point, as shown in FIG. 27, the balancer lever 70 is held in the cam-axis vicinity position, in which the limit arm 70*c* is in contact with the swing movement limit protrusion 13*b* of the mirror box 13, and the cam follower 70*b* is spaced from the relief cam portion 42*c* of the second shutter control cam 42. This causes the surplus torque T11 to stop acting on the second cam-incorporated gear 36. On the other hand, in the state shown in FIG. 27, the shutter charge lever 50 continues being pressed and rotated toward the charge position by the non-constant-radius cam portion 42*b*-1 of the second shutter control cam 42, so that the load torque T12 continues acting on the second cam-incorporated gear 36 (see section Q13 shown in FIG. 32). Upon the second cam-incorporated gear 36 rotating to a position H14 shown in FIG. 32 from the state shown in FIG. 27, the second cam follower 50*g* of the shutter charge lever 50 comes in contact with the constant-radius portion 42*a* of the second shutter control cam 42, so that the shutter charge lever 50 is held in the charge position (in which the second cam follower 50*g* is positioned at the cam-axis separated position thereof) by contact engagement of the second cam follower 50*g* and the constant-radius portion 42*a* of the second shutter control cam 42. In this state where the second cam follower 50*g* and the constant-radius portion 42*a* are in contact with each other, r15 is equal to zero (r15=0). As a result, the load torque T12 becomes zero. Thereafter, in section Q14 shown in FIG. 32 in which both the surplus torque T11 and the load torque T12 are zero, the second cam-incorporated gear 36 reaches the shutter charge completion position (second neutral position) shown in FIGS. 8 and 18.

Namely, the shape of the second shutter control cam 42 (specifically the shapes of the portions of the second shutter control cam 42 on which the first non-constant-radius cam portion 42*b*-1 and the second non-constant-radius cam portion 42*b*-2 are formed, respectively) is determined so that the commencement (H11 shown in FIG. 32) of rotation of the shutter charge lever 50 toward the charge position occurs before (earlier than) the commencement (H12 shown in FIG. 32) of rotation of the balancer lever 70 toward the cam-axis vicinity position, and so that the termination (H14 shown in FIG. 32) of the rotation of the shutter charge lever 50 toward the charge position occurs after (later than) the termination (H13 shown in FIG. 32) of the rotation of the balancer lever 70 toward the cam-axis vicinity position when the second cam-incorporated gear 36 rotates from the origin position (first neutral position) to the shutter charge completion position (second neutral position) in the photographing operation in the live view mode. In addition, the first non-constant-radius cam portion 42*b*-1 and the second non-constant-radius cam portion 42*b*-2 are respectively given cam curves designed for making the load torque T12, which is caused by the shutter charge lever 50, greater than the surplus torque T11, which is caused by the balancer lever 70, when the shutter charge lever 50 and the balancer lever 70 are guided and rotated simultaneously by the first non-constant-radius cam portion 42*b*-1 and the second non-constant-radius cam portion 42*b*-2, respectively (see section Q12 shown in FIG. 32). Such cam curves can be determined based on various conditions comprising the aforementioned equations (5) and (6). Accordingly, the timing at which the surplus torque T11 and the load torque T12 act on the second cam-incorporated gear 36 by the shutter charge lever 50 and the balancer lever 70 and the magnitude correlation between the surplus torque T11 and the load torque T12 are predetermined so that only the load torque T12 that is caused by the shutter charge lever 50 acts on the second cam-incorporated gear 36 at an initial stage of a rotation thereof from the origin position to the charge completion position, so that the load torque T12 that is caused by the shutter charge lever 50 becomes greater at all times than the surplus torque T11 that is caused by the balancer lever 70 at an intermediate stage of the rotation of the second cam-incorporated gear 36 and so that only the load torque T12 acts again on the second cam-incorporated gear 36 at a final stage of the rotation of the second cam-incorporated gear 36.

When the second cam-incorporated gear 36 rotates from the shutter charge completion position (second neutral position) shown in FIGS. 8 and 18 to the origin position (first neutral position) shown in FIGS. 7 and 17, the balancer lever 70 including the balancer lever biasing spring 71 serves as a source of acting the load torque T12 on the second cam-incorporated gear 36 because the second shutter control cam 42 continues to press the balancer lever 70 toward the cam-axis separated position against the biasing force of the balancer lever biasing spring 71, conversely to the operation in the sections Q11 through Q13 shown in FIG. 32. On the other hand, the shutter charge lever 50 is gradually released from the pressure of the second shutter control cam 42 to thereby rotate toward the cam-axis release position (in which the second cam follower 50*g* is positioned at the cam-axis vicinity position thereof) by the biasing forces of the charge lever restoring spring 54 and the setting lever restoring spring 55, and accordingly, the shutter charge lever 50 (shutter charge system) serves as a source of acting the surplus torque T11 on the second cam-incorporated gear 36. The surplus torque T11 and the load torque T12 can be determined from the shutter charge completion position to the origin position by the following equations (7) and (8), respectively:

$$T11=f13\times r15 \tag{7}$$

wherein $f13=M11/r13$, $M11=f11\times r11+f12\times r12$ $$T12=f14\times r16 \tag{8}$$

wherein $f14=M12/r14$.

FIG. 28 shows a state where the second cam-incorporated gear 36 has been slightly rotated from the origin position shown in FIGS. 8 and 18 to reach a position H15 shown in FIG. 32. In this state, the second cam follower 50g of the shutter charge lever 50 is still in contact with the constant-radius cam portion 42a of the second shutter control cam 42, so that no torque acts on the second cam-incorporated gear 36 from the shutter charge lever 50. Namely, T11 is equal to zero (T11=0). On the other hand, the cam follower 70b of the balancer lever 70 moves from a state of being spaced from and facing the relief cam portion 42c of the second shutter control cam 42 to a state of being in contact with the first non-constant-radius cam portion 42b-1 and pressed toward the cam-axis separated position against the biasing force of the balancer lever biasing spring 71. Thereupon, the direction of action of f14 does not coincide with a radial direction of the rotational axis 36x, and r16 becomes unequal to zero (i.e., r16≠0), so that the rotational moment M12 of the balancer lever 70 comes to act as the load torque T12 on the second cam-incorporated gear 36. Namely, upon commencement of rotation of the second cam-incorporated gear 36 from the shutter charge completion position, firstly the surplus torque T11 does not act on the second cam-incorporated gear 36 but only the load torque T12 acts on the second cam-incorporated gear 36 prior to the surplus torque T11 (see section Q15 shown in FIG. 32).

Further rotation of the second cam-incorporated gear 36 causes the second cam follower 50g of the shutter charge lever 50 to change the contact position thereof with the second shutter control cam 42 from the constant-radius cam portion 42a to the second non-constant cam portion 42b-2 at a position H16 shown in FIG. 32, which causes the shutter charge lever 50 to rotate toward the charge release position (this rotation is shown by K12 or K28 in FIG. 14). Thereupon, as shown in FIG. 29, the direction of action of f13 changes so that r15 becomes unequal to zero (i.e., r15≠0), so that the rotational moment M11 of the shutter charge lever 50 comes to act as the surplus torque T11 on the second cam-incorporated gear 36. Thereafter, the surplus torque T11 and the load torque T12 simultaneously act on the second cam-incorporated gear 36 (see section Q16 shown in FIG. 32). However, as can be seen from FIG. 32, similar to the above described section Q12, the condition T11<T12 is satisfied at all times in section Q16, so that the load torque having the magnitude T12-T11 acts on the second cam-incorporated gear 36. In other words, the cam curves of the first non-constant-radius cam portion 42b-1 and the second non-constant cam portion 42b-2 of the second shutter control cam 42 and the spring loads (loads on the second cam-incorporated gear 36 by the charge lever restoring spring 54 and the balancer lever biasing spring 71) are predetermined so that T11 always is smaller than T12 in section Q16, in which the surplus torque T11 and the load torque T12 simultaneously act on the second cam-incorporated gear 36. Although the condition T11<T12 is satisfied at all times in section Q16 in the present embodiment, a similar effect is achieved if at least the condition T11≦T12 is satisfied.

Upon the second cam-incorporated gear 36 reaching a position H17 shown in FIG. 32, the shutter charge lever 50 reaches the charge release position (in which the second cam follower 50g is positioned at the cam-axis vicinity position thereof) (see K15 or K31 shown in FIG. 14). In this state, as shown in FIG. 30, the second cam follower 50g moves from a state of being in contact with the second non-constant-radius cam portion 42b-2 of the second shutter control cam 42 to a state of being spaced from and facing the relief cam portion 42c of the second shutter control cam 42, so that the shutter charge lever 50 is held by engagement of the stopper portion 50e with the swing limit protrusion 13e. Consequently, the pressure of the second cam follower 50g on the second shutter control cam 42 is released, which makes the surplus torque T11 stop acting on the second cam-incorporated gear 36. On the other hand, the balancer lever 70 continues to be pressed and rotated by the second non-constant-radius cam portion 42b-2 of the second shutter control cam 42 (see section Q17 shown in FIG. 32). Upon the second cam-incorporated gear 36 slightly rotating to a position H18 shown in FIG. 32 from the state shown in FIG. 30, the cam follower 70b of the balancer lever 70 comes in contact with the constant-radius portion 42a of the second shutter control cam 42, so that the balancer lever 70 is held in the cam-axis separated position by contact engagement between the cam follower 70b and the constant-radius portion 42a. In this state where the cam follower 70b and the constant-radius portion 42a are in contact with each other, r16 is equal to zero (r16=0). As a result, the load torque T12 becomes zero. Thereafter, in section Q18 shown in FIG. 32 in which both the surplus torque T11 and the load torque T12 are zero, the second cam-incorporated gear 36 reaches the origin position (first neutral position) shown in FIGS. 7 and 17.

Namely, the shape of the second shutter control cam 42 (specifically the shapes of the portions of the second shutter control cam 42 on which the first non-constant-radius cam portion 42b-1 and the second non-constant-radius cam portion 42b-2 are formed, respectively) is determined so that the commencement (H15 shown in FIG. 32) of rotation of the balancer lever 70 toward the cam-axis separated position occurs before (earlier than) the commencement (H16 shown in FIG. 32) of rotation of the shutter charge lever 50 toward the charge release position and so that the termination (H18 shown in FIG. 32) of the rotation of the balancer lever 70 toward the cam-axis separated position occurs after (later than) the termination (H17 shown in FIG. 32) of the rotation of the shutter charge lever 50 toward the charge release position when the second cam-incorporated gear 36 rotates from the shutter charge completion position (second neutral position) to the origin position (first neutral position) in the photographing operation during the live view mode. In addition, the first non-constant-radius cam portion 42b-1 and the second non-constant-radius cam portion 42b-2 are respectively provided with cam curves designed for making the load torque T12, which is caused by the balancer lever 70, greater than the surplus torque T11, which is caused by the shutter charge lever 50, when the shutter charge lever 50 and the balancer lever 70 are guided and rotated simultaneously by the second non-constant-radius cam portion 42b-2 and the first non-constant-radius cam portion 42b-1 of the second shutter control cam 42, respectively (see section Q16 shown in FIG. 32). Such cam curves can be determined based on various conditions comprising the aforementioned equations (7) and (8). Accordingly, the timing at which the surplus torque T11 and the load torque T12 act on the second cam-incorporated gear 36 by the shutter charge lever 50 and the balancer lever 70 and the magnitude correlation between the surplus torque T11 and the load torque T12 are predetermined so that only the load torque T12 that is caused by the balancer lever 70 acts on the second cam-incorporated gear 36 at an initial stage of a rotation thereof from the charge completion position to the origin position, so that the load torque T12 that is caused by the balancer lever 70 becomes greater at all times than the surplus torque T11 that is caused by the shutter charge lever 50 at an intermediate stage of the rotation of the second cam-incorporated gear 36 and so that only the load torque T12 again acts on the second cam-incorporated gear 36 at a final stage of the rotation of the second cam-incorporated gear 36.

As can be understood from the above descriptions, in the present embodiment of the mirror/shutter drive mechanism 20, when the first cam-incorporated gear 35 and the second cam-incorporated gear 36 are selectively driven to rotate via the planetary gear mechanism 30, the planet gear 33 can be securely brought into engagement with either of the first and second cam-incorporated gears 35 and 36 because the shapes of the mirror control cam 40, the first shutter control cam 41 and the second shutter control cam 42 are predetermined so that the sum of the torques which act on the first cam-incorporated gear 35 or the second cam-incorporated gear 36 by the mirror drive lever 45, the shutter charge lever 50 and/or the balancer lever 70 does not become a torque which acts on the first cam-incorporated gear 35 or the second cam-incorporated gear 36 in a direction to excessively boost the rotation thereof, which makes it possible to achieve high-precision driving.

Figure 33:
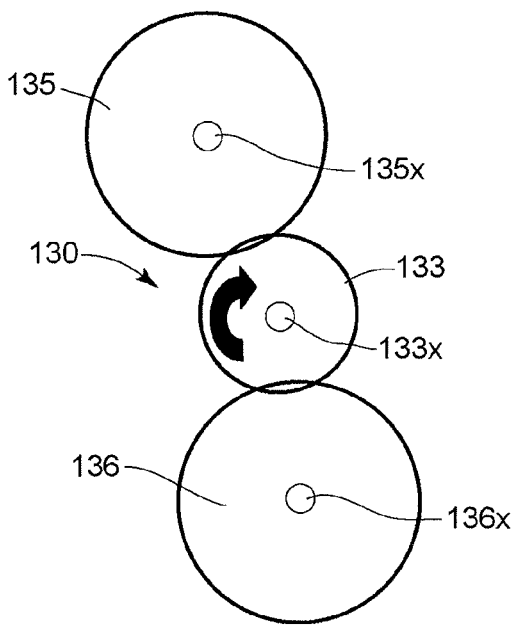
FIG. 33 is a conceptual diagram showing another embodiment of a driving force transmission switcher for transmitting a motor driving force selectively to two cam-incorporated gears, wherein the driving force transmission switcher is composed of a slide gear mechanism.
Figure 34:
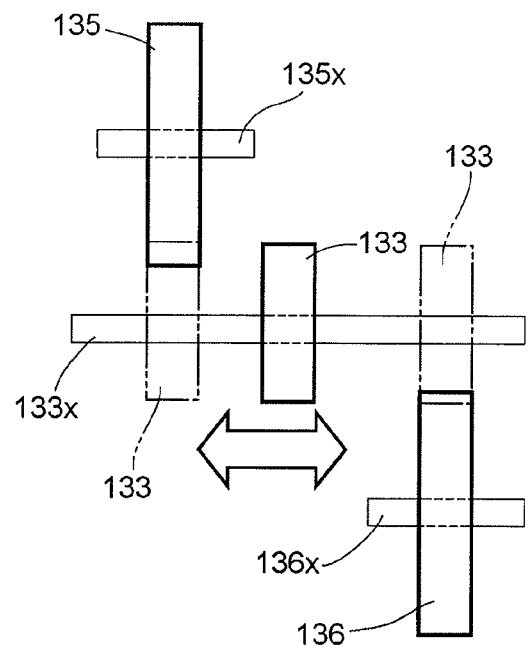
FIG. 34 is a side elevational view of the gears of the slide gear mechanism shown in FIG. 33.

Although the planetary gear mechanism 30 is used as driving force transmission switcher for transmitting the driving force of the drive motor 22 selectively to the first cam-incorporated gear 35 and the second cam-incorporated gear 36 in the above illustrated embodiment of the mirror/shutter drive mechanism, it is possible to use another type of driving force transmission switcher having a different structure. FIGS. 33 and 34 shows another embodiment of the driving force transmission switcher that is configured of a slide gear mechanism 130. Although the detailed descriptions thereof will be omitted herein, the slide gear mechanism 130, which corresponds to the planetary gear mechanism 30 of the previous embodiment of the mirror/shutter drive mechanism, is provided with a first cam-incorporated gear (an element of the first operating mechanism) 135 and a second cam-incorporated gear (an element of the second operating mechanism) 136 which correspond to the first cam-incorporated gear 35 and the second cam-incorporated gear 36 of the previous embodiment of the mirror/shutter drive mechanism, respectively. The first cam-incorporated gear 135 and the second cam-incorporated gear 136 are supported to be rotatable about a rotational shaft 135x and a rotational shaft 136x, respectively, which are substantially parallel to each other. The first cam-incorporated gear 135 and the second cam-incorporated gear 136 are positioned at different positions in the axial direction of the rotational shaft 135x and the rotational shaft 136x (the horizontal direction with respect to FIG. 34). The slide gear mechanism 130 is further provided between the first cam-incorporated gear 135 and the second cam-incorporated gear 136 with a slide gear (axial-direction movable gear) 133 that is rotatable about a rotational shaft 133x extending parallel to the rotational axes of the first cam-incorporated gear 135 and the second cam-incorporated gear 136. The slide gear mechanism 133 is supported by a rotational shaft 133x to be slidable thereon to be selectively movable between two positions shown by two-dot chain lines in FIG. 34, namely, a first position in which the slide gear mechanism 133 is engaged with the first cam-incorporated gear 135 to transmit a motor driving force (rotational force) to the first cam-incorporated gear 135, and a second position in which the slide gear mechanism 133 is engaged with the second cam-incorporated gear 136 to transmit the motor driving force to the second cam-incorporated gear 136. With this type of the slide gear mechanism 130 also, a mirror/shutter drive mechanism which does not cause the mirror to perform any unnecessary operation in the photographing operation during the live view mode can be made compact and lightweight.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
a mirror movable between a viewing position, in which said mirror reflects incident light from an imaging optical system toward a viewfinder optical system, and a retracted position, in which said mirror is retracted so that light which is passed through said imaging optical system is incident on an image sensor without being reflected by said mirror;
a shutter which, when shut, prevents said light that is passed through said imaging optical system from being incident on said image sensor, and, when open, allows said light that is passed through said imaging optical system to be incident on said image sensor;
a reversible motor;
a first operating mechanism which moves said mirror and carries out a shutter charge operation of said shutter when engaged with said reversible motor and driven thereby;
a second operating mechanism which carries out said shutter charge operation of said shutter without moving said mirror when engaged with said reversible motor and driven thereby; and
a driving force transmission switcher, said driving force transmission switcher comprising a single switching gear that is arranged to rotate and to move in accordance with a rotational direction of said reversible motor,
wherein, when said reversible motor rotates in a first rotational direction, said single switching gear of said driving force transmission switcher engages with a gear that is part of said first operating mechanism to transmit a driving force of said reversible motor to said first operating mechanism; and
wherein, when said reversible motor rotates in a second rotational direction, said single switching gear of said driving force transmission switcher engages with a gear that is part of said second operating mechanism to transmit a driving force of said reversible motor to said second operating mechanism.

2. The imaging apparatus according to claim 1, wherein said first operating mechanism and said second operating mechanism comprise a shutter charge lever which is shared therebetween and is swingable between a charge release position to allow said shutter to travel and a charge position to carry out said shutter charge operation after completion of traveling of said shutter,
wherein said first operating mechanism further comprises:
a mirror drive lever swingable between a mirror-down position to hold said mirror in said viewing position and a mirror-up position to hold said mirror in said retracted position; and a first cam-incorporated gear which includes a mirror control cam for controlling swing movement of said mirror drive lever and a first shutter control cam for controlling swing movement of said shutter charge lever, said first cam-incorporated gear comprising said gear that is part of said first operating mechanism, wherein said second operating mechanism further comprises a second cam-incorporated gear including a second shutter control cam for controlling the swing movement of said shutter charge lever, said second cam-incorporated gear comprising said gear that is part of said second operating mechanism, wherein said driving force transmission switcher comprises a planetary gear mechanism including: a sun gear rotated in one direction and the other direction by rotations of said reversible motor in said first rotational direction and in said second rotational direction, respectively; and a planet gear engaged with and revolving around said sun gear, said planet gear comprising said single switching gear and being rotatably supported by a swing arm swingable about said sun gear, and wherein said planet gear is brought into engagement with said first cam-incorporated gear and said second cam-incorporated gear by said rotations of said reversible motor in said first rotational direction and in said second rotational direction, respectively.

3. The imaging apparatus according to claim 2, further comprising at least one swing movement limit portion, formed on a stationary member which supports said mirror, for limiting a swinging range of said swing arm to define both ends of said swinging range.

4. The imaging apparatus according to claim 1, wherein said first operating mechanism and said second operating mechanism comprise a shutter charge lever which is shared therebetween and is swingable between a charge release position to allow said shutter to travel and a charge position to carry out said shutter charge operation after completion of traveling of said shutter, wherein said first operating mechanism further comprises:
a mirror drive lever swingable between a mirror-down position to hold said mirror in said viewing position and a mirror-up position to hold said mirror in said retracted position; and a first cam-incorporated gear which includes a mirror control cam for controlling swing movement of said mirror drive lever and a first shutter control cam for controlling swing movement of said shutter charge lever, said first cam-incorporated gear comprising said gear that is part of said first operating mechanism, wherein said second operating mechanism further comprises a second cam-incorporated gear including a second shutter control cam for controlling the swing movement of said shutter charge lever, said second cam-incorporated gear comprising said gear that is part of said second operating mechanism, wherein said first cam-incorporated gear and said second cam-incorporated gear are rotatably supported by respective rotational shafts thereof which are substantially parallel to each other and positioned at different positions in an axial direction of said rotational shafts, and wherein said driving force transmission switcher comprises an axial-direction movable gear which is supported to be movable in said axial direction of said rotational shafts to be selectively engageable with said first cam-incorporated gear and said second cam-incorporated gear, said axial direction movable gear comprising said single switching gear.

5. The imaging apparatus according to claim 2, wherein one revolution of said first cam-incorporated gear caused by said rotation of said reversible motor in said first direction from an origin position causes said mirror drive lever to rotate from said mirror-down position to said mirror-up position and causes said shutter charge lever to rotate from said charge position to said charge release position, and subsequently, causes said mirror drive lever to rotate from said mirror-up position to said mirror-down position and causes said shutter charge lever to rotate from said charge release position to said charge position after completion of traveling of said shutter, and wherein one revolution of said second cam-incorporated gear caused by said rotation of said reversible motor in said second direction from an origin position causes said shutter charge lever to rotate from said charge release position to said charge position and subsequently from said charge position to said charge release position.

6. The imaging apparatus according to claim 5, further comprising:
a control circuit which controls operations of said reversible motor and opening/shutting operations of said shutter; and
a live view switch and a release switch which can be manually operated,
wherein, upon said live view switch being turned ON, said control circuit drives said reversible motor in said first direction to rotate said first cam-incorporated gear, thereby rotating said mirror drive lever from said mirror-down position to said mirror-up position, rotating said shutter charge lever from said charge position to said shutter release position, and opening said shutter to move said imaging apparatus into live view mode, in which light from said imaging optical system is continuously incident on said image sensor, and
wherein, upon said release switch being turned ON in said live view mode, said control circuit drives said reversible motor in said second direction to rotate said second cam-incorporated gear by one revolution to make said shutter charge lever swing from said charge release position to said charge position and return from said charge position to said charge release position, and thereafter make said shutter travel perform an exposure operation, and further drives said reversible motor in said second direction to rotate said second cam-incorporated gear by one revolution to make said shutter charge lever swing from said charge release position to said charge position and return from said charge position to said charge release position, and thereafter make said shutter open.

7. The imaging apparatus according to claim 6, wherein, upon said live view switch being turned OFF in said live view mode, said control circuit drives said reversible motor in said second direction to rotate said first cam-incorporated gear, thereby rotating said mirror drive lever to said mirror-down position and rotating said shutter charge lever to said charge position.

8. The imaging apparatus according to claim 6, further comprising a diaphragm control mechanism which varies an f-number in accordance with object brightness information obtained from said image sensor in said live view mode, operations of said diaphragm control mechanism being controlled independently of said first operating mechanism and said second operating mechanism.

9. The imaging apparatus according to claim 4, wherein one revolution of said first cam-incorporated gear caused by said rotation of said reversible motor in said first direction from an origin position causes said mirror drive lever to rotate from said mirror-down position to said mirror-up position and causes said shutter charge lever to rotate from said charge position to said charge release position, and subsequently, causes said mirror drive lever to rotate from said mirror-up position to said mirror-down position and causes said shutter charge lever to rotate from said charge release position to said charge position after completion of traveling of said shutter, and wherein one revolution of said second cam-incorporated gear caused by said rotation of said reversible motor in said second direction from an origin position causes said shutter charge lever to rotate from said charge release position to said charge position and subsequently from said charge position to said charge release position.

10. The imaging apparatus according to claim 9, further comprising:

a control circuit which controls operations of said reversible motor and opening/shutting operations of said shutter; and a live view switch and a release switch which can be manually operated, wherein, upon said live view switch being turned ON, said control circuit drives said reversible motor in said first direction to rotate said first cam-incorporated gear, thereby rotating said mirror drive lever from said mirror-down position to said mirror-up position, rotating said shutter charge lever from said charge position to said shutter release position, and opening said shutter to move said imaging apparatus into live view mode, in which light from said imaging optical system is continuously incident on said image sensor, and wherein, upon said release switch being turned ON in said live view mode, said control circuit drives said reversible motor in said second direction to rotate said second cam-incorporated gear by one revolution to make said shutter charge lever swing from said charge release position to said charge position and return from said charge position to said charge release position, and thereafter make said shutter travel perform an exposure operation, and further drives said reversible motor in said second direction to rotate said second cam-incorporated gear by one revolution to make said shutter charge lever swing from said charge release position to said charge position and return from said charge position to said charge release position, and thereafter make said shutter open.

11. The imaging apparatus according to claim 10, wherein, upon said live view switch being turned OFF in said live view mode, said control circuit drives said reversible motor in said second direction to rotate said first cam-incorporated gear, thereby rotating said mirror drive lever to said mirror-down position and rotating said shutter charge lever to said charge position.

12. The imaging apparatus according to claim 10, further comprising a diaphragm control mechanism which varies an f-number in accordance with object brightness information obtained from said image sensor in said live view mode, operations of said diaphragm control mechanism being controlled independently of said first operating mechanism and said second operating mechanism.

13. The imaging apparatus according to claim 3, wherein said stationary member comprises a mirror box in which said mirror is positioned, and wherein said first operating mechanism and said second operating mechanism are arranged on one side of said mirror box in which said mirror is positioned.

14. The imaging apparatus according to claim 1, wherein said driving force transmission switcher comprises at least one gear that is movable to be selectively engaged with said first operating mechanism and said second operating mechanism.

15. An imaging apparatus comprising:

a mirror movable between a viewing position, in which said mirror reflects incident light from an imaging optical system toward a viewfinder optical system, and a retracted position, in which said mirror is retracted so that light which is passed through said imaging optical system is incident on an image sensor without being reflected by said mirror;

a shutter which, when shut, prevents said light that is passed through said imaging optical system from being incident on said image sensor, and, when open, allows said light that is passed through said imaging optical system to be incident on said image sensor;

a reversible motor;

a first operating mechanism which moves said mirror and carries out a shutter charge operation of said shutter when engaged with said reversible motor and driven thereby;

a second operating mechanism which carries out said shutter charge operation of said shutter without moving said mirror when engaged with said reversible motor and driven thereby; and a driving force transmission switcher that transmits a driving force of said reversible motor in a first rotational direction thereof to only said first operating mechanism and that transmits a driving force of said reversible motor in a second rotational direction thereof to only said second operating mechanism.

16. The imaging apparatus according to claim 15, wherein said first operating mechanism and said second operating mechanism comprise a shutter charge lever which is shared therebetween and is swingable between a charge release position to allow said shutter to travel and a charge position to carry out said shutter charge operation after completion of traveling of said shutter, wherein said first operating mechanism further comprises: a mirror drive lever swingable between a mirror-down position to hold said mirror in said viewing position and a mirror-up position to hold said mirror in said retracted position; and a first cam-incorporated gear which includes a mirror control cam for controlling swing movement of said mirror drive lever and a first shutter control cam for controlling swing movement of said shutter charge lever, wherein said second operating mechanism further comprises a second cam-incorporated gear including a second shutter control cam for controlling the swing movement of said shutter charge lever, wherein said driving force transmission switcher comprises a planetary gear mechanism including: a sun gear rotated in one direction and the other direction by rotations of said reversible motor in said first rotational direction and in said second rotational direction, respectively; and a planet gear engaged with and revolving around said sun gear, said planet gear being rotatably supported by a swing arm swingable about said sun gear, and wherein said planet gear is brought into engagement with said first cam-incorporated gear and said second cam-incorporated gear by said rotations of said reversible motor in said first direction and said second direction, respectively.

17. The imaging apparatus according to claim 16, further comprising at least one swing movement limit portion, formed on a stationary member which supports said mirror, for limiting a swinging range of said swing arm to define both ends of said swinging range.

18. The imaging apparatus according to claim 16, wherein said first operating mechanism and said second operating mechanism comprise a shutter charge lever which is shared therebetween and is swingable between a charge release position to allow said shutter to travel and a charge position to carry out said shutter charge operation after completion of traveling of said shutter, wherein said first operating mechanism further comprises: a mirror drive lever swingable between a mirror-down position to hold said mirror in said viewing position and a mirror-up position to hold said mirror in said retracted position; and a first cam-incorporated gear which includes a mirror control cam for controlling swing movement of said mirror drive lever and a first shutter control cam for controlling swing movement of said shutter charge lever, wherein said second operating mechanism further comprises a second cam-incorporated gear including a second shutter control cam for controlling the swing movement of said shutter charge lever, wherein said first cam-incorporated gear and said second cam-incorporated gear are rotatably supported by respective rotational shafts thereof which are substantially parallel to each other and positioned at different positions in an axial direction of said rotational shafts, and wherein said driving force transmission switcher comprises an axial-direction movable gear which is supported to be movable in said axial direction of said rotational shafts to be selectively engageable with said first cam-incorporated gear and said second cam-incorporated gear.

19. The imaging apparatus according to claim 17, wherein said stationary member comprises a mirror box in which said mirror is positioned, and wherein said first operating mechanism and said second operating mechanism are arranged on one side of said mirror box in which said mirror is positioned.

20. The imaging apparatus according to claim 15, wherein said driving force transmission switcher comprises at least one gear that is movable to be selectively engaged with said first operating mechanism and said second operating mechanism.

* * * * *